US012368560B2

(12) United States Patent
Farag et al.

(10) Patent No.: US 12,368,560 B2
(45) Date of Patent: Jul. 22, 2025

(54) METHOD AND APPARATUS FOR CONFIGURING A UNIFIED TCI STATE

(71) Applicant: Samsung Electronics Co., Ltd., Suwon-si (KR)

(72) Inventors: Emad N. Farag, Flanders, NJ (US); Eko Onggosanusi, Coppell, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 17/937,363

(22) Filed: Sep. 30, 2022

(65) Prior Publication Data

US 2023/0123718 A1    Apr. 20, 2023

Related U.S. Application Data

(60) Provisional application No. 63/314,890, filed on Feb. 28, 2022, provisional application No. 63/313,498,
(Continued)

(51) Int. Cl.
*H04L 5/00* (2006.01)
*H04W 72/23* (2023.01)

(52) U.S. Cl.
CPC .......... *H04L 5/0053* (2013.01); *H04W 72/23* (2023.01)

(58) Field of Classification Search
CPC ... H04L 5/0048; H04L 5/0053; H04L 5/0094; H04W 72/1273; H04W 72/23; H04W 72/231
See application file for complete search history.

(56) References Cited

U.S. PATENT DOCUMENTS

| | | | | |
|---|---|---|---|---|
| 11,825,456 | B2* | 11/2023 | Kim | H04W 4/70 |
| 12,047,963 | B2* | 7/2024 | Zhang | H04B 7/0695 |
| 12,219,579 | B2* | 2/2025 | Kim | H04L 25/02 |
| 2020/0100248 | A1* | 3/2020 | Kim | H04L 5/0053 |
| 2021/0105860 | A1 | 4/2021 | Tsai et al. | |

(Continued)

FOREIGN PATENT DOCUMENTS

| | | | | |
|---|---|---|---|---|
| CN | 116584058 A | * | 8/2023 | H04L 5/0053 |
| WO | WO-2021157938 A1 | * | 8/2021 | H04B 7/024 |

(Continued)

OTHER PUBLICATIONS

"5G; NR; Physical channels and modulation (3GPP TS 38.211 version 16.7.0 Release 16)", ETSI TS 138 211 V16.7.0, Oct. 2021, 138 pages.

(Continued)

*Primary Examiner* — Eric Nowlin

(57) ABSTRACT

Methods and apparatuses for configuration of unified transmission configuration indicator (TCI) state in a wireless communication system. A method of operating a user equipment (UE) includes receiving configuration information for a list of TCI states for downlink (DL) or joint TCI states, receiving configuration information for a control resource set (CORESET), receiving configuration information for a search space set associated with the CORESET, and receiving an indication of a TCI state for the list of TCI states. The method further includes identifying a type of the search space set and an index of the CORESET, applying the indicated TCI state to a physical downlink control channel (PDCCH) in the CORESET based on (i) the identified type of the search space set and the identified index of the CORESET or (ii) additional configuration information, and receiving the PDCCH based on quasi-co-location properties corresponding to the indicated TCI state.

20 Claims, 25 Drawing Sheets

Related U.S. Application Data filed on Feb. 24, 2022, provisional application No. 63/308,855, filed on Feb. 10, 2022, provisional application No. 63/291,174, filed on Dec. 17, 2021, provisional application No. 63/273,731, filed on Oct. 29, 2021, provisional application No. 63/273,017, filed on Oct. 28, 2021, provisional application No. 63/256,369, filed on Oct. 15, 2021.

(56) References Cited

U.S. PATENT DOCUMENTS

| | | | |
|---|---|---|---|
| 2022/0150945 A1* | 5/2022 | Zhang | H04L 5/0053 |
| 2022/0295315 A1* | 9/2022 | Takahashi | H04W 24/04 |
| 2023/0112271 A1* | 4/2023 | Kim | H04L 1/08 370/329 |
| 2023/0144002 A1* | 5/2023 | Kim | H04L 5/001 370/329 |
| 2023/0164801 A1* | 5/2023 | Yang | H04W 72/23 370/329 |
| 2023/0276458 A1* | 8/2023 | Lee | H04W 72/232 370/329 |
| 2023/0300851 A1* | 9/2023 | Zhou | H04W 72/231 370/329 |
| 2023/0308249 A1* | 9/2023 | Matsumura | H04L 5/0053 |
| 2024/0306053 A1* | 9/2024 | Matsumura | H04W 36/0072 |
| 2024/0372689 A1* | 11/2024 | Gao | H04L 5/0094 |

FOREIGN PATENT DOCUMENTS

| | | | | |
|---|---|---|---|---|
| WO | WO-2022024357 A1 * | 2/2022 | | H04L 5/0053 |
| WO | WO-2022104343 A1 * | 5/2022 | | H04B 7/0408 |

OTHER PUBLICATIONS

"5G; NR; Multiplexing and channel coding (3GPP TS 38.212 version 16.7.0 Release 16)", ETSI TS 138 212 V16.7.0, Oct. 2021, 157 pages.

"5G; NR; Physical layer procedures for control (3GPP TS 38.213 version 16.7.0 Release 16)", ETSI TS 138 213 V16.7.0, Oct. 2021, 191 pages.

"5G; NR; Physical layer procedures for data (3GPP TS 38.214 version 16.7.0 Release 16)", ETSI TS 138 214 V16.7.0, Oct. 2021, 176 pages.

"5G; NR; Medium Access Control (MAC) protocol specification (3GPP TS 38.321 version 16.6.0 Release 16)", ETSI TS 138 321 V16.6.0, Oct. 2021, 160 pages.

"5G; NR; Radio Resource Control (RRC); Protocol specification (3GPP TS 38.331 version 16.6.0 Release 16)", ETSI TS 138 331 V16.6.0, Oct. 2021, 948 pages.

International Search Report and Written issued Jan. 30, 2023 regarding International Application No. PCT/KR2022/015548, 6 pages.

Ericsson, "Remaining issues on multi-beam enhancements", 3GPP TSG RAN WG1 Meeting #106b-e, R1-2109110, Oct. 2021, 23 pages.

Mediatek Inc., "Enhancement on multi-beam operation", 3GPP TSG RAN WG1 Meeting #106b-e, R1-2109543, Oct. 2021, 27 pages.

Vivo, "Further discussion on multi beam enhancement", 3GPP TSG RAN WG1 Meeting #106b-e, R1-2108951, Oct. 2021, 26 pages.

Oppo, "Enhancements on Multi-Beam Operation", 3GPP TSG RAN WG1 Meeting #106-e, R1-2107203, Aug. 2021, 17 pages.

* cited by examiner

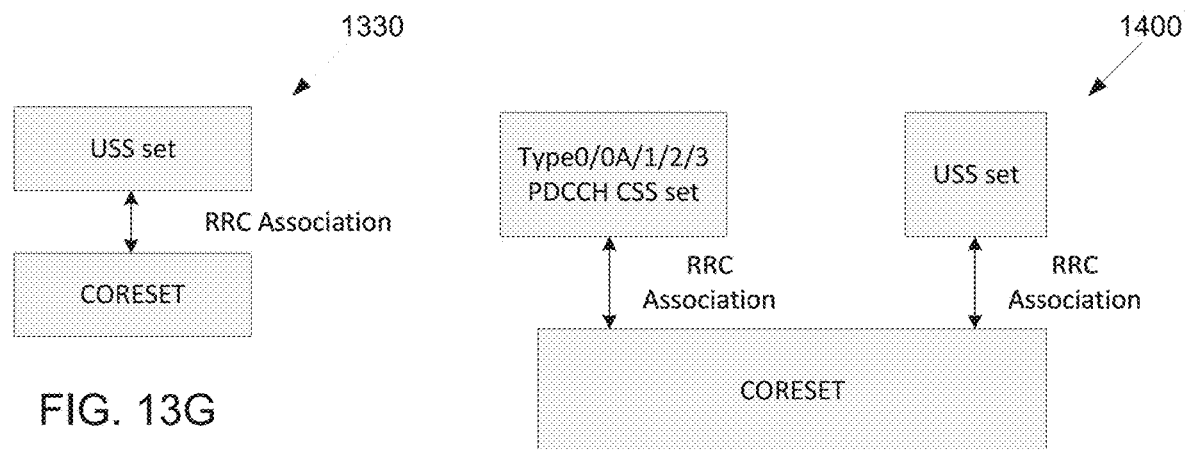
FIG. 13G
FIG. 14A
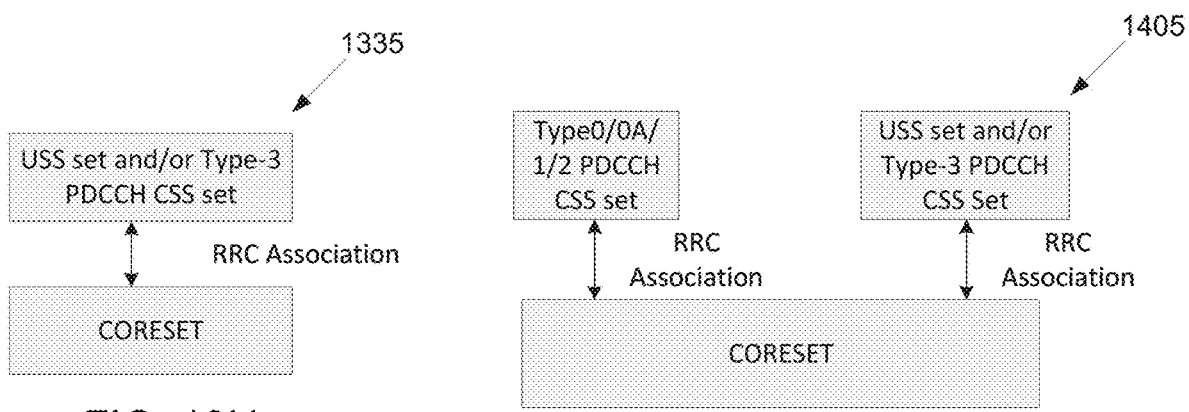
FIG. 13H
FIG. 14B
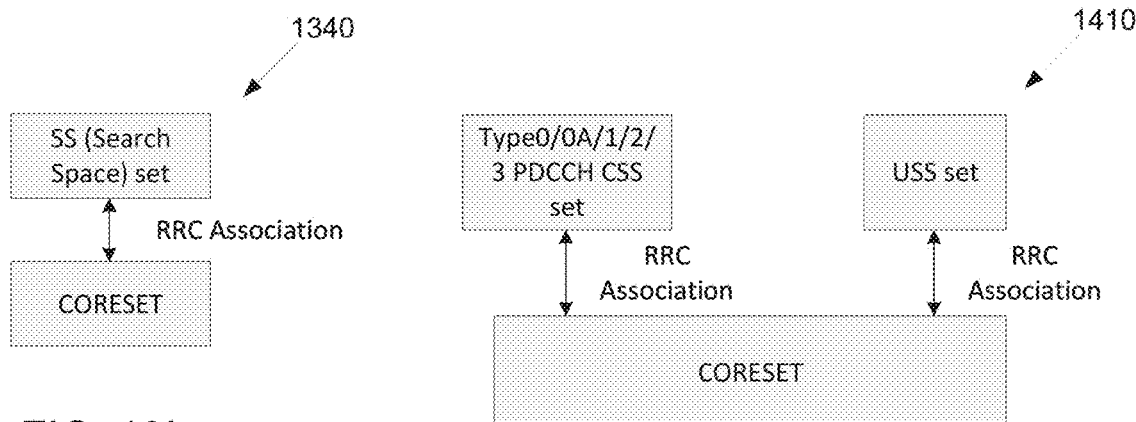
FIG. 13I
FIG. 14C

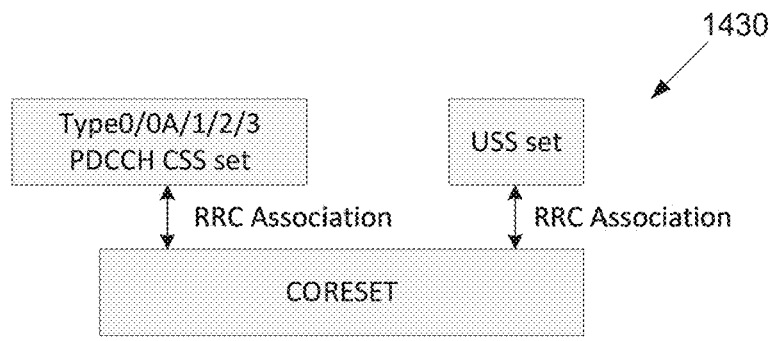
FIG. 14G
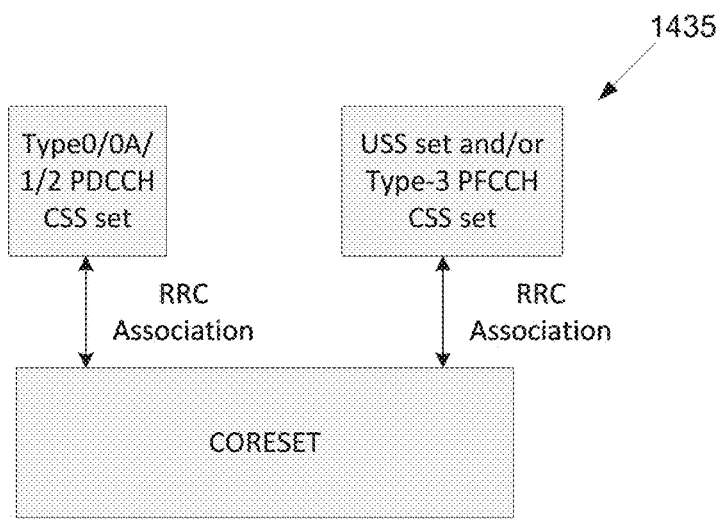
FIG. 14H
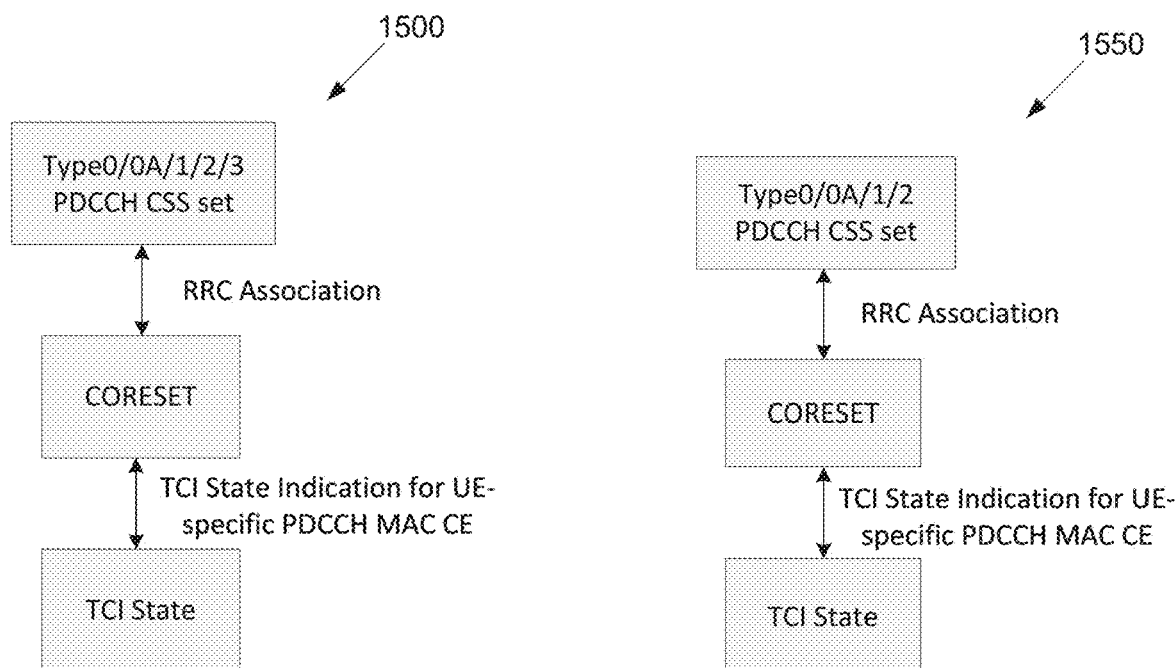
FIG. 15A
FIG. 15B

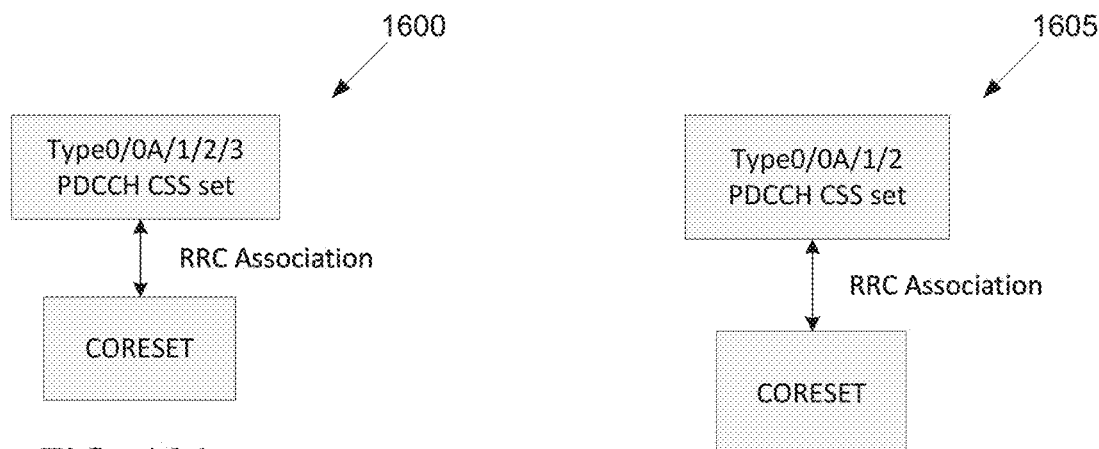
FIG. 16A
FIG. 16B
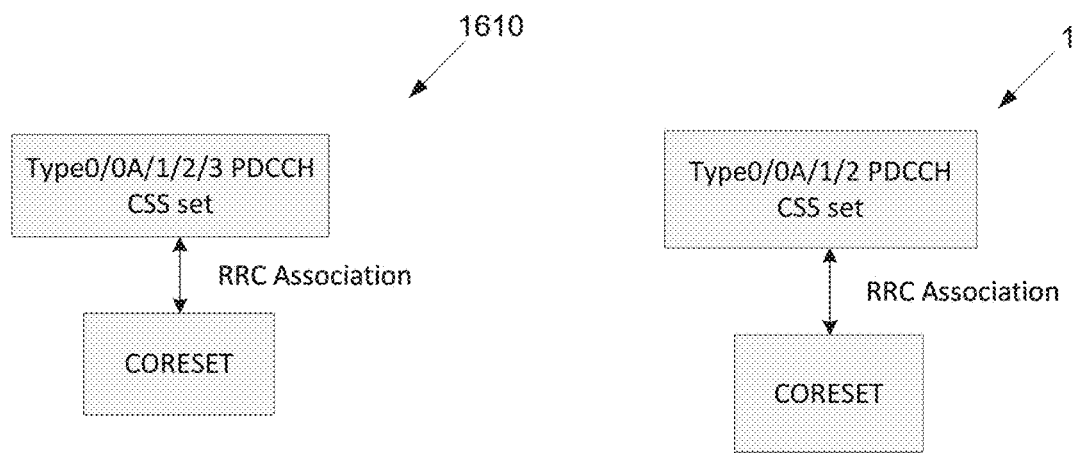
FIG. 16C
FIG. 16D
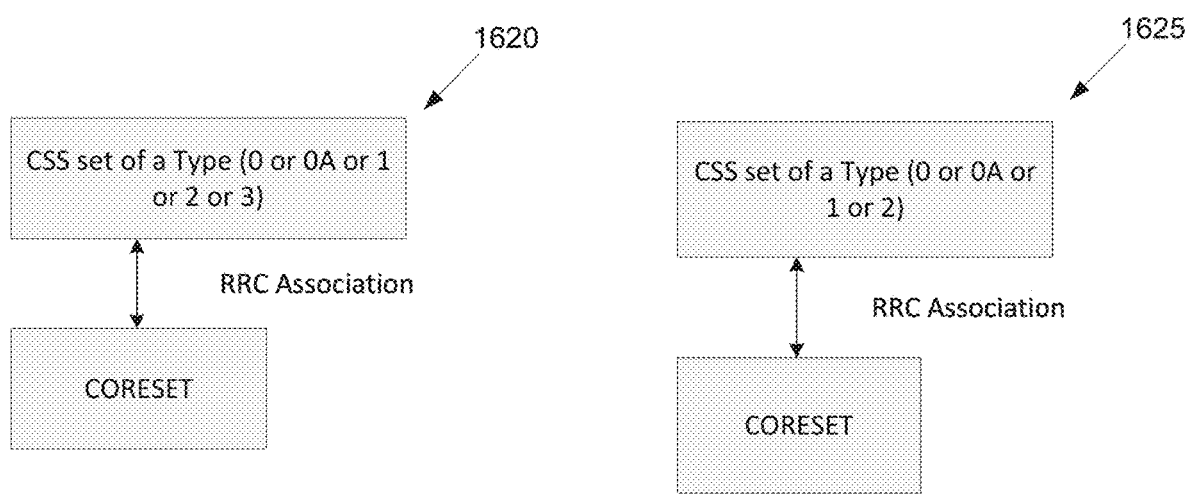
FIG. 16E
FIG. 16F

METHOD AND APPARATUS FOR CONFIGURING A UNIFIED TCI STATE

CROSS-REFERENCE TO RELATED APPLICATIONS AND CLAIM OF PRIORITY

The present application claims priority to:
U.S. Provisional Patent Application No. 63/256,369, filed on Oct. 15, 2021;
U.S. Provisional Patent Application No. 63/273,017, filed on Oct. 28, 2021;
U.S. Provisional Patent Application No. 63/273,731, filed on Oct. 29, 2021;
U.S. Provisional Patent Application No. 63/291,174, filed on Dec. 17, 2021;
U.S. Provisional Patent Application No. 63/308,855, filed on Feb. 10, 2022;
U.S. Provisional Patent Application No. 63/313,498, filed on Feb. 24, 2022; and
U.S. Provisional Patent Application No. 63/314,890, filed on Feb. 28, 2022. The contents of the above-identified patent documents are incorporated herein by reference.

TECHNICAL FIELD

The present disclosure relates generally to wireless communication systems and, more specifically, the present disclosure relates to a configuration of unified transmission configuration indicator (TCI) state in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a configuration of unified TCI state in a wireless communication system.

In one embodiment, a user equipment (UE) is provided. The UE includes a transceiver configured to receive configuration information for a list of TCI states for downlink (DL) or joint TCI states, receive configuration information for a control resource set (CORESET), receive configuration information for a search space set associated with the CORESET, and receive an indication of a TCI state from the list of TCI states. The UE further includes a processor operably coupled to the transceiver. The processor configured to, when the search space set is a UE specific search space (USS) set and an index of the CORESET is not 0, apply the indicated TCI state to a physical downlink control channel (PDCCH) in the CORESET. The transceiver is further configured to receive the PDCCH based on quasi-co-location properties corresponding to the indicated TCI state.

In another embodiment, a base station (BS) is provided. The BS includes a transceiver configured to transmit configuration information for a list of TCI states for DL or joint TCI states, transmit configuration information for a CORESET, transmit configuration information for a search space set associated with the CORESET, and transmit an indication of a TCI state from the list of TCI states. The UE further includes a processor operably coupled to the transceiver, the processor configured to, when the search space set is a USS set and an index of the CORESET is not 0, apply the indicated TCI state to a PDCCH in the CORESET. The transceiver is further configured to transmit the PDCCH based on quasi-co-location properties corresponding to the indicated TCI state.

In yet another embodiment, a method of operating a UE is provided. The method includes receiving configuration information for a list of TCI states for DL or joint TCI states, receiving configuration information for a CORESET, receiving configuration information for a search space set associated with the CORESET, and receiving an indication of a TCI state from the list of TCI states. The method further includes identifying a type of the search space set and an index of the CORESET, applying the indicated TCI state to a PDCCH in the CORESET based on at least one of (i) the identified type of the search space set and the identified index of the CORESET and (ii) additional configuration information, and receiving the PDCCH based on quasi-co-location properties corresponding to the indicated TCI state.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13G illustrates yet another example of TCI state of the CORESET according to embodiments of the present disclosure;

FIG. 13H illustrates yet another example of TCI state of the CORESET according to embodiments of the present disclosure;

FIG. 13I illustrates yet another example of TCI state of the CORESET according to embodiments of the present disclosure;

FIG. 14A illustrates yet another example of TCI state of the CORESET according to embodiments of the present disclosure;

FIG. 14B illustrates yet another example of TCI state of the CORESET according to embodiments of the present disclosure;

FIG. 14C illustrates yet another example of TCI state of the CORESET according to embodiments of the present disclosure;

FIG. 14G illustrates yet another example of TCI state of the CORESET according to embodiments of the present disclosure;

FIG. 14H illustrates yet another example of TCI state of the CORESET according to embodiments of the present disclosure;

FIG. 15A illustrates an example of TCI state of the CORESET associated with CSS set according to embodiments of the present disclosure;

FIG. 15B illustrates another example of TCI state of the CORESET associated with CSS set according to embodiments of the present disclosure;

FIG. 16A illustrates yet another example of TCI state of the CORESET associated with CSS set according to embodiments of the present disclosure;

FIG. 16B illustrates yet another example of TCI state of the CORESET associated with CSS set according to embodiments of the present disclosure;

FIG. 16C illustrates yet another example of TCI state of the CORESET associated with CSS set according to embodiments of the present disclosure;

FIG. 16D illustrates yet another example of TCI state of the CORESET associated with CSS set according to embodiments of the present disclosure;

FIG. 16E illustrates yet another example of TCI state of the CORESET associated with CSS set according to embodiments of the present disclosure;

FIG. 16F illustrates yet another example of TCI state of the CORESET associated with CSS set according to embodiments of the present disclosure;

DETAILED DESCRIPTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.7.0, "NR, Physical channels and modulation"; 3GPP TS 38.212 v16.7.0, "NR, Multiplexing and Channel coding"; 3GPP TS 38.213 v16.7.0, "NR, Physical Layer Procedures for Control"; 3GPP TS 38.214 v16.7.0, "NR, Physical Layer Procedures for Data"; 3GPP TS 38.321 v16.6.0, "NR, Medium Access Control (MAC) protocol specification"; and 3GPP TS 38.331 v16.6.0, "NR, Radio Resource Control (RRC) Protocol Specification."

Figure 1:
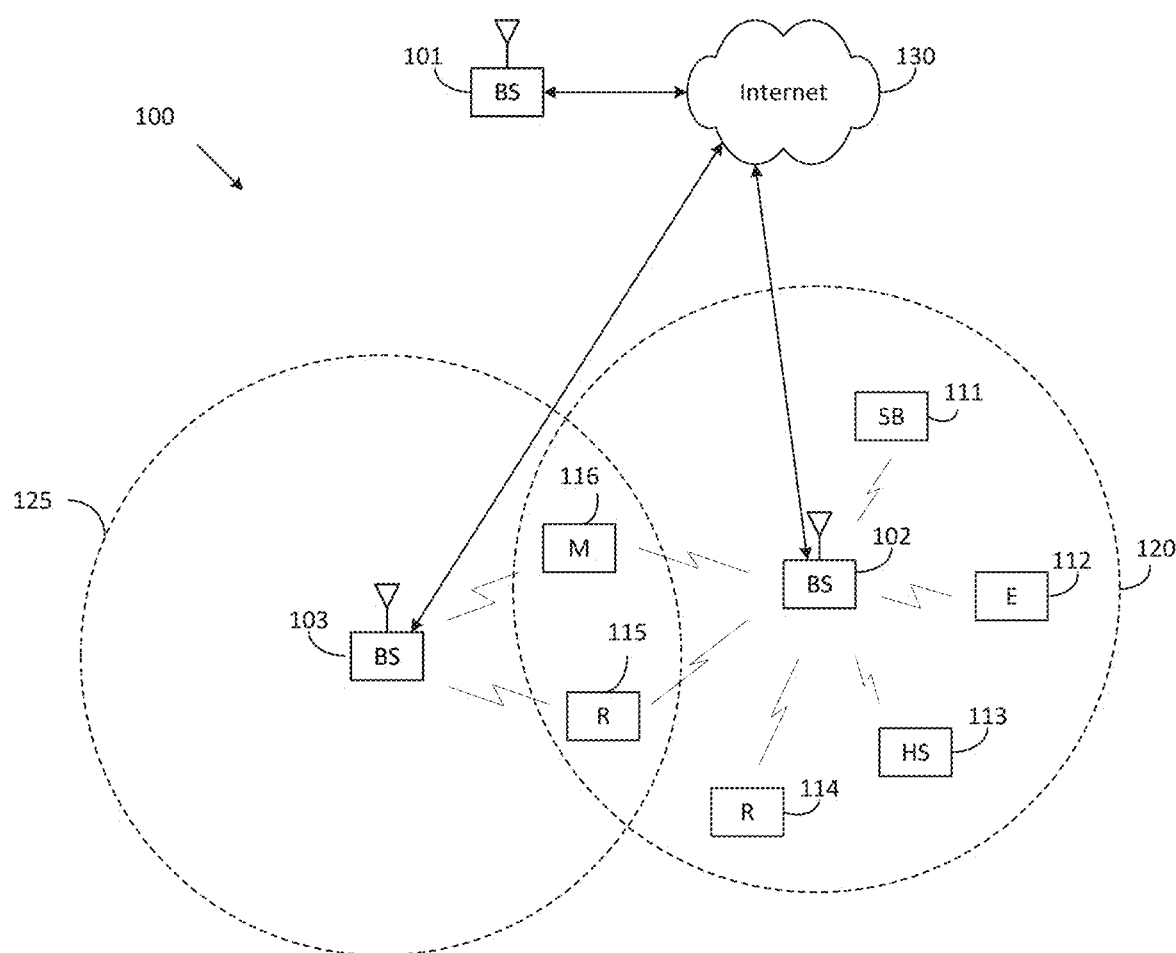
FIG. 1 illustrates an example of wireless network according to embodiments of the present disclosure.
Figure 2:
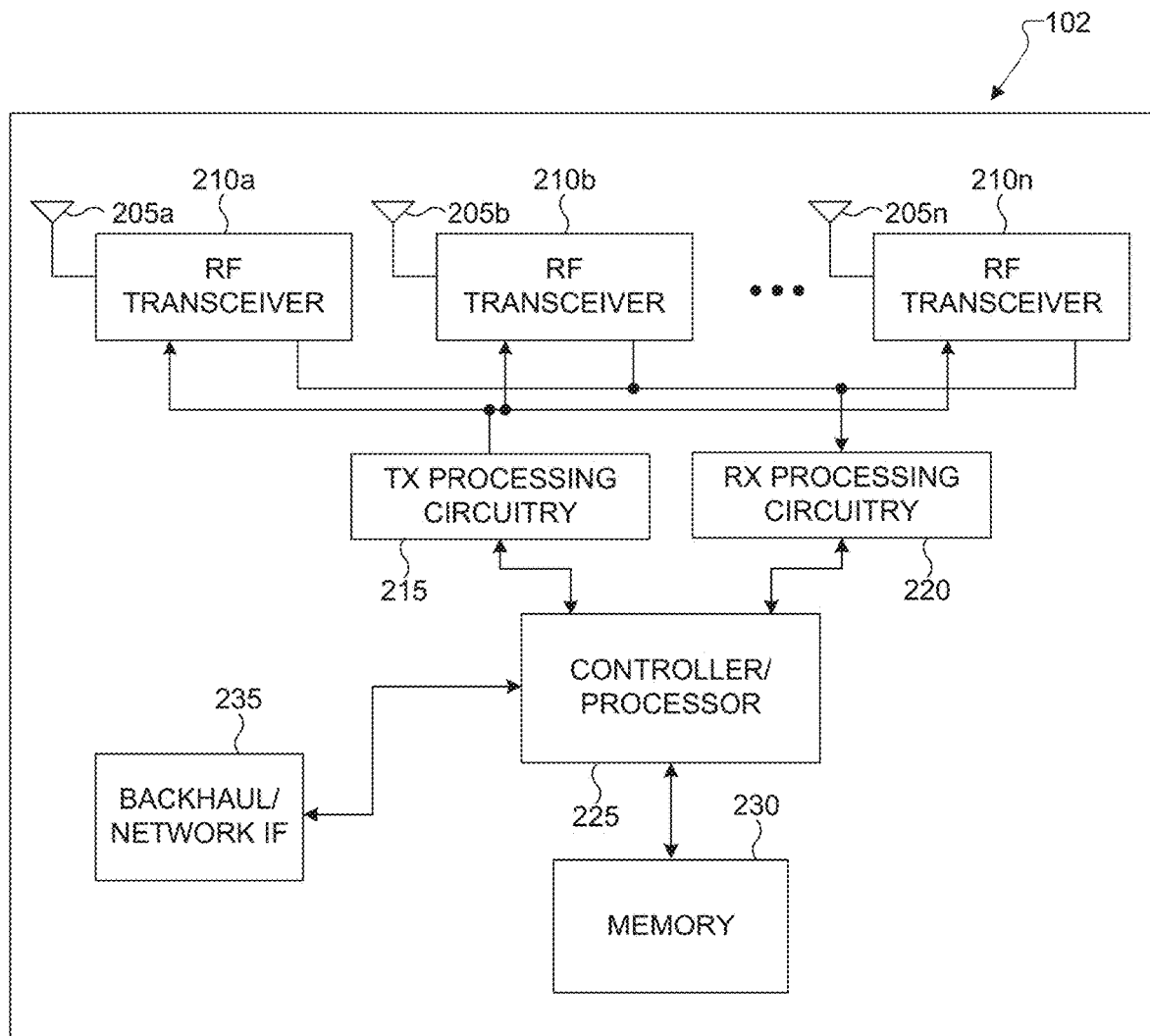
FIG. 2 illustrates an example of gNB according to embodiments of the present disclosure.
Figure 3:
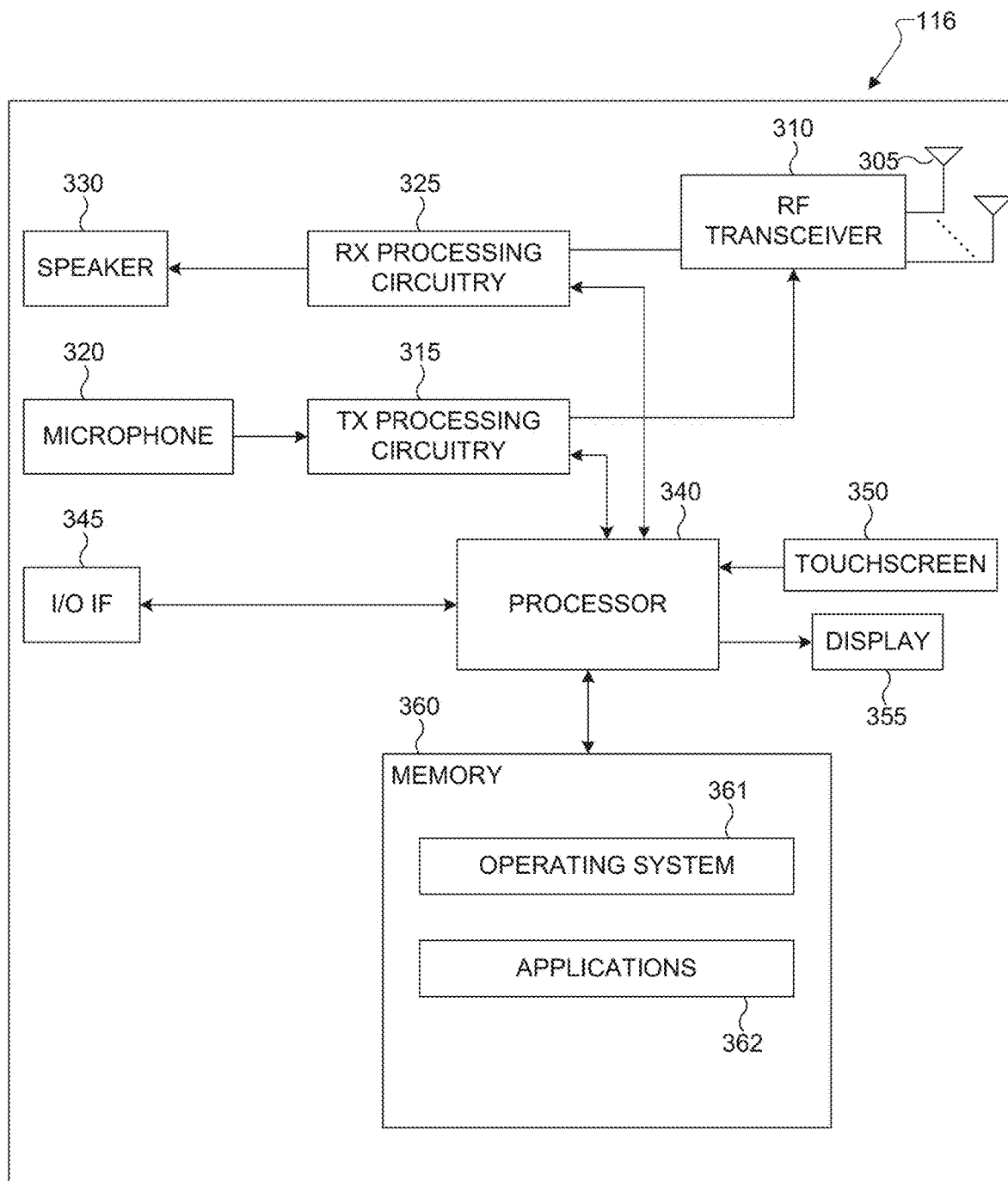
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a configuration of unified TCI state in a wireless communication system. In certain embodiments, and one or more of the gNBs 101-103 includes circuitry, programing, or a combination thereof, for a configuration of unified TCI state in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a configuration of unified TCI state in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a configuration of unified TCI state in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
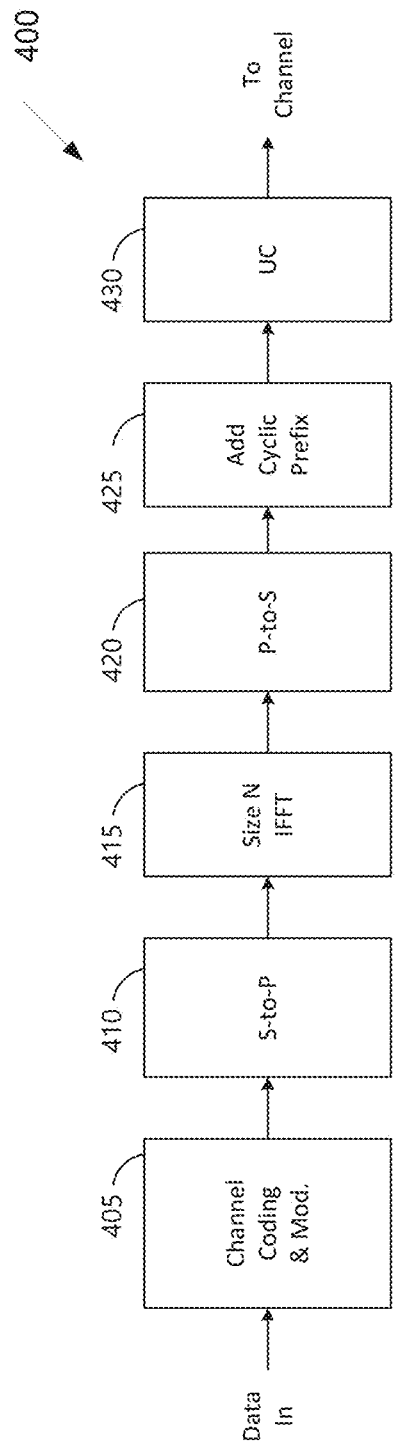
FIGS. 4 and 5 illustrate example of wireless transmit and receive paths according to this disclosure.
Figure 5:
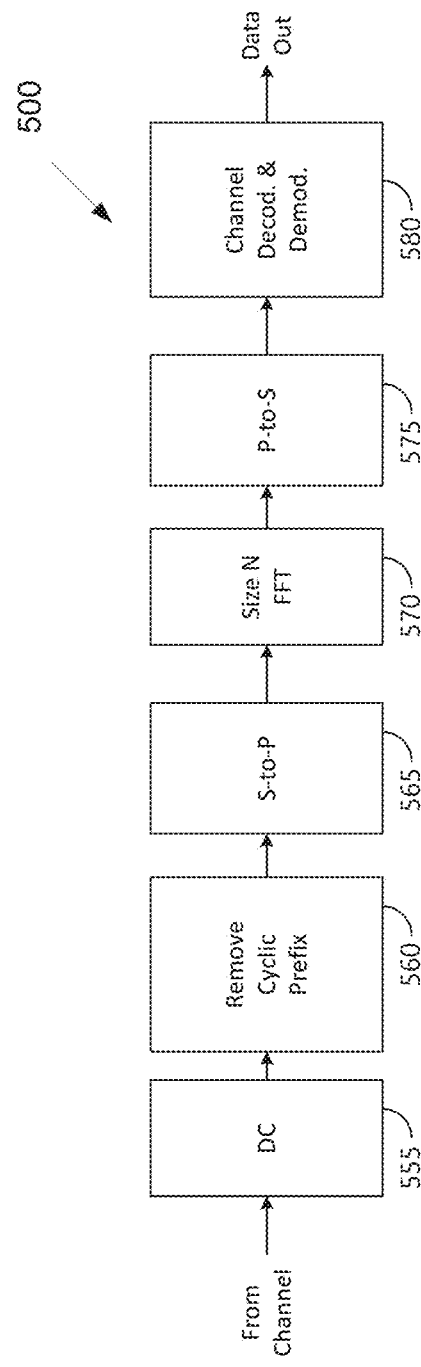

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
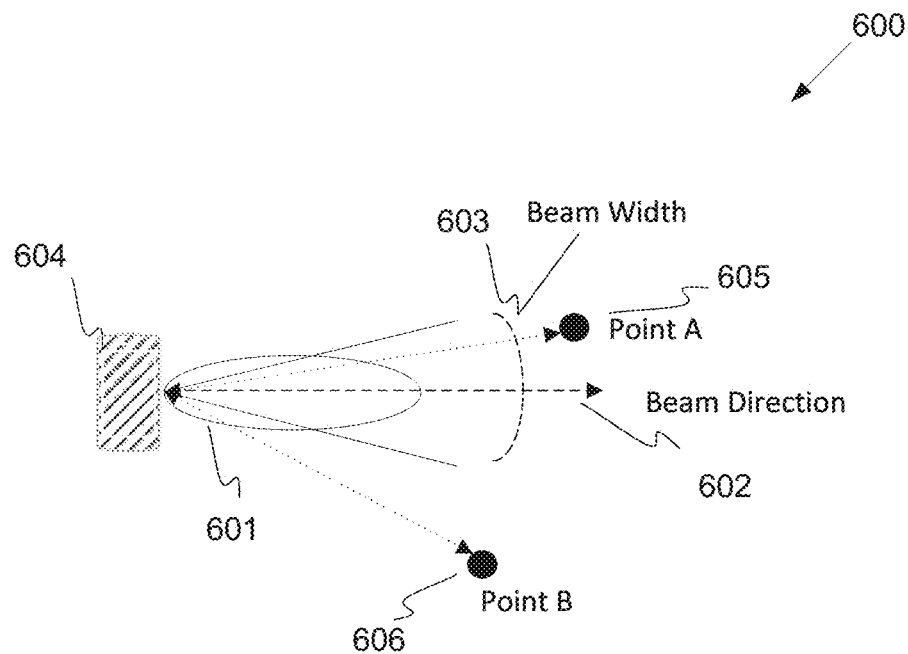
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
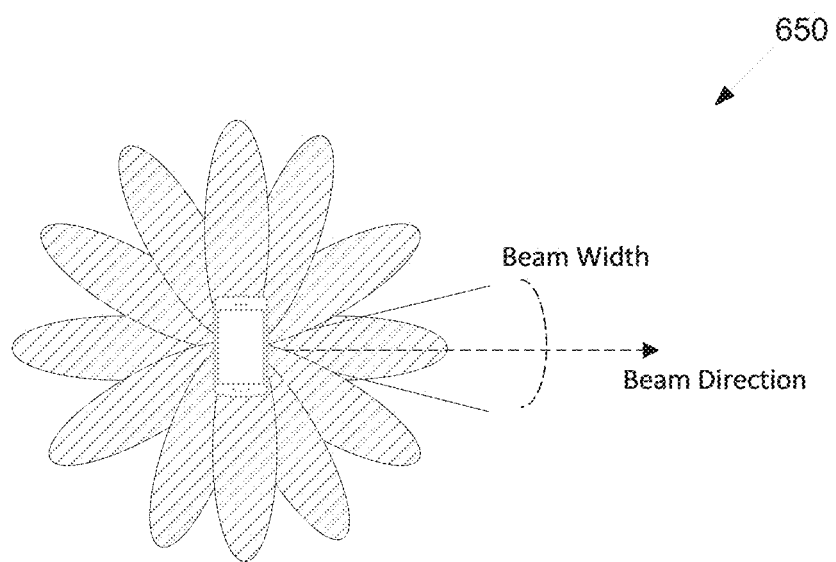
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
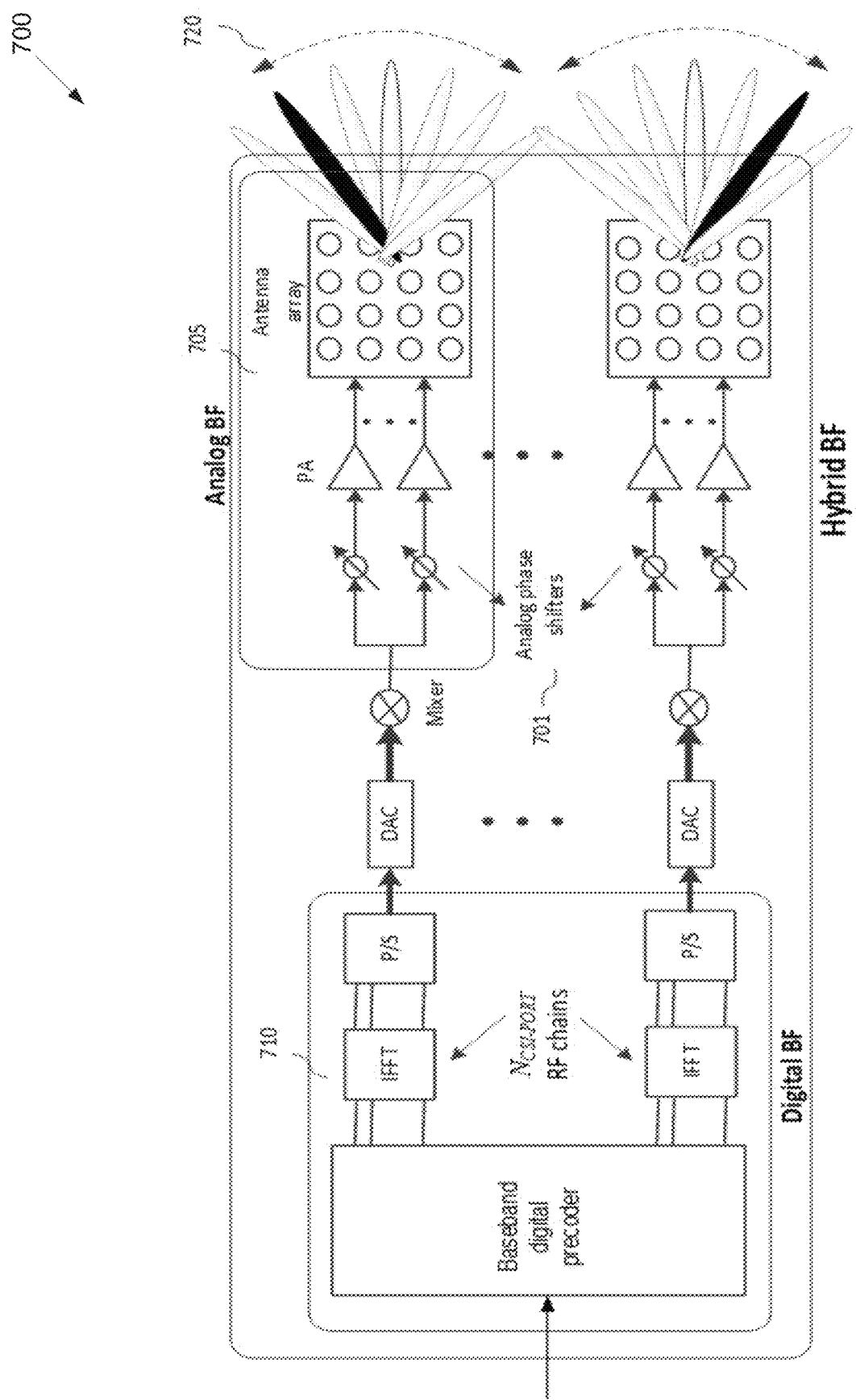
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

Rel-17 introduced the unified TCI framework, where a unified or master or main or indicated TCI state is signaled or indicated to the UE also referred to as the indicated TCI state. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and/or (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

A quasi-co-location (QCL) relation can be quasi-location with respect to one or more of the following relations (e.g., 3GPP standard specification 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel.

A UE dedicated channel can be a DL channel that is transmitted to a UE using a DL assignment in (e.g., scheduled by) a PDCCH transmitted in a UE-specific search space (USS) set. The PDCCH carrying the DL assignment can have a CRC scrambled by a C-RNTI, CS-RNTI, SP-CSI-RNTI or an MCS-C-RNTI. The UE dedicated channel can also be a semi-persistent scheduled channel that is activated by CS-RNTI. UE dedicated channels can also be DL channels transmitted to a UE using a DL assignment or DL SPS activation in a PDCCH transmitted in a UE-specific search space (USS) set, with CRC scrambled by a C-RNTI, an MCS-C-RNTI, SP-CSI-RNTI or CS-RNTI.

A UE-dedicated channel can be an UL channel associated with a DL or UL DCI in an USS set or CSS set and the DCI is transmitted in a PDCCH having a CRC scrambled by a C-RNTI, an MCS-C-RNTI, SP-CSI-RNTI or CS-RNTI. A DL DCI is a shorthand notation for a DCI Format that can be used for a DL assignment, e.g., DCI Format 1_0, DCI Format 1_1 or DCI Format 1_2. An UL DCI is a shorthand notation for a DCI Format that can be used for an UL assignment, e.g., DCI Format 0_0, DCI Format 0_1 or DCI Format 0_2.

In general, a UE-dedicated channel can be determined based on one or more of the following examples.

In one example, a channel is associated with a UE specific Search Space (USS) set, e.g., (1) a PDCCH channel transmitted/received in USS set; (2) a PDSCH channel scheduled by a DL assignment in a PDCCH channel transmitted/received in USS set; (3) a PDSCH channel activated, or that can be released, by PDCCH channel transmitted/received in USS set; (4) a PUCCH channel multiplexing the HARQ-ACK response of a PDSCH channel scheduled by a DL assignment in a PDCCH channel transmitted/received in USS set; (5) a PUCCH channel multiplexing the HARQ-ACK response of a PDSCH channel activated, or that can be released, by PDCCH channel transmitted/received in USS set; (6) PUSCH channel scheduled by an UL grant in a PDCCH channel transmitted/received in USS set; (7) PUSCH channel of configured grant Type-2 which can be activated, or released by a PDCCH transmitted/received in USS set; and/or (8) PRACH transmission in response to a PDCCH order received by the UE that triggers a contention free random access procedure, the PDCCH order is transmitted/received in a USS set.

In another example, a channel that is associated with a PDCCH transmission with a CRC scrambled by a C-RNTI, an MCS-C-RNTI, a CS-RNTI or SP-CSI-RNTI, e.g., (1) a PDCCH channel with a CRC scrambled by one of the aforementioned RNTIs; (2) a PDSCH channel scheduled by a DL assignment in a PDCCH channel with a CRC scrambled by one of the aforementioned RNTIs; (3) a PDSCH channel activated, or that can be released, by PDCCH channel with a CRC scrambled by one of the aforementioned RNTIs; (4) a PUCCH channel multiplexing the HARQ-ACK response of a PDSCH channel scheduled by a DL assignment in a PDCCH channel with a CRC scrambled by one of the aforementioned RNTIs; (5) a PUCCH channel multiplexing the HARQ-ACK response of a PDSCH channel activated, or that can be released, by PDCCH channel with a CRC scrambled by one of the aforementioned RNTIs; (6) PUSCH channel scheduled by an UL grant in a PDCCH channel with a CRC scrambled by one of the aforementioned RNTIs; (7) PUSCH channel of configured grant Type-2 which can be activated, or released by a CRC scrambled by one of the aforementioned RNTIs; and (8) PRACH transmission in response to a PDCCH order received by the UE that triggers a contention free random access procedure, the PDCCH order has a CRC scrambled by one of the aforementioned RNTIs.

In yet another example, a channel on the Uu interface associated with a PDCCH transmission with a CRC scrambled by a SL-RNTI, SL-CS-RNTI, or SL semi-persistent scheduling V-RNTI, e.g., (1) a PDCCH channel with a CRC scrambled by one of the aforementioned RNTIs; (2) a PUCCH channel multiplexing the HARQ-ACK response of a SL transmission(s) scheduled by a PDCCH channel with a CRC scrambled by one of the aforementioned RNTIs.

In yet another example, a channel associated with a Type3-PDCCH common search space (CSS) set only for the primary cell (In one example, Type3-PDCCH CSS set is handled the same as USS set).

In yet another example, a channel configured by UE dedicated RRC configuration for reception and/or transmission, e.g., (1) PUSCH channel of Configured Grant Type-1; (2) PUSCH channel of configured grant Type-2; (3) PDSCH Semi-Persistent-Scheduled (SPS) channel; (4) PUCCH configured for channel state information (CSI) reporting; and (5) PUCCH configured for scheduling request (SR) reporting.

Non-UE dedicated channels can include one or more of the following: (1) channels carrying system information (e.g., SIB) with a DL assignment carried by a DCI in PDCCH having a CRC scrambled by SI-RNTI and transmitted in Type0-PDCCH CSS set; (2) channels carrying other system information with a DL assignment carried by a DCI in PDCCH having a CRC scrambled by SI-RNTI and transmitted in Type0A-PDCCH CSS set; (3) channels carrying paging or short messages with a DL assignment carried by a DCI in PDCCH having a CRC scrambled by P-RNTI and transmitted in Type2-PDCCH CSS set; (4) channels carrying RACH related channels with a DL assignment or UL grant carried by a DCI in PDCCH having a CRC scrambled by RA-RNTI or TC-RNTI and transmitted in Type1-PDCCH CSS set; and/or (5) channels transmitted in Type3-PDCCH CSS set with CRC scrambled by one of: INT-RNTI, SFI-RNTI, TPC-PUSCH-RNTI, TPC-PUCCH-RNTI, TPC-SRS-RNTI or CI-RNTI, at least in cells other than the primary cell. (In one example, Type3-PDCCH CSS is handled the same as other CSS sets).

As shown in TABLE 1, a search space is associated with CORESET by RRC configuration as specified in 3GPP standard specification 38.331.

TABLE 1

Search space

```
SearchSpace ::=          SEQUENCE {
searchSpaceId           SearchSpaceId,
controlResourceSetId    ControlResourceSetId    OPTIONAL, -- Cond
                                                SetupOnly
monitoringSlotPeriodicityAndOffset CHOICE {
...
-- TAG-SEARCHSPACE-STOP
-- ASN1STOP
```

MAC CE activates a TCI for a CORESET through "TCI state indication for UE-specific PDCCH MAC CE" as specified in 3GPP standard specification 38.321.

In the present disclosure, methods that the UE can be configured and can determine whether a CORESET follows the unified (master or main or indicated) TCI state is provided. Other methods include determining whether UE follows the unified (master or main or indicated) TCI state based on a search space or based on an RNTI used to scramble a CRC of a PDCCH channel. In case of inter-cell beam management, methods for the UE to determine the TCI state for channels used for paging and short messages are described also.

Figure 8:
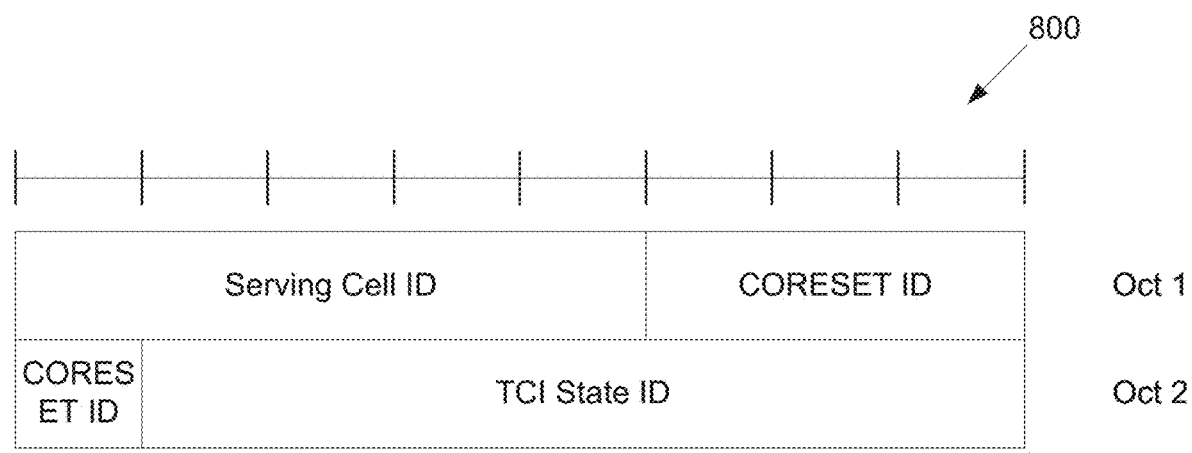
FIG. 8 illustrates an example of TCI for a CORESET according to embodiments of the present disclosure.

FIG. 8 illustrates an example of TCI for a CORESET 800 according to embodiments of the present disclosure. An embodiment of the TCI for a CORESET 800 shown in FIG. 8 is for illustration only.

Rel-17 introduced the unified TCI framework, where a unified (master or main or indicated) TCI state is signaled to the UE. The unified (master or main or indicated) TCI state applies at least to UE dedicated DL and UL channels. The unified (master or main or indicated) TCI can also apply to other DL and/or UL channels and/or signals e.g., non-UE dedicated channel.

UE dedicated channels can be channels received or transmitted by a UE and associated with a PDCCH in UE-specific Search Space or associated with a DCI in a PDCCH having a CRC scrambled by C-RNTI, an MCS-C-RNTI or CS-RNTI. Non-UE dedicated channels can be channels received or transmitted by a UE and associated with a PDCCH in common search space and associated with a DCI in a PDCCH having a CRC scrambled by at least SI-RNTI, P-RNTI, RA-RNTI or TC-RNTI. A search space is associated with CORESET by RRC configuration. MAC CE activates a TCI for a CORESET through "TCI State Indication for UE-specific PDCCH MAC CE." A CORESET can follow the unified (master or main or indicated) TCI state or be separately activated a TCI state. This is a new aspect in Rel-17 that has not been addressed so far.

In the present disclosure, a method that the UE can be configured and can determine whether a CORESET, search space or PDCCH (e.g., through an RNTI that scrambles its CRC) follows the unified (master or main or indicated) TCI state is provided. In case of inter-cell beam management, methods for the UE to determine the TCI state for channels used for paging and short messages are provided.

The present disclosure relates to a 5G/NR communication system.

Methods by which the UE can be configured and can determine whether a CORESET follows the unified (master or main or indicated) TCI state.

In the present disclosure, terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, which is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CSI-RS resource ID (CRI) or Synchronization Signal block (SSB) Resource ID (SSBRI)). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or FR2) or for higher frequency bands (such as >52.6 GHz) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 9:
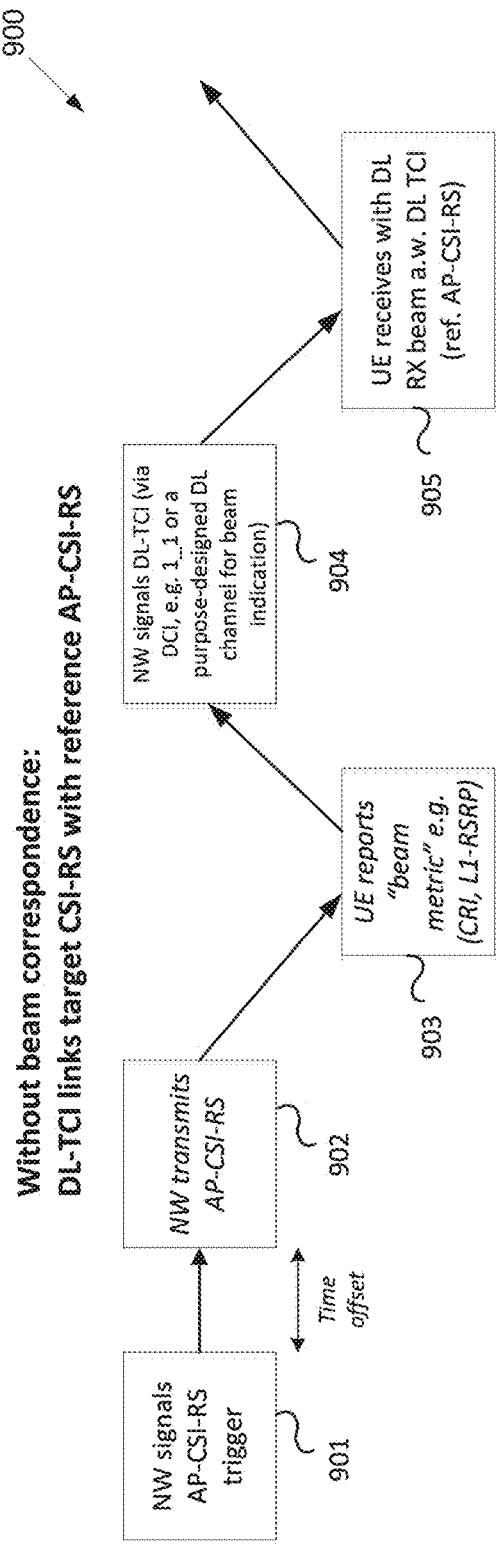
FIG. 9 illustrates an example of DL multi-beam operation according to embodiments of the present disclosure.

FIG. 9 illustrates an example of DL multi-beam operation 900 according to embodiments of the present disclosure. An embodiment of the DL multi-beam operation 900 shown in FIG. 9 is for illustration only.

In one example illustrated in FIG. 9 (embodiment A-1), a DL multi-beam operation 600 starts with the gNB/NW signaling to a UE an aperiodic CSI-RS (AP-CSI-RS) trigger or indication (step 901). This trigger or indication can be included in a DCI and indicate transmission of AP-CSI-RS in a same (zero-time offset) or in a later slot/sub-frame (>0 time offset). For example, the DCI can be related to scheduling of a DL reception, or an UL transmission and the CSI-RS trigger can be either jointly or separately coded with a CSI report trigger. Upon receiving the AP-CSI-RS transmitted by the gNB/NW (step 902), the UE measures the AP-CSI-RS and calculates and reports a "beam metric" that indicates a quality of a particular TX beam hypothesis (step 903). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 904) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, which is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 905).

Alternatively, the gNB/NW can use the beam report to select a DL RX beam for the UE and indicate to the UE the selected DL RX beam (step 904) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set.

In another example, a UE-specific DL channel can be a PDCCH that a UE receives according to a UE-specific search space (USS) set or a Type3-PDCCH CCS set, while a UE-group common DL channel can be a PDCCH that a UE receives according to a common search space (CSS) set other than Type3-PDCCH set. In this case, the TCI-state indicates a reference RS, such as an AP-CSI-RS, representing the selected DL TX beam (by the gNB/NW). In addition, the TCI-state can also indicate a "target" RS, such as a CSI-RS, which is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 905).

For this embodiment (A-1), as described above, the UE selects a DL RX beam using an index of a reference RS, such as an AP-CSI-RS, which is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 10:
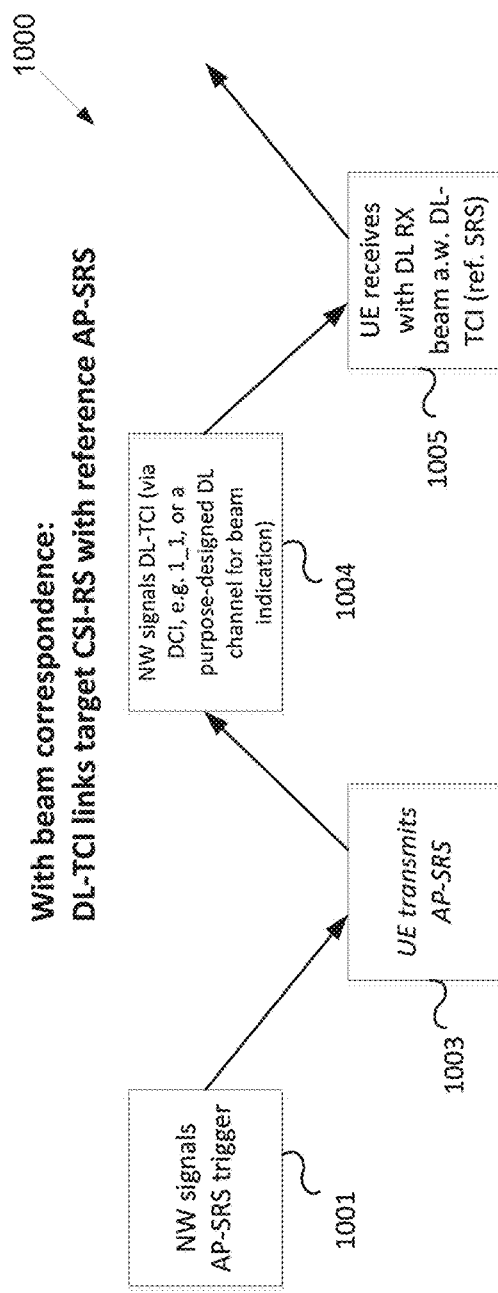
FIG. 10 illustrates another example of DL multi-beam operation according to embodiments of the present disclosure.

FIG. 10 illustrates another example of DL multi-beam operation 1000 according to embodiments of the present disclosure. An embodiment of the DL multi-beam operation 1000 shown in FIG. 10 is for illustration only.

In another example illustrated in FIG. 10 (embodiment A-2), an DL multi-beam operation 1000 starts with the gNB/NW signaling to a UE an aperiodic SRS (AP-SRS) trigger or request (step 1001). This trigger can be included in a DCI format such as for example a DCI format scheduling a PDSCH reception or a PUSCH transmission. Upon receiving and decoding the DCI format with the AP-SRS trigger (step 1002), the UE transmits an SRS (AP-SRS) to the gNB/NW (step 1003) so that the NW (or gNB) can measure the UL propagation channel and select a DL RX beam for the UE for DL (at least when there is beam correspondence).

The gNB/NW can then indicate the DL RX beam selection (step 1004) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, which is linked to the reference RS, such as an AP-SRS. Upon successfully decoding the DCI format providing the TCI state, the UE performs DL receptions, such as a PDSCH reception, using the DL RX beam indicated by the TCI-state (step 1005).

Alternatively, the gNB/NW can indicate the DL RX beam selection (step 1004) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set.

In another example, a UE-specific DL channel can be a PDCCH that a UE receives according to a UE-specific search space (USS) set or a Type3-PDCCH CCS set, while a UE-group common DL channel can be a PDCCH that a UE receives according to a common search space (CSS) set other than Type3-PDCCH set. In this case, the TCI-state indicates a reference RS, such as an AP-SRS, representing the selected DL RX beam. In addition, the TCI-state can also indicate a "target" RS, such as a CSI-RS, which is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 1005).

For this embodiment (A-2), as described above, the UE selects the DL RX beam based on the UL TX beam associated with the reference RS (AP-SRS) index signaled via the TCI-state field.

Similar, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS, and a UE receives and measures the CSI-RS. This embodiment can be used, for instance, at least when there is reciprocity between the UL and DL beam-pair-link (BPL). This condition is termed "UL-DL beam correspondence." In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 11:
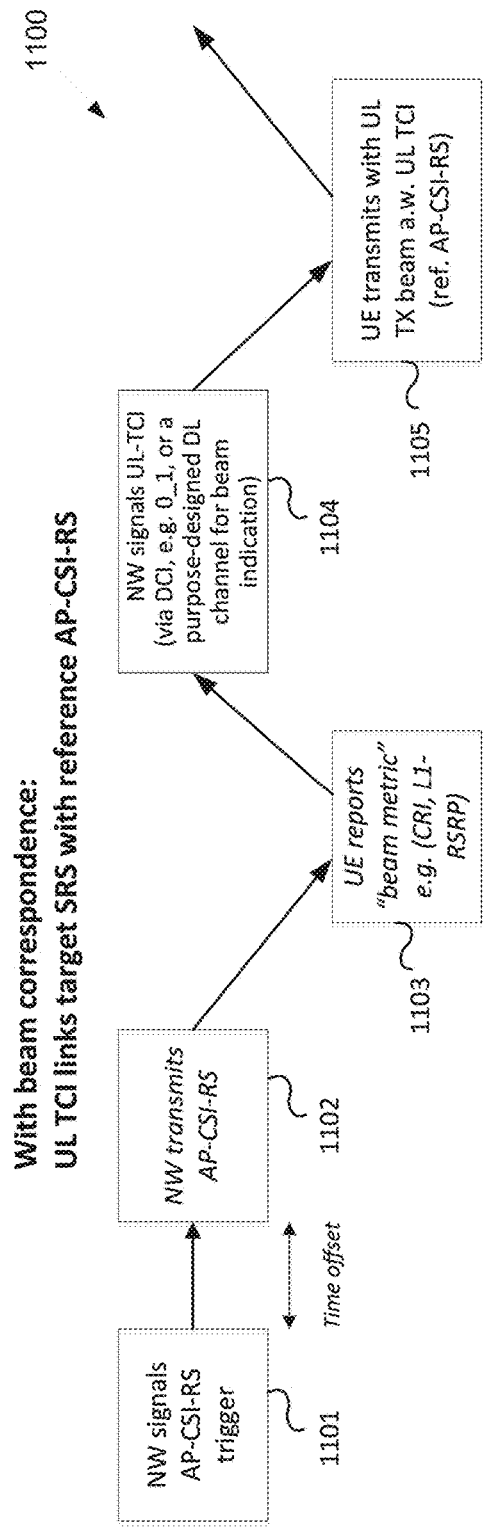
FIG. 11 illustrates an example of UL multi-beam operation according to embodiments of the present disclosure.

FIG. 11 illustrates an example of UL multi-beam operation 1100 according to embodiments of the present disclosure. An embodiment of the UL multi-beam operation 1100 shown in FIG. 11 is for illustration only.

In one example illustrated in FIG. 11 (embodiment B-1), an UL multi-beam operation 1100 starts with the gNB/NW signaling to a UE an aperiodic CSI-RS (AP-CSI-RS) trigger or indication (step 1101). This trigger or indication can be included in a DCI format, such as a DCI format scheduling a PDSCH reception to the UE or a PUSCH transmission from the UE and can be either separately or jointly signaled with an aperiodic CSI request/trigger, and indicate transmission of AP-CSI-RS in a same slot (zero time offset) or in a later slot/sub-frame (>0 time offset).

Upon receiving the AP-CSI-RS transmitted by the gNB/NW (step 1102), the UE measures the AP-CSI-RS and, in turn, calculates and reports a "beam metric" (indicating quality of a particular TX beam hypothesis) (step 1103). Examples of such beam reporting are CSI-RS resource indicator (CRI) or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1104) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as an SRS, which is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1105).

Alternatively, the gNB/NW can use the beam report to select an UL TX beam for the UE and indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set.

In another example, a UE-specific DL channel can be a PDCCH that a UE receives according to a UE-specific search space (USS) set or a Type3-PDCCH CCS set, while a UE-group common DL channel can be a PDCCH that a UE receives according to a common search space (CSS) set other than Type3-PDCCH set. In this case, the TCI-state indicates a reference RS, such as an AP-CSI-RS, representing the selected UL RX beam (by the gNB/NW). In addition, the TCI-state can also indicate a "target" RS, such as an SRS, which is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1105).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 12:
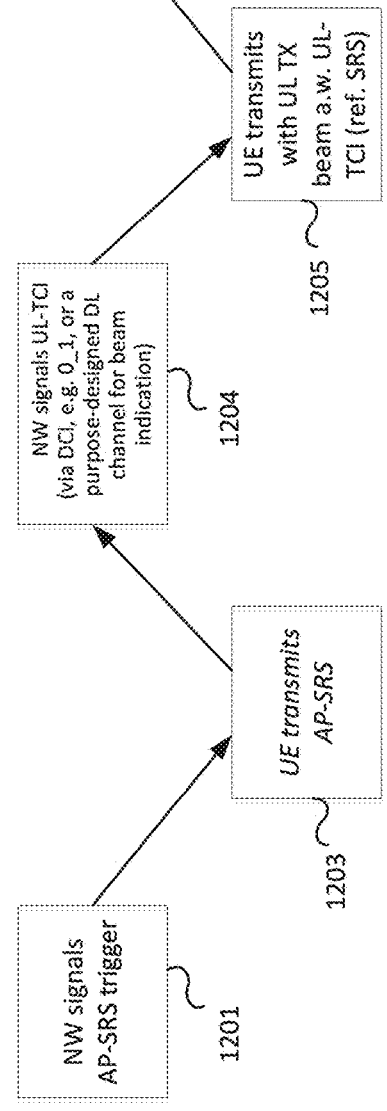
FIG. 12 illustrates another example of UL multi-beam operation according to embodiments of the present disclosure.

FIG. 12 illustrates another example of UL multi-beam operation 1200 according to embodiments of the present disclosure. An embodiment of the UL multi-beam operation 1200 shown in FIG. 12 is for illustration only.

In another example illustrated in FIG. 12 (embodiment B-2), an UL multi-beam operation 1200 starts with the gNB/NW signaling to a UE an aperiodic SRS (AP-SRS) trigger or request (step 1201). This trigger can be included in a DCI format, such as a DCI format scheduling a PDSCH reception or a PUSCH transmission. Upon receiving and decoding the DCI format with the AP-SRS trigger (step 1202), the UE transmits AP-SRS to the gNB/NW (step 1203) so that the NW (or gNB) can measure the UL propagation channel and select an UL TX beam for the UE.

The gNB/NW can then indicate the UL TX beam selection (step 1204) using a value of the TCI-state field in the DCI format. In this case, the UL-TCI indicates a reference RS, such as an AP-SRS, representing the selected UL TX beam. In addition, the TCI-state can also indicate a "target" RS, such as an SRS, which is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1205).

Alternatively, a gNB/NW can indicate the UL TX beam selection (step 1204) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set.

In another example, a UE-specific DL channel can be a PDCCH that a UE receives according to a UE-specific search space (USS) set or a Type3-PDCCH CCS set, while a UE-group common DL channel can be a PDCCH that a UE receives according to a common search space (CSS) set other than Type3-PDCCH set. In this case, the UL-TCI indicates a reference RS, such as an AP-SRS, representing the selected UL TX beam. In addition, the TCI-state can also indicate a "target" RS, such as an SRS, which is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1205).

For this embodiment (B-2), as described above, the UE selects the UL TX beam from the reference RS (in this case SRS) index signaled via the value of the TCI-state field.

In the examples presented in this disclosure, the TCI state (e.g., whether to follow the unified TCI state) of a PDCCH channel and channels associated with the PDCCH channel can be determined based on: (1) the CORESET the PDCCH is received in. i.e., the TCI state associated (configured or activated or specified by specifications) with the CORESET associated with the search space of the PDCCH; (2) the search space of the PDCCH. i.e., the TCI state associated (configured or activated or specified by specifications) with the search space of the PDCCH; and/or (3) the RNTI used to scramble the CRC of the PDCCH. i.e., the TCI state associated (configured or activated or specified by specifications) with the RNTI used to scramble the CRC of the PDCCH.

Examples of DL and UL channels associated with the PDCCH can include: (1) the PDCCH; (2) a PDSCH channel scheduled by a DL assignment in the PDCCH channel; (3) a PDSCH channel activated, or that can be released, by the PDCCH channel; (4) a PUCCH channel multiplexing the HARQ-ACK response of a PDSCH channel scheduled by a DL assignment in the PDCCH channel; (5) a PUCCH channel multiplexing the HARQ-ACK response of a PDSCH channel activated, or that can be released, by the PDCCH channel; (6) a PUSCH channel scheduled by an UL grant in the PDCCH channel; (7) a PUSCH channel of Configured Grant Type-2 which can be activated, or released by the PDCCH; and/or (8) PRACH transmission in response to a PDCCH order received by the UE that triggers a contention free random access procedure, the PDCCH order is transmitted/received the PDCCH channel.

In the examples of the present disclosure, a UE can be configured with Rel-17 TCI states, i.e., TCIState in dl-OrJoint-TCIStateList and/or TCI-UL-State. And/or the UE can be configured to support the unified TCI state framework introduced in Rel-17. And/or the UE is designed to follow the unified TCI state framework introduced in Rel-17 without further configuration. A UE can be provided a TCI state(s) from the Rel-17 TCI states, i.e., TCIState in dl-OrJoint-TCIStateList and/or TCI-UL-State, as a unified (master or main or indicated) TCI state(s) (a joint TCI state or a DL TCI state and an UL TCI state).

For channels that follow the unified (master or main or indicated) TCI state, applying (or following) the unified (master or main or indicated) TCI states to these channels includes: (1) the DM-RS antenna port associated with DL channels is quasi co-located with reference signals provided by the unified (master or main or indicated) TCI state; and/or (2) the DM-RS antenna port associated with UL channels uses a spatial filter provided by the unified (master or main or indicated) TCI state.

In one example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C is associated with both UE-dedicated and non-UE-dedicated reception on PDCCH.

In one example CORESET A, CORESET B and CORESET C exclude CORESET 0. In another example CORESET A, CORESET B and CORESET C include CORESET 0.

In one example, a UE is configured a UE-specific search space (USS) set. A UE is further configured a CORESET. The USS set is associated with the CORESET (e.g., CORESET A). The TCI state of the CORESET is the unified (master or main or indicated) TCI state. There is no MAC CE activation of TCI states for a CORESET associated with the USS set.

In one example, a UE is configured a UE-specific search space (USS) set and/or Type3-PDCCH CSS set. A UE is further configured a CORESET. The USS set and/or Type3-PDCCH CSS set is associated with the CORESET (e.g., CORESET A). The TCI state of the CORESET is the unified (master or main or indicated) TCI State. There is no MAC CE activation of TCI states for a CORESET associated with the USS set and/or Type3-PDCCH CSS set.

In one example, the TCI state of the CORESET associated with USS set (or USS set and/or Type3-PDCCH CSS set) (e.g., CORESET A) is the unified (master or main or indicated) TCI state by system specification. e.g., any CORESET associated with an USS set (or USS set and/or Type3-PDCCH CSS set) follows the unified (master or main or indicated) TCI state.

In another example, the TCI state of the CORESET associated with USS set (or USS set and/or Type3-PDCCH CSS set) (e.g., CORESET A) is the unified (master or main or indicated) TCI state by configuration.

In one example, a CORESET is configured by RRC configuration to follow the unified (master or main or indicated) TCI state. e.g., as illustrated herein. If not configured to follow the unified (master or main or indicated) TCI state, the CORESET is configured and/or activated a TCI state by RRC and/or MAC CE signaling and/or quasi-co-lotion and/or spatial filter identified during a random access procedure (e.g., not initiated by a PDCCH order that triggers a contention-free random access).

In another example, a CORESET is configured/updated by a MAC CE to follow the unified (master or main or indicated) TCI state. e.g., as illustrated herein. If not configured or activated or updated to follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of: (1) in case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state; (2) in case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state; and/or (3) in case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include: (1) in case of joint TCI state indication, wherein a same beam is used for DL and UL channels, a joint TCI state; (2) in case of separate TCI state indication, wherein different beams are used for DL and UL channels, a DL TCI state; (3) in case of separate TCI state indication, wherein different beams are used for DL and UL channels, an UL TCI state; and/or (4) in case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE actives more than one codepoint, a unified (master or main or indicated) TCI state codepoint is indicated to the UE by DL related DCI with or without a DL assignment.

The DL TCI state or Joint TCI indicated to the UE as a unified (master or main or indicated) TCI state is applied to: (1) the PDCCH channel in a search space associated with the CORESET; and/or (2) DL channels (e.g., PDSCH) associated with a DCI in a PDCCH transmitted in a search space associated with the CORESET. This can include for example: (i) PDSCH with a DL assignment in (scheduled by) a DCI in a PDCCH transmitted in a search space associated with the CORESET; and/or (ii) PDSCH for SPS activated in a DCI in a PDCCH transmitted in a search space associated with the CORESET.

The UL TCI state or joint TCI indicated to the UE as a unified (master or main or indicated) TCI state is applied to: (1) UL channels (e.g., PUSCH or PUCCH) associated with a DCI in a PDCCH transmitted in a search space associated with the CORESET. This can include for example: (i) PUSCH with an UL grant in a DCI in a PDCCH transmitted in a search space associated with the CORESET; (ii) PUCCH in response to a PDSCH associated with a DL assignment in a DCI in a PDCCH transmitted in a search space associated with the CORESET; and/or (iii) PUSCH with configured grant activated by a DCI in a PDCCH transmitted in a search space associated with the CORESET.

Figure 13A:
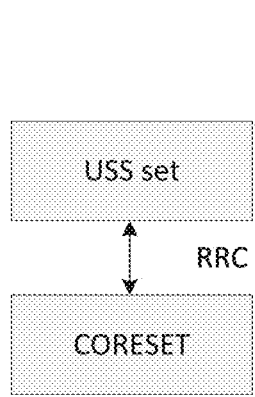
FIG. 13A illustrates an example of TCI state of the CORESET according to embodiments of the present disclosure.

FIG. 13A illustrates an example of TCI state of the CORESET 1300 according to embodiments of the present disclosure. An embodiment of the TCI state of the CORESET 1300 shown in FIG. 13A is for illustration only.

FIG. 13A illustrates an example, where there is no MAC CE activation of the TCI state for the CORESET associated with USS set (e.g., CORESET A). The TCI state of the CORESET is determined by configuration or system specification. For example, the CORESET associated with USS set follows the unified (master or main or indicated) TCI state by system specification and/or configuration. DL and UL channels associated with a DCI in a PDCCH transmitted in USS set follow the unified (master or main or indicated) TCI State.

Figure 13B:
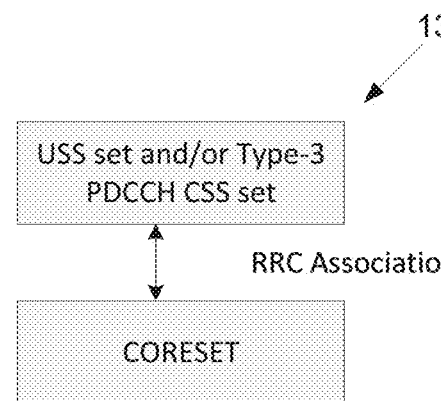
FIG. 13B illustrates another example of TCI state of the CORESET according to embodiments of the present disclosure.

FIG. 13B illustrates another example of TCI state of the CORESET 1305 according to embodiments of the present disclosure. An embodiment of the TCI state of the CORESET 1305 shown in FIG. 13B is for illustration only.

FIG. 13B illustrates an example, where there is no MAC CE activation of the TCI state for the CORESET associated with USS set and/or Type3-PDCCH CSS set (e.g., CORESET A). The TCI state of the CORESET is determined by configuration or system specification. For example, the CORESET associated with USS set and/or Type-3 PDCCH set follows the unified (master or main or indicated) TCI state by system specification and/or configuration. DL and UL channels associated with a DCI in a PDCCH transmitted in USS set and/or Type-3 PDCCH set follow unified (master or main or indicated) TCI State.

Figure 13C:
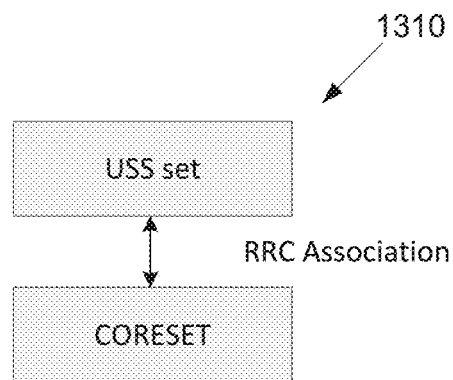
FIG. 13C illustrates yet another example of TCI state of the CORESET according to embodiments of the present disclosure.

FIG. 13C illustrates yet another example of TCI state of the CORESET 1310 according to embodiments of the present disclosure. An embodiment of the TCI state of the CORESET 1310 shown in FIG. 13C is for illustration only.

FIG. 13C illustrates an example, where MAC CE activation can configure the TCI state of the CORESET associated with the USS set (e.g., CORESET A) to follow the unified (master or main or indicated) TCI state. A codepoint can be reserved for the unified (master or main or indicated) TCI state as described herein. For example, the CORESET associated with USS set follows the unified (master or main or indicated) TCI state by configuration (MAC CE). DL and UL channels associated with a DCI in a PDCCH transmitted in USS set follow unified (master or main or indicated) TCI State.

Figure 13D:
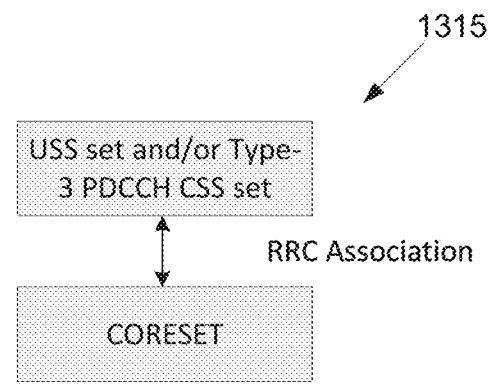
FIG. 13D illustrates yet another example of TCI state of the CORESET according to embodiments of the present disclosure.

FIG. 13D illustrates yet another example of TCI state of the CORESET 1315 according to embodiments of the present disclosure. An embodiment of the TCI state of the CORESET 1315 shown in FIG. 13D is for illustration only.

FIG. 13D illustrates an example, where MAC CE activation can configure the TCI state of the CORESET associated with the USS set and/or Type3-PDCCH CSS set (e.g., CORESET A) to follow the unified (master or main or indicated) TCI state. A codepoint can be reserved for the unified (master or main or indicated) TCI state as described herein. For example, the CORESET associated with USS set and/or Type-3 PDCCH CSS set follows the unified (master or main or indicated) TCI state by configuration (MAC CE). DL and UL channels associated with a DCI in a PDCCH transmitted in USS set and/or Type-3 PDCCH CSS set follow unified (master or main or indicated) TCI State In another example, the unified (master or main or indicated) TCI state is directly associated with the USS set (or USS set and/or Type3-PDCCH CSS set) (e.g., CORESET A)

by system specification and/or configuration (RRC configuration and/or MAC CE configuration). There is no TCI state associated with a CORESET that is associated with the USS set (or USS set and/or Type3-PDCCH CSS set). This is illustrated in FIG. 13E and FIG. 13F.

Figure 13E:
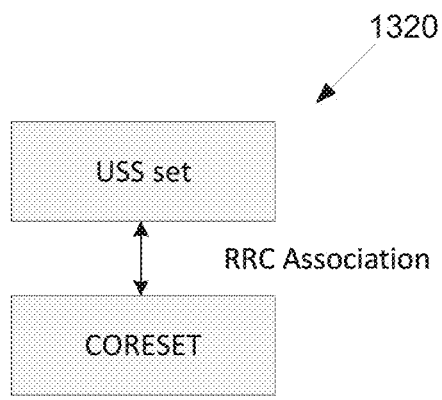
FIG. 13E illustrates yet another example of TCI state of the CORESET according to embodiments of the present disclosure.

FIG. 13E illustrates yet another example of TCI state of the CORESET 1320 according to embodiments of the present disclosure. An embodiment of the TCI state of the CORESET 1320 shown in FIG. 13E is for illustration only. In these examples, there is no TCI State for CORESET associated with USS set. Here, USS set follows the unified (master or main or indicated) TCI state by system specification and/or configuration and DL and UL channels associated with a DCI in a PDCCH transmitted in USS set follow unified (master or main or indicated) TCI State.

Figure 13F:
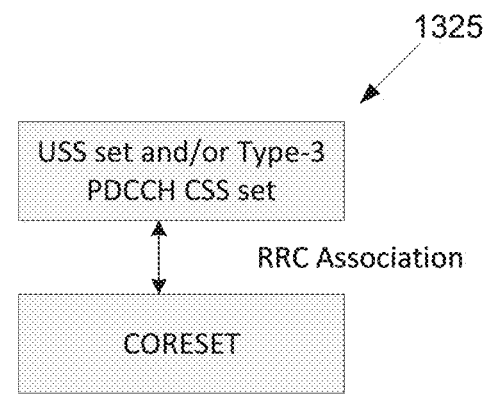
FIG. 13F illustrates yet another example of TCI state of the CORESET according to embodiments of the present disclosure.

FIG. 13F illustrates yet another example of TCI state of the CORESET 1325 according to embodiments of the present disclosure. An embodiment of the TCI state of the CORESET 1325 shown in FIG. 13F is for illustration only. In these examples, there is no TCI State for CORESET associated with USS set and/or Type-3 PDCCH CSS set. Here, the USS set and/or Type-3 PDCCH CSS set follows the unified (master or main or indicated) TCI state by system specification and/or configuration and DL and UL channels associated with a DCI in a PDCCH transmitted in USS set and/or Type-3 PDCCH CSS set follow unified (master or main or indicated) TCI State.

In another example, the unified (master or main or indicated) TCI state is directly associated with the USS set (e.g., CORESET A or CORESET C) by system specification and/or configuration (RRC configuration and/or MAC CE configuration). The CORESET associated with the USS set can still be activated a TCI state, but the TCI state of the CORESET associated with the USS set is not used for transmissions/receptions of channels associated with the USS set. If the CORESET associated with the USS set is also associated with a CSS set (e.g., CORESET C), the TCI state activated for the CORESET can be used for transmissions/receptions of channels associated with the CSS set. This is illustrated in FIG. 13F.

FIG. 13G illustrates yet another example of TCI state of the CORESET 1330 according to embodiments of the present disclosure. An embodiment of the TCI state of the CORESET 1330 shown in FIG. 13G is for illustration only. In these examples, the CORESET can be activated TCI state for CSS set associated with CORESET, but not USS set. Here, the USS set follows the unified (master or main or indicated) TCI state by system specification and/or configuration and DL and UL channels associated with a DCI in a PDCCH transmitted in USS set follow unified (master or main or indicated) TCI State.

FIG. 13H illustrates yet another example of TCI state of the CORESET 1335 according to embodiments of the present disclosure. An embodiment of the TCI state of the CORESET 1335 shown in FIG. 13H is for illustration only. In these examples, the CORESET can be activated TCI state for CSS set other than Type-3 PDCCH CSS associated with CORESET, but not USS set and/or Type-3 PDCCH CSS set. Here, the USS set and/or Type-3 PDCCH CSS set follows the unified (master or main or indicated) TCI state by system specification and/or configuration and DL and UL channels associated with a DCI in a PDCCH transmitted in USS set and/or Type-3 PDCCH CSS set follow unified (master or main or indicated) TCI State.

In another example, the unified (master or main or indicated) TCI state is directly associated with USS set and/or Type3-PDCCH CSS set (e.g., CORESET A or CORESET C) by system specification and/or configuration (RRC configuration and/or MAC CE configuration). The CORESET associated with USS set and/or Type3-PDCCH CSS set can still be activated a TCI state, but the TCI state of the CORESET associated with USS set and/or Type3-PDCCH CSS set is not used for transmissions/receptions of channels associated with USS set and/or Type3-PDCCH CSS set. If the CORESET associated with the USS set and/or Type3-PDCCH CSS set is also associated with a CSS set other than Type3-PDCCH CSS set (e.g., CORESET C), the TCI state activated for the CORESET can be used for transmissions/receptions of channels associated with the CSS set other than Type3-PDCCH CSS set. This is illustrated in FIG. 13H.

In another example, the unified (master or main or indicated) TCI state is used for channels associated with a PDCCH with a CRC scramble by: A C-RNTI, an MCS-C-RNTI, a CS-RNTI, SP-CSI-RNTI, SL-RNTI, SL-CS-RNTI, or SL Semi-Persistent Scheduling V-RNTI. This can be by system specification and/or by configuration (RRC configuration and/or MAC CE configuration). For example, the RNTI(s) that follow the unified (master or main or indicated) TCI state are specified in the system specifications and/or configured or updated by RRC signaling and/or MAC CE signaling.

Examples of association with PDCCH can include: (1) a PDCCH channel with a CRC scrambled by one of the aforementioned RNTIs; (2) a PDSCH channel scheduled by a DL assignment in a PDCCH channel with a CRC scrambled by one of the aforementioned RNTIs; (3) a PDSCH channel activated, or that can be released, by PDCCH channel with a CRC scrambled by one of the aforementioned RNTIs; (4) a PUCCH channel multiplexing the HARQ-ACK response of a PDSCH channel scheduled by a DL assignment in a PDCCH channel with a CRC scrambled by one of the aforementioned RNTIs; (5) a PUCCH channel multiplexing the HARQ-ACK response of a PDSCH channel activated, or that can be released, by PDCCH channel with a CRC scrambled by one of the aforementioned RNTIs; (6) PUSCH channel scheduled by an UL grant in a PDCCH channel with a CRC scrambled by one of the aforementioned RNTIs; (7) PUSCH channel of Configured Grant Type-2 which can be activated, or released by a CRC scrambled by one of the aforementioned RNTIs; (8) PRACH transmission in response to a PDCCH order received by the UE that triggers a contention free random access procedure, the PDCCH order has a CRC scrambled by one of the aforementioned RNTIs; and/or (9) a PUCCH channel multiplexing the HARQ-ACK response of a SL transmission(s) scheduled by a PDCCH channel with a CRC scrambled by one of the aforementioned RNTIs.

If a PDCCH is received in a search space (e.g., USS set (or USS set and/or Type3-PDCCH CSS set)) associated with a CORESET (e.g., CORESET A), and the CORESET is activated a TCI state, the activated TCI state does not apply to channels associated with a PDCCH having a CRC scrambled with, e.g., one of the aforementioned RNTIs, instead the unified (master or main or indicated) TCI state is used. This is illustrated in FIG. 13I.

FIG. 13I illustrates yet another example of TCI state of the CORESET 1340 according to embodiments of the present disclosure. An embodiment of the TCI state of the CORESET 1340 shown in FIG. 13I is for illustration only. In these examples, the CORESET can be activated TCI state for other channels associated with a PDCCH scrambled with, e.g., a different RNTIs. Here, the PDCCH with CRC scrambled with, e.g., C-RNTI, MCS-C-RNTI, CS-RNTI, SP-CSI-RNTI, SL-RNTI, SL-CS-RNTI, or SL Semi-Persistent Scheduling V-RNTI follows the unified (master or main or indicated) TCI state by system specification and/or configuration. The DL and UL channels associated with such PDCCH follow unified (master or main or indicated) TCI State.

In another example, the unified (master or main or indicated) TCI state is used for channels configured by UE dedicated RRC configuration for reception and/or transmission, e.g., (1) PUSCH channel of configured grant Type-1, (2) PUSCH channel of configured grant Type-2, (3) PDSCH semi-persistent-scheduled (SPS) channel, (4) PUCCH configured for channel state information (CSI) reporting; and/or (5) PUCCH configured for scheduling request (SR) reporting.

In one example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C is associated with both UE-dedicated and non-UE-dedicated reception on PDCCH.

In one example CORESET A, CORESET B and CORESET C exclude CORESET 0. In another example CORESET A, CORESET B and CORESET C include CORESET 0.

In one example, CORESET C is associated with inter-cell and intra-cell beam management operation.

In another example, CORESET C is associated with only intra-cell beam management operation In one example, a UE is configured a common search space (CSS) set. A UE is further configured a UE-specific search space (USS) set. A UE is further configured a CORESET. The USS set is associated with the CORESET. The CSS set is associated with the CORESET (e.g., CORESET C). The TCI state of the CORESET is the unified (master or main or indicated) TCI State. There is no MAC CE activation of TCI states for a CORESET associated with the USS set. In one example, a UE is configured a common search space (CSS) set. A UE is further configured a UE-specific Search Space (USS) set. A UE is further configured a CORESET. The USS set and/or Type3-PDCCH CSS set is associated with the CORESET. The CSS set other than Type3-PDCCH CSS set is associated with the CORESET (e.g., CORESET C). The TCI state of the CORESET is the unified (master or main or indicated) TCI State. There is no MAC CE activation of TCI states for a CORESET associated with the USS set or Type3-PDCCH CSS set.

In one example, the TCI state of the CORESET (e.g., CORESET C) associated with USS set (or USS set and/or Type3-PDCCH CSS) is the unified (master or main or indicated) TCI state by system specification. e.g., any CORESET associated with an USS set (or USS set and/or Type3-PDCCH CSS) follows the unified (master or main or indicated) TCI state.

In another example, the TCI state of the CORESET (e.g., CORESET C) associated with USS (or USS set and/or Type3-PDCCH CSS) set is the unified (master or main or indicated) TCI state by configuration.

In one example, a CORESET is configured by RRC configuration to follow the unified (master or main or indicated) TCI state. e.g., as illustrated herein. If not configured to follow the unified (master or main or indicated) TCI state, the CORESET is configured and/or activated a TCI state by RRC and/or MAC CE signaling and/or quasi-co-lotion and/or spatial filter identified during a random access procedure (e.g., not initiated by a PDCCH order that triggers a contention-free random access).

In another example, a CORESET is configured/updated by a MAC CE to follow the unified (master or main or indicated) TCI state. e.g., as illustrated herein. If not configured or activated or updated to follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of: (1) in case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state; (2) in case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state; and/or (3) in case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include: (1) in case of joint TCI state indication, wherein a same beam is used for DL and UL channels, a joint TCI state; (2) in case of separate TCI state indication, wherein different beams are used for DL and UL channels, a DL TCI state; (3) in case of separate TCI state indication, wherein different beams are used for DL and UL channels, an UL TCI state; and/or (4) in case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE actives more than one codepoint, a unified (master or main or indicated) TCI state codepoint is indicated to the UE by DL related DCI with or without a DL assignment.

The DL TCI state or Joint TCI indicated to the UE as a unified (master or main or indicated) TCI state is applied to: (1) the PDCCH channel in a search space associated with the CORESET; and/or (2) DL channels (e.g., PDSCH) associated with a DCI in a PDCCH transmitted in a search space associated with the CORESET. This can include for example: (i) PDSCH with a DL assignment in (scheduled by) a DCI in a PDCCH transmitted in a search space associated with the CORESET; and/or (ii) PDSCH for SPS activated in a DCI in a PDCCH transmitted in a search space associated with the CORESET.

A DL channel assigned by or associated with a DCI in a CSS set can include: (1) a channel carrying system information with a DL assignment carried by a DCI in PDCCH having a CRC scrambled by SI-RNTI and transmitted in Type0-PDCCH CSS set; (2) a channel carrying other system information with a DL assignment carried by a DCI in PDCCH having a CRC scrambled by SI-RNTI and transmitted in Type0A-PDCCH CSS set; (3) a channel carrying paging or short messages with a DL assignment carried by a DCI in PDCCH having a CRC scrambled by P-RNTI and transmitted in Type2-PDCCH CSS set; (4) a channel associated with the RACH procedure with a DL assignment carried by a DCI in PDCCH having a CRC scrambled by RA-RNTI or TC-RNTI and transmitted in Type1-PDCCH CSS set; (5) a Channel transmitted in Type3-PDCCH CSS set with CRC scrambled by one of: INT-RNTI, SFI-RNTI, TPC-PUSCH-RNTI, TPC-PUCCH-RNTI, TPC-SRS-RNTI or CI-RNTI, at least in cells other than the primary cell; and/or (6) a channel with a DL assignment carried by a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In this example, a non-UE dedicated DL channel follows the TCI state of a UE dedicated DL channel.

The UL TCI state or Joint TCI indicated to the UE as a unified (master or main or indicated) TCI state is applied to: (1) UL channels (e.g., PUSCH or PUCCH) associated with a DCI in a PDCCH transmitted in a search space associated with the CORESET. This can include for example: (i) PUSCH with an UL grant in a DCI in a PDCCH transmitted in a search space associated with the CORESET; (ii) PUCCH in response to a PDSCH associated with a DL assignment in a DCI in a PDCCH transmitted in a search space associated with the CORESET; and/or (iii) PUSCH with configured grant activated by a DCI in a PDCCH transmitted in a search space associated with the CORESET.

A UL channel granted by or associated with a DCI in a CSS set can include: (1) a channel associated with the RACH procedure with a UL grant/DL assignment carried by a DCI in PDCCH having a CRC scrambled by TC-RNTI and transmitted in Type1-PDCCH CSS set; and/or (2) an UL channel associated with a DCI in PDCCH having a CRC scrambled by C-RNTI, MCS-C-RTNTI, SP-CSI-RNTI, CS-RNTI, SL-RNTI, SL-CS-RNTI, or SL Semi-Persistent Scheduling V-RNTI and transmitted in a common search space.

In this example, a non-UE dedicated UL channel follows the TCI state of a UE dedicated UL channel.

FIG. 14A illustrates yet another example of TCI state of the CORESET 1400 according to embodiments of the present disclosure. An embodiment of the TCI state of the CORESET 1400 shown in FIG. 14A is for illustration only.

FIG. 14A illustrates an example, where there is no MAC CE activation of the TCI state for the CORESET associated with at least USS set (e.g., CORESET C). The TCI state of the CORESET is determined by configuration or system specification.

Here, the same CORESET is associated with USS set and Type0/0A/1/2/3 PDCCH CSS sets. For example, the CORESET associated with USS set follows the unified (master or main or indicated) TCI state by system specification and/or configuration, and DL and UL channels associated with a DCI in a PDCCH transmitted in USS set follow unified TCI State.

FIG. 14B illustrates yet another example of TCI state of the CORESET 1405 according to embodiments of the present disclosure. An embodiment of the TCI state of the CORESET 1405 shown in FIG. 14B is for illustration only.

FIG. 14B illustrates an example, where there is no MAC CE activation of the TCI state for the CORESET associated with at least USS set and/or Type3-PDCCH CSS (e.g., CORESET C). The TCI state of the CORESET is determined by configuration or system specification. For example, the same CORESET is associated with USS set and Type0/0A/1/2 PDCCH CSS sets. For example, the CORESET associated with USS set and/or Type-3 PDCCH CSS Set follows the unified (master or main or indicated) TCI state by system specification and/or configuration and the DL and UL channels associated with a DCI in a PDCCH transmitted in USS set and/or Type-3 PDCCH CSS Set follow unified TCI State.

FIG. 14C illustrates yet another example of TCI state of the CORESET 1410 according to embodiments of the present disclosure. An embodiment of the TCI state of the CORESET 1410 shown in FIG. 14C is for illustration only.

FIG. 14C illustrates an example, where MAC CE activation can configure the TCI state of the CORESET associated with at least the USS set (e.g., CORESET C) to follow the unified (master or main or indicated) TCI state. A codepoint can be reserved for the unified (master or main or indicated) TCI state as described herein. For example, the same CORESET associated with USS set and Type0/0A/1/2/3 PDCCH CSS sets. For example, the CORESET associated with USS set follows the unified (master or main or indicated) TCI state by configuration (MAC CE) and the DL and UL channels associated with a DCI in a PDCCH transmitted in USS set follow unified (master or main or indicated) TCI State.

Figure 14D:
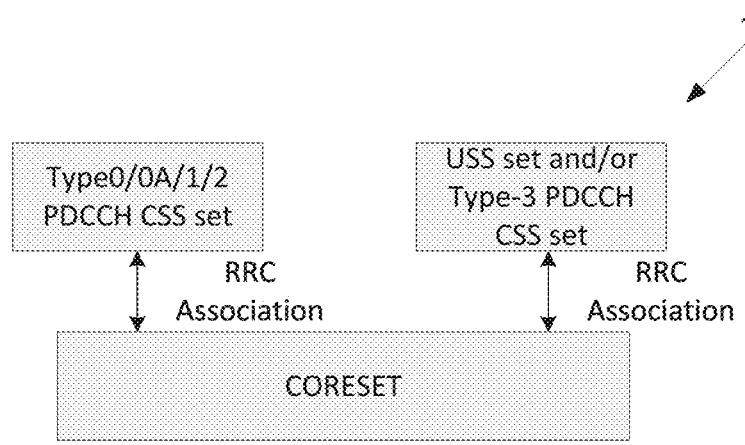
FIG. 14D illustrates yet another example of TCI state of the CORESET according to embodiments of the present disclosure.

FIG. 14D illustrates yet another example of TCI state of the CORESET 1415 according to embodiments of the present disclosure. An embodiment of the TCI state of the CORESET 1415 shown in FIG. 14D is for illustration only.

FIG. 14D illustrates an example, where MAC CE activation can configure the TCI state of the CORESET associated with at least the USS set and/or Type3-PDCCH CSS set (e.g., CORESET C) to follow the unified (master or main or indicated) TCI state. A codepoint can be reserved for the unified (master or main or indicated) TCI state as described herein. For example, the same CORESET is associated with USS set and Type0/0A/1/2 PDCCH CSS sets. Here, the CORESET associated with USS set and/or Type-3 PDCCH CSS set follows the unified (master or main or indicated) TCI state by configuration (MAC CE) and DL and UL channels associated with a DCI in a PDCCH transmitted in USS set and/or Type-3 PDCCH CSS set follow unified (master or main or indicated) TCI State.

In another example, a UE is configured a common search space (CSS) set. A UE is further configured a UE-specific Search Space (USS) set. A UE is further configured a CORESET. The unified (master or main or indicated) TCI state is directly associated with the USS set by system specification and/or configuration (RRC configuration and/or MAC CE configuration). The CORESET associated with the USS set and CSS set (e.g., CORESET C) is activated a TCI state, but the TCI state of the CORESET is not used for transmissions/receptions of channels associated with the USS set. The TCI state activated for the CORESET can be used for transmissions/receptions of channels associated with the CSS set.

Figure 14E:
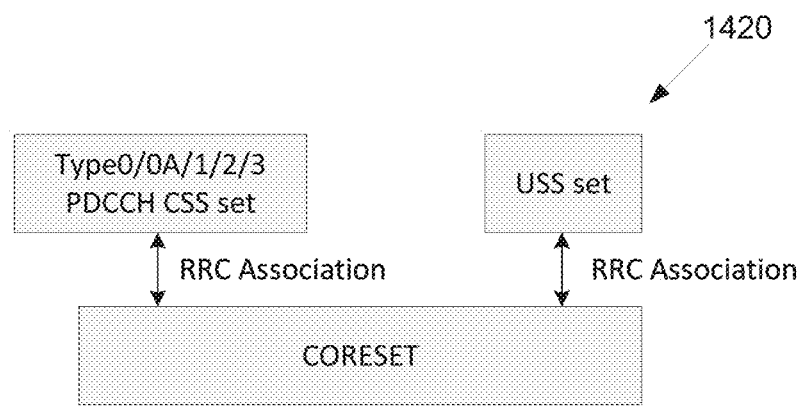
FIG. 14E illustrates yet another example of TCI state of the CORESET according to embodiments of the present disclosure.

FIG. 14E illustrates yet another example of TCI state of the CORESET 1420 according to embodiments of the present disclosure. An embodiment of the TCI state of the CORESET 1420 shown in FIG. 14E is for illustration only.

This is illustrated in FIG. 14E. In a variant of this example, the CORESET can be configured by RRC whether the TCI state of the CORESET, for CSS set follows the unified (master or main or indicated) TCI state. If configured, the unified (master or main or indicated) TCI state is used for the CSS set as well as the USS set. If not configured, a TCI state is configured and/or activated by RRC and/or MAC CE signaling for the CSS set, and the unified (master or main or indicated) TCI state is used for the USS set. For example, the TCI state follows the TCI state of CORESET for channels associated with Type 0/0A/1/2/3 PDCCH CSS sets. Here, USS set follows the unified (master or main or indicated) TCI state by system specification and/or configuration and the DL and UL channels associated with a DCI in a PDCCH transmitted in USS set follow unified (master or main or indicated) TCI State.

In another example, a UE is configured a common search space (CSS) set. A UE is further configured a UE-specific search space (US S) set. A UE is further configured a CORESET. The unified (master or main or indicated) TCI state is directly associated with the USS set and/or Type3 PDCCH CSS set by system specification and/or configuration (RRC configuration and/or MAC CE configuration). The CORESET associated with the (USS set and/or Type3-PDCCH CSS) and (CSS set other than Type3-PDCCH CSS set) (e.g., CORESET C) is activated a TCI state, but the TCI state of the CORESET is not used for transmissions/receptions of channels associated with the USS set and/or Type3-PDCCH CSS set. The TCI state activated for the CORESET can be used for transmissions/receptions of channels associated with the CSS set other than Type3-PDCCH CSS set.

Figure 14F:
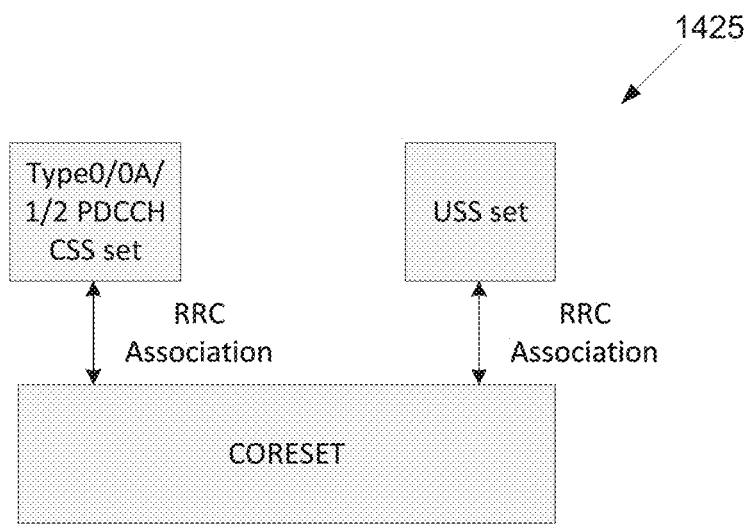
FIG. 14F illustrates yet another example of TCI state of the CORESET according to embodiments of the present disclosure.

This is illustrated in FIG. 14F. In a variant of this example, the CORESET can be configured by RRC whether the TCI state of the CORESET, for CSS set other than Type3-PDCCH CSS set follows the unified (master or main or indicated) TCI state. If configured, the unified (master or main or indicated) TCI state is used for the CSS set other than Type3-PDCCH CSS set as well as the USS set and/or Type3 PDCCH CSS. If not configured, a TCI state is configured and/or activated by RRC and/or MAC CE and/or quasi-co-lotion and/or spatial filter identified during a random access procedure (e.g., not initiated by a PDCCH order that triggers a contention-free random access) for the CSS set other than Type3-PDCCH CSS set, and the unified (master or main or indicated) TCI state is used for the USS set and/or Type3 PDCCH CSS. Here, the TCI state follows the TCI state of CORESET for channels associated with Type 0/0A/1/2 PDCCH CSS sets. For example, the USS set follows the unified (master or main or indicated) TCI state by system specification and/or configuration and the DL and UL channels associated with a DCI in a PDCCH transmitted in USS set follow unified (master or main or indicated) TCI State.

FIG. 14F illustrates yet another example of TCI state of the CORESET 1425 according to embodiments of the present disclosure. An embodiment of the TCI state of the CORESET 1425 shown in FIG. 14F is for illustration only.

In another example, the unified (master or main or indicated) TCI state is used for channels associated with a PDCCH with a CRC scramble by: A C-RNTI, an MCS-C-RNTI, a CS-RNTI, SP-CSI-RNTI, SL-RNTI, SL-CS-RNTI, or SL Semi-Persistent Scheduling V-RNTI. This can be by system specification and/or by configuration (RRC configuration and/or MAC CE configuration). For example, the RNTI(s) that follow the unified (master or main or indicated) TCI state are specified in the system specifications and/or configured or updated by RRC signaling and/or MAC CE signaling.

Examples of association with PDCCH can include: (1) a PDCCH channel with a CRC scrambled by one of the aforementioned RNTIs; (2) a PDSCH channel scheduled by a DL assignment in a PDCCH channel with a CRC scrambled by one of the aforementioned RNTIs; (3) a PDSCH channel activated, or that can be released, by PDCCH channel with a CRC scrambled by one of the aforementioned RNTIs; (4) a PUCCH channel multiplexing the HARQ-ACK response of a PDSCH channel scheduled by a DL assignment in a PDCCH channel with a CRC scrambled by one of the aforementioned RNTIs; (5) a PUCCH channel multiplexing the HARQ-ACK response of a PDSCH channel activated, or that can be released, by PDCCH channel with a CRC scrambled by one of the aforementioned RNTIs; (6) PUSCH channel scheduled by an UL grant in a PDCCH channel with a CRC scrambled by one of the aforementioned RNTIs; (7) PUSCH channel of Configured Grant Type-2 which can be activated, or released by a CRC scrambled by one of the aforementioned RNTIs; (8) PRACH transmission in response to a PDCCH order received by the UE that triggers a contention free random access procedure, the PDCCH order has a CRC scrambled by one of the aforementioned RNTIs; and/or (9) a PUCCH channel multiplexing the HARQ-ACK response of a SL transmission(s) scheduled by a PDCCH channel with a CRC scrambled by one of the aforementioned RNTIs.

If a PDCCH is received in a search space (e.g., USS set or CSS set) associated with a CORESET (e.g., CORESET C), and the CORESET is activated a TCI state the activated TCI state does not apply to channels associated with a PDCCH having a CRC scrambled with, e.g., one of the aforementioned RNTIs, instead the unified (master or main or indicated) TCI state is used. This is illustrated in FIG. 14G and FIG. 14H.

FIG. 14G illustrates yet another example of TCI state of the CORESET 1430 according to embodiments of the present disclosure. An embodiment of the TCI state of the CORESET 1430 shown in FIG. 14G is for illustration only.

In these examples, the CORESET can be activated TCI state for other channels associated with a PDCCH scrambled with, e.g., different RNTIs.

For example, for a PDCCH with a CRC scrambled with, e.g., different RNTI, DL and UL channels associated with such PDCCH follows the TCI State activated for a CORESET associated with the search space set. For example, for a PDCCH with a CRC scrambled with, e.g., C-RNTI, MCS-C-RNTI, CS-RNTI, SP-CSI-RNTI, SL-RNTI, SL-CS-RNTI, or SL Semi-Persistent Scheduling V-RNTI follows the unified TCI state by system specification and/or configuration. The DL and UL channels associated such PDCCH can follow unified (master or main or indicated) TCI State.

FIG. 14H illustrates yet another example of TCI state of the CORESET 1435 according to embodiments of the present disclosure. An embodiment of the TCI state of the CORESET 1435 shown in FIG. 14H is for illustration only.

In these examples, the CORESET can be activated TCI state for other channels associated with a PDCCH scrambled with, e.g., different RNTIs. For example, for a PDCCH with a CRC scrambled with, e.g., different RNTI. The DL and UL channels associated with such PDCCH follows the TCI State activated for a CORESET associated with the search space set.

In one example, CORESET A is a CORESET associated with only USS set, CORESET B is a CORESET associated with only CSS sets, and CORSET C is a CORESET associated with USS set and CSS set.

In another example, CORESET A is a CORESET associated with only USS set and/or Type3-PDCCH CSS set, CORESET B is a CORESET associated with only CSS set other than Type3-PDCCH CSS set, and CORSET C is a CORESET associated with (USS set and/or Type3-PDCCH CSS set) and (CSS set other than Type3-PDCCH CSS set). CORESET C is associated with both UE-dedicated and non-UE-dedicated reception on PDCCH.

In one example CORESET A, CORESET B and CORESET C exclude CORESET 0. In another example CORESET A, CORESET B and CORESET C include CORESET 0.

In one example, a UE is configured a common search space (CSS) set. A UE is further configured a CORESET. The CSS set is associated with the CORESET (e.g., CORESET B). In one example, a UE is configured a common search space (CSS) set other than Type3-PDCCH CSS set. A UE is further configured a CORESET. The CSS set other than Type3-PDCCH CSS set is associated with the CORESET (e.g., CORESET B).

In one example, the TCI state of the CORESET (e.g., CORESET B) does not follow unified (master or main or indicated) TCI state. A MAC CE for TCI state activation activates a MAC CE for the CORESET.

In one example, the MAC CE activates a joint TCI state for the CORESET. The Joint TCI state is used for DL and UL channels associated with a CSS set (or CSS set other than Type3-PDCCH CSS set) associated with the CORESET.

In another example, the MAC CE activates a DL TCI state and UL TCI state. The DL TCI state is used for DL channels associated with a CSS set (or CSS set other than Type3-PDCCH CSS set) associated with the CORESET. The UL TCI state is used for UL channels associated with a CSS set (or CSS set other than Type3-PDCCH CSS set) associated with the CORESET.

Wherein, the TCI state(s) activated for a CORESET can be one of: (1) in case of joint TCI state indication, wherein a same beam is used for DL and UL channels, a joint activated TCI state can be used for DL channels and UL channels associated with the PDCCH received in the CORESET. The DM-RS antenna port associated with DL channels is quasi co-located with reference signals provided by the joint activated TCI state. The DM-RS antenna port associated with UL channels uses a spatial filter provided by the joint activated TCI state. This is according to when the flag in the activation MAC CE indicates joint TCI state; (2) in case of separate TCI state indication, wherein different beams are used for DL and UL channels, a DL TCI state can be used for DL channels associated with the PDCCH received in the CORESET. The DM-RS antenna port associated with DL channels is quasi co-located with reference signals provided by the DL activated TCI state. This is according to when the flag in the activation MAC CE indicates separate TCI states; and/or (3) in case of separate TCI state indication, wherein different beams are used for DL and UL channels, a UL TCI state can be used for UL channels associated with the PDCCH received in the CORESET. The DM-RS antenna port associated with UL channels uses a spatial filter provided by the UL activated TCI state. This is according to when the flag in the activation MAC CE indicates separate TCI states.

In example, the DL TCI state or Joint TCI indicated to the UE as an activated TCI state for the CORESET is applied to: (1) the PDCCH channel in a search space associated with the CORESET; and/or (2) DL channels (e.g., PDSCH) associated with a DCI in a PDCCH transmitted in a search space associated with the CORESET. This can include for example: (i) PDSCH with a DL assignment in (scheduled by) a DCI in a PDCCH transmitted in a search space associated with the CORESET.

In these examples, the UL TCI state or Joint TCI indicated to the UE as an activated TCI state for the CORESET is applied to: (1) UL channels (e.g., PUSCH or PUCCH) associated with a DCI in a PDCCH transmitted in a search space associated with the CORESET. This can include for example: (i) PUSCH with an UL grant in a DCI in a PDCCH transmitted in a search space associated with the CORESET.

In another example, the TCI state of the CORESET (e.g., CORESET B) can be configured to follow the unified (master or main or indicated) TCI state.

In one example, a CORESET (e.g., CORESET B) can be configured by RRC configuration to follow the unified (master or main or indicated) TCI state. e.g., as illustrated herein. If not configured to follow the unified (master or main or indicated) TCI state, the CORESET is configured and/or activated a TCI state by RRC and/or MAC CE signaling and/or quasi-co-lotion and/or spatial filter identified during a random access procedure (e.g., not initiated by a PDCCH order that triggers a contention-free random access).

In another example, a CORESET (e.g., CORESET B) is configured/updated by a MAC CE to follow or not follow the unified (master or main or indicated) TCI state. e.g., as illustrated herein. If not configured or activated or updated to follow the unified (master or main or indicated) TCI state, the CORESET is configured and/or activated a TCI state by MAC CE signaling.

Wherein, a unified (master or main or indicated) TCI state is signaled to the UE. The unified (master or main or indicated) TCI state can be one of: (1) in case of joint TCI state indication, wherein a same beam is used for DL and UL channels, a joint TCI state that can be used at least for UE-dedicated DL channels and UE-dedicated UL channels. The DM-RS antenna port associated with DL channels is quasi co-located with reference signals provided by the joint unified (master or main or indicated) TCI state. The DM-RS antenna port associated with UL channels uses a spatial filter provided by the joint unified (master or main or indicated) TCI state; (2) in case of separate TCI state indication, wherein different beams are used for DL and UL channels, a DL TCI state can be used at least for UE-dedicated DL channels. The DM-RS antenna port associated with DL channels is quasi co-located with reference signals provided by the DL unified (master or main or indicated) TCI state; and/or (3) in case of separate TCI state indication, wherein different beams are used for DL and UL channels, a UL TCI state can be used at least for UE-dedicated UL channels. The DM-RS antenna port associated with UL channels uses a spatial filter provided by the UL unified (master or main or indicated) TCI state.

The unified (master or main or indicated) TCI state is TCI state of UE-dedicated reception on PDSCH/PDCCH or dynamic-grant/configured-grant based PUSCH and all of dedicated PUCCH resources.

A MAC CE can activate one or more unified (master or main or indicated) TCI State codepoints, wherein the unified (master or main or indicated) TCI State codepoint can include: (1) in case of joint TCI state indication, wherein a same beam is used for DL and UL channels, a joint TCI state; (2) in case of separate TCI state indication, wherein different beams are used for DL and UL channels, a DL TCI state; (3) in case of separate TCI state indication, wherein different beams are used for DL and UL channels, an UL TCI state; and/or (4) in case of separate TCI state indication, wherein different beams are used for DL and UL channels, a pair of DL TCI state and UL TCI State.

When the MAC CE (activating unified (master or main or indicated) TCI state codepoints) activates one TCI state codepoint, the codepoint is applied to DL and UL channels. When the MAC CE actives more than one codepoint, a unified (master or main or indicated) TCI state codepoint is indicated to the UE by DL related DCI with or without a DL assignment.

In example, the DL TCI state or joint TCI indicated to the UE as a unified (master or main or indicated) TCI state is applied to (when the CORESET is configured to follow the unified TCI state): (1) the PDCCH channel in a search space associated with the CORESET; and/or (2) DL channels (e.g., PDSCH) associated with a DCI in a PDCCH transmitted in a search space associated with the CORESET. This can include for example: (i) PDSCH with a DL assignment in (scheduled by) a DCI in a PDCCH transmitted in a search space associated with the CORESET; and/or (ii) PDSCH for SPS activated in a DCI in a PDCCH transmitted in a search space associated with the CORESET.

A DL channel assigned by or associated with a DCI in a CSS set can include: (1) a channel carrying system information with a DL assignment carried by a DCI in PDCCH having a CRC scrambled by SI-RNTI and transmitted in Type0-PDCCH CSS set; (2) a channel carrying other system information with a DL assignment carried by a DCI in PDCCH having a CRC scrambled by SI-RNTI and transmitted in Type0A-PDCCH CSS set; (3) a channel carrying paging or short messages with a DL assignment carried by a DCI in PDCCH having a CRC scrambled by P-RNTI and transmitted in Type2-PDCCH CSS set; (4) a channel associated with the RACH procedure with a DL assignment carried by a DCI in PDCCH having a CRC scrambled by RA-RNTI or TC-RNTI and transmitted in Type1-PDCCH CSS set; (5) a channel transmitted in Type3-PDCCH CSS set with CRC scrambled by one of: INT-RNTI, SFI-RNTI, TPC-PUSCH-RNTI, TPC-PUCCH-RNTI, TPC-SRS-RNTI or CI-RNTI, at least in cells other than the primary cell; and/or (6) a channel with a DL assignment carried by a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In this example, a non-UE dedicated DL channel follows the TCI state of a UE dedicated DL channel.

In this example, the UL TCI state or joint TCI indicated to the UE as a unified (master or main or indicated) TCI state is applied to (when the CORESET is configured to follow the unified TCI state): (1) UL channels (e.g., PUSCH or PUCCH) associated with a DCI in a PDCCH transmitted in a search space associated with the CORESET. This can include for example: (i) PUSCH with an UL grant in a DCI in a PDCCH transmitted in a search space associated with the CORESET; (ii) PUCCH in response to a PDSCH associated with a DL assignment in a DCI in a PDCCH transmitted in a search space associated with the CORESET; and/or (3) PUSCH with configured grant activated by a DCI in a PDCCH transmitted in a search space associated with the CORESET.

A UL channel granted by or associated with a DCI in a CSS set can include: (1) a channel associated with the RACH procedure with a UL grant/DL assignment carried by a DCI in PDCCH having a CRC scrambled by TC-RNTI and transmitted in Type1-PDCCH CSS set; and/or (2) an UL channel associated with a DCI in PDCCH having a CRC scrambled by C-RNTI. MCS-C-RTNTI, SP-CSI-RNTI, CS-RNTI, SL-RNTI, SL-CS-RNTI, or SL Semi-Persistent Scheduling V-RNTI and transmitted in a common search space.

In this example, a non-UE dedicated UL channel follows the TCI state of a UE dedicated UL channel.

FIG. 15A illustrates an example of TCI state of the CORESET associated with CSS set 1500 according to embodiments of the present disclosure. An embodiment of the TCI state of the CORESET associated with CSS set 1500 shown in FIG. 15A is for illustration only. In this example, a CORESET not associated with USS set follows MAC CE activated TCI state(s), either Joint TCI state or DL and UL TCI states, for example, a CORESET not configured to follow unified (master or main or indicated) TCI state.

FIG. 15B illustrates another example of TCI state of the CORESET associated with CSS set 1550 according to embodiments of the present disclosure. An embodiment of the TCI state of the CORESET associated with CSS set 1550 shown in FIG. 15B is for illustration only. In this example, CORESET not associated with USS set follows MAC CE activated TCI state(s), either Joint TCI state or DL and UL TCI states, for example, a CORESET not configured to follow unified (master or main or indicated) TCI state.

FIG. 16A illustrates yet another example of TCI state of the CORESET associated with CSS set 1600 according to embodiments of the present disclosure. An embodiment of the TCI state of the CORESET associated with CSS set 1600 shown in FIG. 16A is for illustration only.

FIG. 16A illustrates an example, where there is no MAC CE activation of the TCI state for the CORESET associated with CSS set and configured (e.g., by RRC) to follow unified (master or main or indicated) TCI state. The TCI state of the CORESET is determined, e.g., by RRC configuration. In this example, a CORESET not associated with USS set configured to follow the unified (master or main or indicated) TCI state with configuration by RRC or MAC CE. For example, the CORESET is configured to follow the unified (master or main or indicated) TCI state, and DL and UL channels associated with a DCI in a PDCCH transmitted in CSS set follow unified (master or main or indicated) TCI State.

FIG. 16B illustrates yet another example of TCI state of the CORESET associated with CSS set 1605 according to embodiments of the present disclosure. An embodiment of the TCI state of the CORESET associated with CSS set 1605 shown in FIG. 16B is for illustration only.

FIG. 16B illustrates an example, where there is no MAC CE activation of the TCI state for the CORESET associated with CSS set other Type3-PDCCH CSS set and configured (e.g., by RRC) to follow unified (master or main or indicated) TCI state. The TCI state of the CORESET is determined, e.g., by RRC configuration. In this example, a CORESET not associated with USS set and/or Type3-PDCCH CSS set configured to follow the unified (master or main or indicated) TCI state with configuration by RRC or MAC CE. For example, the CORESET is configured to follow the unified (master or main or indicated) TCI state, and the DL and UL channels associated with a DCI in a PDCCH transmitted in CSS set other than Type3-PDCCH CSS set follow unified (master or main or indicated) TCI State FIG. 16C illustrates yet another example of TCI state of the CORESET associated with CSS set 1610 according to embodiments of the present disclosure. An embodiment of the TCI state of the CORESET associated with CSS set 1610 shown in FIG. 16C is for illustration only.

FIG. 16C illustrates an example, where MAC CE activation can configure the TCI state of the CORESET associated with the CSS set to follow the unified (master or main or indicated) TCI state. A codepoint can be reserved for the unified (master or main or indicated) TCI state as described herein. In this example, the search space associated with CORESET follows the unified (master or main or indicated) TCI state by MAC CE activation. For example, the CORESET is configured to follow the unified (master or main or indicated) TCI state, and the DL and UL channels associated with a DCI in a PDCCH transmitted in CSS set follow unified (master or main or indicated) TCI State.

FIG. 16D illustrates yet another example of TCI state of the CORESET associated with CSS set 1615 according to embodiments of the present disclosure. An embodiment of the TCI state of the CORESET associated with CSS set 1615 shown in FIG. 16D is for illustration only.

FIG. 16D illustrates an example, where MAC CE activation can configure the TCI state of the CORESET associated with the CSS set other than Type3-PDCCH CSS set to follow the unified (master or main or indicated) TCI state. A codepoint can be reserved for the unified (master or main or indicated) TCI state as described herein. In this example, a search space associated with the CORESET follows the unified (master or main or indicated) TCI state by MAC CE activation. For example, the CORESET is configured to follow the unified (master or main or indicated) TCI state, and the DL and UL channels associated with a DCI in a PDCCH transmitted in CSS set other than Type3-PDCCH CSS set follow unified (master or main or indicated) TCI State.

In one example, a UE does not expect a common search space (CSS) set associated with a CORESET not following the unified (master or main or indicated) TCI state by configuration or association with a USS set to receive a DCI on a PDCCH with CRC scramble by C-RNTI, MCS-C-RNTI, SP-CSI-RNTI, CS-RNTI, SL-RNTI, SL-CS-RNTI, or SL semi-persistent scheduling V-RNTI. If a UE receives a DCI on a PDCCH with a CRC scramble by C-RNTI, MCS-C-RNTI, SP-CSI-RNTI, CS-RNTI, SL-RNTI, SL-CS-RNTI, or SL semi-persistent scheduling V-RNTI in a CSS set, the UE expects that the CSS set is associated with a CORSET following the unified (master or main or indicated) TCI state. The set of RNTIs can be determined by system specification and/or by configuration (RRC configuration and/or MAC CE configuration). For example, the RNTI(s) that follow the unified (master or main or indicated) TCI state are specified in the system specifications and/or configured or updated by RRC signaling and/or MAC CE signaling.

In one example, a UE does not expect a common search space (CSS) set other than Type3-PDCCH CSS set associated with a CORESET not following the unified (master or main or indicated) TCI state by configuration or association with an USS set to receive a DCI on a PDCCH with CRC scramble by C-RNTI, MCS-C-RNTI, SP-CSI-RNTI, CS-RNTI, SL-RNTI, SL-CS-RNTI, or SL Semi-Persistent Scheduling V-RNTI. If a UE receives a DCI on a PDCCH with a CRC scramble by C-RNTI, MCS-C-RNTI, SP-CSI-RNTI, CS-RNTI, SL-RNTI, SL-CS-RNTI, or SL Semi-Persistent Scheduling V-RNTI in a CSS set, the UE expects that the CSS set other than Type3-PDCCH CSS set is associated with a CORSET following the unified (master or main or indicated) TCI state. The set of RNTIs can be determined by system specification and/or by configuration (RRC configuration and/or MAC CE configuration). For example, the RNTI(s) that follow the unified (master or main or indicated) TCI state are specified in the system specifications and/or configured or updated by RRC signaling and/or MAC CE signaling.

In another example, the unified (master or main or indicated) TCI state is directly associated with a CSS set of a Type (e.g., Type0-PDCCH CSS set or Type0A-PDCCH CSS set or Type1-PDCCH CSS set or Type2-PDCCH CSS set or Type3-PDCCH CSS set) by system specification and/or configuration (RRC configuration and/or MAC CE configuration). For example, the CSS set Type(s) that follow the unified (master or main or indicated) TCI state are specified in the system specifications and/or configured or updated by RRC signaling and/or MAC CE signaling. There is no TCI state associated with a CORESET that that is associated with the CSS set of a Type (as specified or configured). For example, Type3-PDCCH CSS set can follow the unified (master or main or indicated) TCI state by system specifications. This is illustrated in FIG. 16E.

FIG. 16E illustrates yet another example of TCI state of the CORESET associated with CSS set 1620 according to embodiments of the present disclosure. An embodiment of the TCI state of the CORESET associated with CSS set 1620 shown in FIG. 16E is for illustration only. In this example, no TCI State for the CORESET is associated with CSS set of a Type (0 or 0A or 1 or 2 or 3) For example, a CSS set of a Type (0 or 0A or 1 or 2 or 3) follows the unified (main or master) TCI state by system specification and/or configuration, and the DL and UL channels associated with a DCI in a PDCCH transmitted in of a CSS set of a Type follow unified (master or main or indicated) TCI State.

In another example, the unified (master or main or indicated) TCI state is directly associated with a CSS set of a Type (e.g., Type0-PDCCH CSS set or Type0A-PDCCH CSS set or Type1-PDCCH CSS set or Type2-PDCCH CSS set) by system specification and/or configuration (RRC configuration and/or MAC CE configuration). For example, the CSS set Type(s) that follow the unified (master or main or indicated) TCI state are specified in the system specifications and/or configured or updated by RRC signaling and/or MAC CE signaling. There is no TCI state associated with a CORESET that that is associated with the CSS set of a Type other than Type3-PDCCH CSS (as specified or configured). This is illustrated in FIG. 16F.

FIG. 16F illustrates yet another example of TCI state of the CORESET associated with CSS set 1625 according to embodiments of the present disclosure. An embodiment of the TCI state of the CORESET associated with CSS set 1625 shown in FIG. 16F is for illustration only. In this example, no TCI State for the CORESET is associated with CSS set of a Type (0 or 0A or 1 or 2). For example, CSS set of a Type (0 or 0A or 1 or 2) follows the unified (main or master) TCI state by system specification and/or configuration, and the DL and UL channels associated with a DCI in a PDCCH transmitted in of a CSS set of a Type follow unified (master or main or indicated) TCI State.

In another example, the unified (master or main or indicated) TCI state is directly associated with a CSS set of a first Type (e.g., Type0-PDCCH CSS set or Type0A-PDCCH CSS set or Type1-PDCCH CSS set or Type2-PDCCH CSS set or Type3-PDCCH CSS set) by system specification and/or configuration (RRC configuration and/or MAC CE configuration). The CORESET associated with the CSS set of the first Type can still be activated a TCI state, but the TCI state of the CORESET associated with the CSS set of the first Type is not used for transmissions/receptions of channels associated with the CSS set of the first Type. If the CORESET associated with the CSS set of the first Type is also associated with a CSS set of a second Type, the TCI state activated for the CORESET can be used for transmissions/receptions of channels associated with the CSS set of the second Type. This is illustrated in FIG. 16G.

Figure 16G:
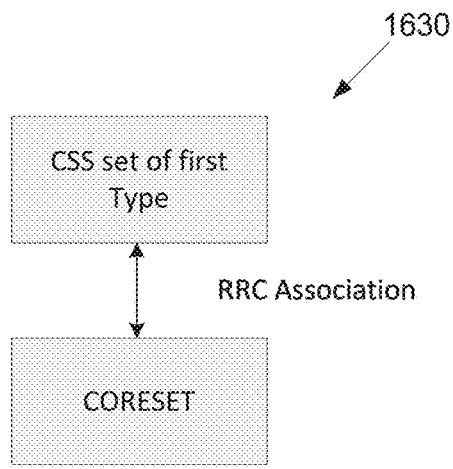
FIG. 16G illustrates yet another example of TCI state of the CORESET associated with CSS set according to embodiments of the present disclosure.

FIG. 16G illustrates yet another example of TCI state of the CORESET associated with CSS set 1630 according to embodiments of the present disclosure. An embodiment of the TCI state of the CORESET associated with CSS set 1630 shown in FIG. 16G is for illustration only.

In this example, the CORESET can be activated a TCI state for a search space associated with CORESET, but not CSS of a first Type. For example, the CSS set of a first Type follows the unified (master or main or indicated) TCI state by system specification and/or configuration, and the DL and UL channels associated with a DCI in a PDCCH transmitted in CSS set of a first Type follow unified (master or main or indicated) TCI State.

In another example, the unified (master or main or indicated) TCI state is directly associated with a CSS set of a first Type (e.g., Type0-PDCCH CSS set or Type0A-PDCCH CSS set or Type1-PDCCH CSS set or Type2-PDCCH CSS set) by system specification and/or configuration (RRC configuration and/or MAC CE configuration). The CORESET associated with the CSS set of the first Type can still be activated a TCI state, but the TCI state of the CORESET associated with the CSS set of the first Type is not used for transmissions/receptions of channels associated with the CSS set of the first Type. If the CORESET associated with the CSS set of the first Type is also associated with a CSS set of a second Type, the TCI state activated for the CORESET can be used for transmissions/receptions of channels associated with the CSS set of the second Type. This is illustrated in FIG. 16G.

In one example, in case of inter-cell beam management, when the unified (master or main or indicated) TCI state can be associated with source RS that has a direct or indirect spatial relation to a SSB of cell with a PCI different from that of serving cell, a common search space, e.g., (1) Type0-PDCCH CSS set; (2) Type0A-PDCCH CSS set; (3) Type1-PDCCH CSS set, and/or (4) Type2-PDCCH CSS set.

In one example, a UE dedicated channel in case of inter-cell beam management, when the unified (master or main or indicated) TCI state can be associated with source RS that has a direct or indirect spatial relation to a SSB of cell with a PCI different from that of serving cell, a UE transmission or reception associated with a DCI on a PDCCH with a CRC scrambled by C-RNTI, MCS-C-RNTI, SP-CSI-RNTI, CS-RNTI, SL-RNTI, SL-CS-RNTI, or SL Semi-Persistent Scheduling V-RNTI can't have the PDCCH transmitted in a common search space.

In one example, for paging and short messages, the DL transmission is associated with a DCI on a PDCCH with a CRC scrambled by P-RNTI, the PDCCH is transmitted in a Type2-PDCCH CSS set.

In one example, the CORESET associated with the paging search space (Type2-PDCCH CSS set) is not configured to follow the unified (master or main or indicated) TCI state, instead, a MAC CE activation command for TCI state configures the TCI state of the CORESET. In one example, the network can configure the TCI state of the Type2-PDCCH CSS set to be the same as that the unified (master or main or indicated) TCI state through the MAC CE activation command for TCI state, in one sub-example the same TCI state ID(s) is activated as the unified TCI state ID(s), in another sub-example a codepoint, for MAC CE activation, is reserved for following the unified TCI state and the codepoint is indicated in the MAC CE. In another example, the network can configure the TCI state of the Type2-PDCCH CSS set to be different from that the of the unified (master or main or indicated) TCI state through the MAC CE activation command for TCI state.

Figure 17:
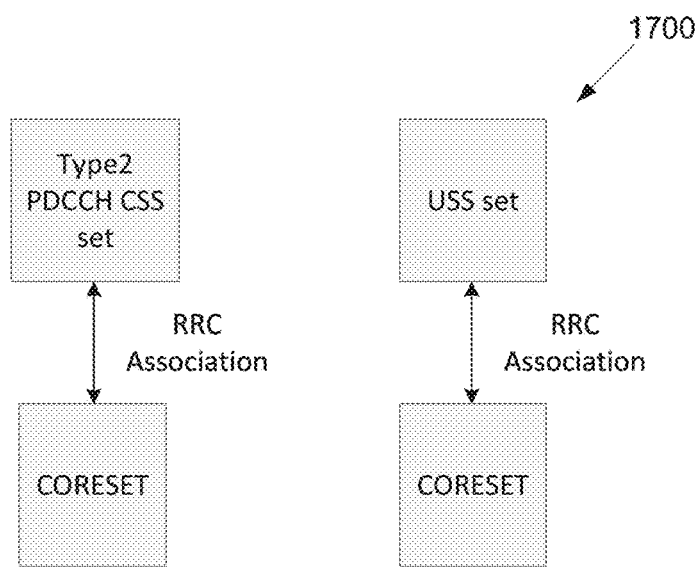
FIG. 17 illustrates an example of TCI state of the CORESET associated with the paging search space according to embodiments of the present disclosure.

FIG. 17 illustrates an example of TCI state of the CORESET associated with the paging search space 1700 according to embodiments of the present disclosure. An embodiment of the TCI state of the CORESET associated with the paging search space 1700 shown in FIG. 17 is for illustration only.

In one example, as shown in FIG. 17, the CORESET associated with the paging search space (Type2-PDCCH CSS set) is not associated with an USS set but is configured to follow the unified (master or main or indicated) TCI state. In this example, the CORESET is not associated with USS set or configured to follow unified TCI state. For example, no MAC CE activation is used for TCI state as CORESET configured to follow unified TCI state. Optionally, CORESETs not associated with USS set can be configured to follow the unified TCI state with configuration by RRC or MAC CE. For example, for inter-cell BM can only apply to Type2 PDCCH CSS set.

Figure 18:
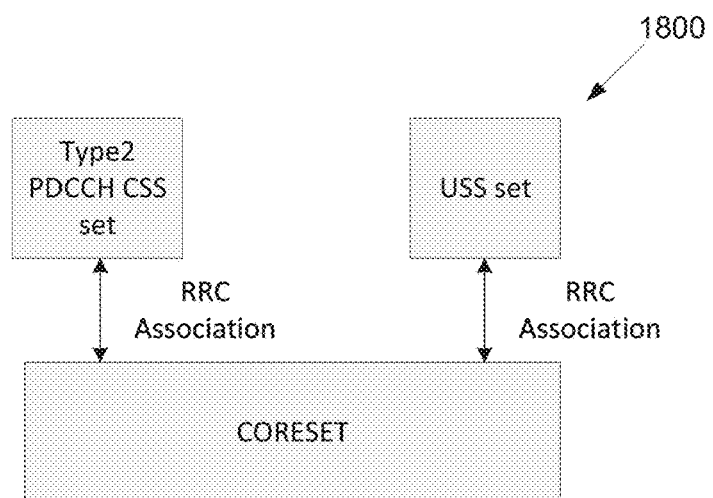
FIG. 18 illustrates another example of TCI state of the CORESET associated with the paging search space according to embodiments of the present disclosure.

In another example, there is no MAC CE activation for TCI state of CORESET associated with USS. Here, the CORESET associated with USS set follows the unified (master or main or indicated) TCI state by system specification and/or configuration, and the DL and UL (if any) channels associated with a DCI in a PDCCH transmitted in USS set follow unified (master or main or indicated) TCI State FIG. 18 illustrates another example of TCI state of the CORESET associated with the paging search space 1800 according to embodiments of the present disclosure. An embodiment of the TCI state of the CORESET associated with the paging search space 1800 shown in FIG. 18 is for illustration only.

In one example, as shown in FIG. 18, the CORESET associated with the paging search space (Type2-PDCCH CSS set) is associated with an USS set, and hence follows the unified (master or main or indicated) TCI state as described in component 2.

Figure 19A:
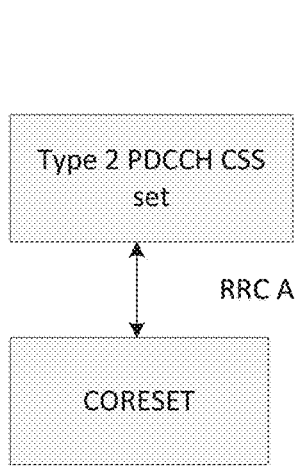
FIG. 19A illustrates an example of MAC CE activation configuring the TCI state of the CORESET according to embodiments of the present disclosure.

In this example, there is no MAC CE activation for TCI state of CORESET associated with USS. For example, same CORESETs associated with the USS set and Type2 PDCCH CSS set. Here, the CORESET associated with USS set follows the unified TCI state by system specification and/or configuration, and the DL and UL (if any) channels associated with a DCI in a PDCCH transmitted in USS set follow unified TCI State FIG. 19A illustrates an example of MAC CE activation configuring the TCI state of the CORESET 1900 according to embodiments of the present disclosure. An embodiment of the MAC CE activation configuring the TCI state of the CORESET 1900 shown in FIG. 19A is for illustration only.

In one example, a UE is configured a Type2-PDCCH CSS set. A UE is further configured a CORESET. The Type2-PDCCH CSS set is associated with the CORESET. The TCI state of the CORESET is the unified (master or main or indicated) TCI State. There is no MAC CE activation of TCI states for a CORESET associated with the Type2-PDCCH CSS set. This is illustrated in FIG. 19A.

In this example, there is no MAC CE activation for TCI state of CORESET associated with Type2-PDCCH CSS set. For example, a CORESET associated with Type2-PDCCH CSS set follows the unified TCI state by system specification and/or configuration, and the DL and UL (if any) channels associated with a DCI in a PDCCH transmitted in Type2-PDCCH CSS set follow unified TCI State.

In one example, the TCI state of the CORESET associated with Type2-PDCCH CSS set is the unified (master or main or indicated) TCI state by system specification. e.g., any CORESET associated with a Type2-PDCCH CSS set follows the unified (master or main or indicated) TCI state.

In another example, the TCI state of the CORESET associated with Type2-PDCCH CSS set is the unified (master or main or indicated) TCI state by configuration.

In one example, a CORESET is configured by RRC configuration to follow the unified (master or main or indicated) TCI state. e.g., as illustrated herein.

In another example, a CORESET is configured/updated by a MAC CE to follow the unified (master or main or indicated) TCI state. e.g., as illustrated herein.

FIG. 19A illustrates an example, where there is no MAC CE activation of the TCI state for the CORESET associated with Type2-PDCCH CSS set. The TCI state of the CORESET is determined by configuration or system specification.

Figure 19B:
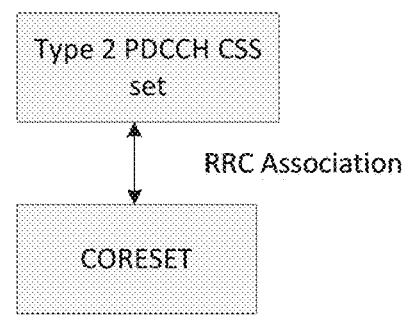
FIG. 19B illustrates another example of MAC CE activation configuring the TCI state of the CORESET according to embodiments of the present disclosure.

FIG. 19B illustrates another example of MAC CE activation configuring the TCI state of the CORESET 1950 according to embodiments of the present disclosure. An embodiment of the MAC CE activation configuring the TCI state of the CORESET 1950 shown in FIG. 19B is for illustration only.

Figure 20A:
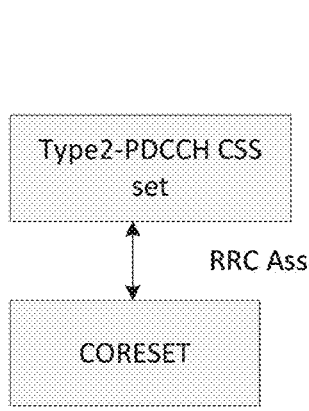
FIG. 20A illustrates an example of unified TCI state according to embodiments of the present disclosure.

FIG. 19B illustrates an example, where MAC CE activation can configure the TCI state of the CORESET associated with the USS set to follow the unified (master or main or indicated) TCI state. A codepoint can be reserved for the unified (master or main or indicated) TCI state as described herein. In this example, there is MAC CE activation for TCI state of CORESET associated with Type2-PDCCH CSS set to follow unified (master or main or indicated) TCI state. For example, the CORESET associated with Type2-PDCCH CSS set follows the unified TCI state by configuration, and the DL and UL (if any) channels associated with a DCI in a PDCCH transmitted in Type2-PDCCH CSS set follow unified TCI State FIG. 20A illustrates an example of unified TCI state 2000 according to embodiments of the present disclosure. An embodiment of the unified TCI state 2000 shown in FIG. 20A is for illustration only.

In this example, there is No TCI State for CORESET associated with Type2-PDCCH CSS set. For example, the Type2-PDCCH CSS set follows the unified (master or main or indicated) TCI state by system specification and/or configuration, and the DL and UL channels associated with a DCI in a PDCCH transmitted in Type2-PDCCH CSS set follow unified (master or main or indicated) TCI State.

In another example, the unified (master or main or indicated) TCI state is directly associated with the Type2-PDCCH CSS set by system specification and/or configuration (RRC configuration and/or MAC CE configuration). There is no TCI state associated with a CORESET that that is associated with the Type2-PDCCH CSS set. This is illustrated in FIG. 20A.

In another example, the unified (master or main or indicated) TCI state is directly associated with the Type2-PDCCH CSS set by system specification and/or configuration (RRC configuration and/or MAC CE configuration). The CORESET associated with the Type2-PDCCH CSS set can still be activated a TCI state, but the TCI state of the CORESET associated with the Type2-PDCCH CSS set is not used for transmissions/receptions of channels associated with the Type2-PDCCH CSS set. If the CORESET associated with the Type2-PDCCH CSS set is also associated with a CSS set of another type, the TCI state activated for the CORESET can be used for transmissions/receptions of channels associated with the CSS set of the other type. This is illustrated in FIG. 20B.

Figure 20B:
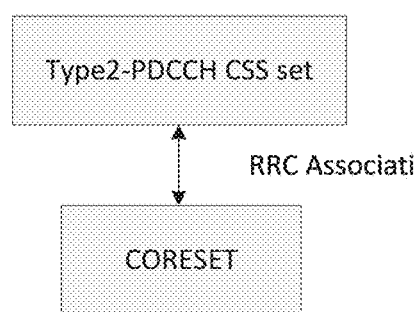
FIG. 20B illustrates another example of unified TCI state according to embodiments of the present disclosure.

FIG. 20B illustrates another example of unified TCI state 2005 according to embodiments of the present disclosure. An embodiment of the unified TCI state 2005 shown in FIG. 20B is for illustration only. In this example, the CORESET can be activated TCI state for CSS set other than Type2-PDCCH CSS associated with CORESET, but not Type2-PDCCH CSS set. For example, the Type2-PDCCH CSS set follows the unified (master or main or indicated) TCI state by system specification and/or configuration, and the DL and UL channels associated with a DCI in a PDCCH transmitted in Type2-PDCCH CSS set follow unified (master or main or indicated) TCI State.

In another example, the unified (master or main or indicated) TCI state is used for channels associated with a PDCCH with a CRC scramble by: P-RNTI. This can be by system specification and/or by configuration (RRC configuration and/or MAC CE configuration). For example, the RNTI(s) that follow the unified (master or main or indicated) TCI state are specified in the system specifications and/or configured or updated by RRC signaling and/or MAC CE signaling.

Examples of association with PDCCH can include: (1) a PDCCH channel with a CRC scrambled by P-RNTI; (2) a PDSCH channel scheduled by a DL assignment in a PDCCH channel with a CRC scrambled by P-RNTI; (3) a PDSCH channel activated, or that can be released, by PDCCH channel with a CRC scrambled by one of the aforementioned RNTIs; and/or (4) a PUCCH channel multiplexing the HARQ-ACK response of a PDSCH channel scheduled by a DL assignment in a PDCCH channel with a CRC scrambled P-RNTI (if any).

If a PDCCH is received in a search space (e.g., Type2-PDCCH CSS set) associated with a CORESET, and the CORESET is activated a TCI state. The activated TCI state does not apply to channels associated with a PDCCH having a CRC scrambled with P-RNTI. This is illustrated in FIG. 20C.

Figure 20C:
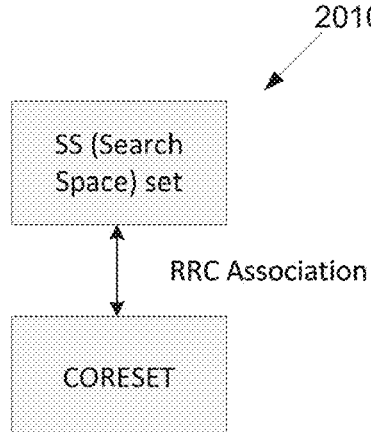
FIG. 20C illustrates yet another example of unified TCI state according to embodiments of the present disclosure.

FIG. 20C illustrates yet another example of unified TCI state 2010 according to embodiments of the present disclosure. An embodiment of the unified TCI state 2010 shown in FIG. 20C is for illustration only. In this example, the CORESET can be activated TCI state for other channels not associated with a PDCCH scrambled with P-RNTI. For example, PDCCH with CRC scrambled with, e.g., P-RNTI, follows the unified (master or main or indicated) TCI state by system specification and/or configuration, and the DL and UL channels associated with such PDCCH follow unified (master or main or indicated) TCI State.

In one example, a CORESET can be associated with (Example A) USS set and/or CSS Type3-PDCCH CSS set and/or other CSS sets (e.g., Type0-PDCCH CSS set and/or Type0A-PDCCH CSS set and/or Type1-PDCCH CSS set and/or Type2-PDCCH CSS set) (Example B) (USS set and/or CSS Type3-PDCCH CSS set) and other CSS sets (e.g., Type0-PDCCH CSS set and/or Type0A-PDCCH CSS set and/or Type1-PDCCH CSS set and/or Type2-PDCCH CSS set) (Example C), USS set and/or CSS sets (e.g., Type0-PDCCH CSS set and/or Type0A-PDCCH CSS set and/or Type1-PDCCH CSS set and/or Type2-PDCCH CSS set and/or Type3-PDCCH CSS), (Example D) USS set and CSS sets (e.g., Type0-PDCCH CSS set and/or Type0A-PDCCH CSS set and/or Type1-PDCCH CSS set and/or Type2-PDCCH CSS set and/or Type3-PDCCH CSS).

In one example, the CORESET follows the unified (or master or main or indicated) TCI state indicated by a DCI Format and/or MAC CE.

In one sub-example, this configuration (i.e., following the unified (or master or main or indicated) TCI state) is only expected for the intra-cell case (i.e., when the TCI states are associated (directly or indirectly) with an SSB associated with the PCI of the serving cell. The UE does not expect (i.e., it is considered as an error case) that the TCI states are associated (directly or indirectly) with an SSB associated with a PCI of a cell that is different from the PCI of the serving cell, e.g., this configuration does not support inter-cell scenarios.

In another sub-example, this configuration (i.e., following the unified (or master or main or indicated) TCI state) is allowed for intra-cell cases as well as inter-cell cases.

When the TCI state (DL, UL, Joint or DL+UL) is associated (directly or indirectly) with an SSB associated with the PCI of the serving cell, TCI state can be used for channels associated with (Example A) USS set and/or CSS Type3-PDCCH CSS set and/or other CSS sets (e.g., Type0-PDCCH CSS set and/or Type0A-PDCCH CSS set and/or Type1-PDCCH CSS set and/or Type2-PDCCH CSS set), (Example B) (USS set and/or CSS Type3-PDCCH CSS set) and other CSS sets (e.g., Type0-PDCCH CSS set and/or Type0A-PDCCH CSS set and/or Type1-PDCCH CSS set and/or Type2-PDCCH CSS set) (Example C), USS set and/or CSS sets (e.g., Type0-PDCCH CSS set and/or Type0A-PDCCH CSS set and/or Type1-PDCCH CSS set and/or Type2-PDCCH CSS set and/or Type3-PDCCH CSS), (Example D) USS set and CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can be received and/or transmitted based on the TCI state, the corresponding search space(s) are monitored.

When the TCI state (DL, UL, Joint or DL+UL) is associated (directly or indirectly) with an SSB associated with the PCI of cell that is different from the PCI of the serving cell: (1) TCI state can be used for channels associated with (Example A and B) USS set and/or CSS Type3-PDCCH CSS set, (Example C and D) USS set; and these channels can be received and/or transmitted based on the TCI state, the corresponding search space(s) are monitored. (2) TCI cannot be used for channels associated with (Example A and B) other CSS sets (e.g., Type0-PDCCH CSS set and/or Type0A-PDCCH CSS set and/or Type1-PDCCH CSS set and/or Type2-PDCCH CSS set), (Example C and D) CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can't be received and/or transmitted, the corresponding search space(s) is not monitored.

In one example, the CORESET can be configured through RRC configuration and/or MAC CE configuration (e.g., as described in component 5) to follow the unified (master or main or indicated) TCI state indicated by a DCI Format and/or MAC CE.

In one sub-example, if the CORESET is configured to follow the unified (or master or main or indicated) TCI state this configuration is only expected for the intra-cell case (i.e., when the TCI states are associated (directly or indirectly) with an SSB associated with the PCI of the serving cell. The UE does not expect (i.e., it is considered as an error case) that the TCI states are associated (directly or indirectly) with an SSB associated with a PCI of a cell that is different from the PCI of the serving cell, e.g., this configuration does not support inter-cell scenarios.

In another sub-example, if the CORESET is configured to follow the unified (or master or main or indicated) TCI state this configuration is allowed for intra-cell cases as well as inter-cell cases.

When the TCI state (DL, UL, Joint or DL+UL) is associated (directly or indirectly) with an SSB associated with the PCI of the serving cell, TCI state can be used for channels associated with (Example A) USS set and/or CSS Type3-PDCCH CSS set and/or other CSS sets (e.g., Type0-PDCCH CSS set and/or Type0A-PDCCH CSS set and/or Type1-PDCCH CSS set and/or Type2-PDCCH CSS set), (Example B) (USS set and/or CSS Type3-PDCCH CSS set) and other CSS sets (e.g., Type0-PDCCH CSS set and/or Type0A-PDCCH CSS set and/or Type1-PDCCH CSS set and/or Type2-PDCCH CSS set) (Example C), USS set and/or CSS sets ((e.g., Type0-PDCCH CSS set and/or Type0A-PDCCH CSS set and/or Type1-PDCCH CSS set and/or Type2-PDCCH CSS set and/or Type3-PDCCH CSS), (Example D) USS set and CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can be received and/or transmitted based on the TCI state.

When the TCI state (DL, UL, Joint or DL+UL) is associated (directly or indirectly) with an SSB associated with the PCI of cell that is different from the PCI of the serving cell: (1) TCI state can be used for channels associated with (Example A and B) USS set and/or CSS Type3-PDCCH CSS set, (Example C and D) USS set; and these channels can be received and/or transmitted based on the TCI state, the corresponding search space(s) are monitored. (2) TCI can't be used for channels associated with (Example A and B) other CSS set (e.g., Type0-PDCCH CSS set and/or Type0A-PDCCH CSS sets and/or Type1-PDCCH CSS set and/or Type2-PDCCH CSS set), (Example C and D) CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can't be received and/or transmitted, the corresponding search space(s) is not monitored.

In one sub-example, if the CORESET is configured to not follow the unified (or master or main or indicated) TCI state this configuration is only expected for the inter-cell case (i.e., when the TCI states can be associated (directly or indirectly) with an SSB associated with a PCI of a cell different from the PCI of the serving cell. The UE does not expect (i.e., it is considered as an error case) that the TCI states are associated (directly or indirectly) with an SSB associated only with the PCI of the serving cell, e.g., this configuration does not support intra-cell scenarios.

In one sub-example, if the CORESET is configured to not follow the unified (or master or main or indicated) TCI state this configuration is allowed for intra-cell cases as well as inter-cell cases.

In one example, there is specially handling of CORESET 0.

In one example, if CORESET 0 is associated only with (Example E) USS set and/or CSS Type3-PDCCH CSS set, Example (F) USS set, CORESET 0 follows the unified (master or main or indicated) TCI state indicated by a DCI Format and/or MAC CE.

In one example, CORESET 0 can be configured through RRC configuration and/or MAC CE configuration (e.g., as described in component 5) to follow the unified (master or main or indicated) TCI state indicated by a DCI Format and/or MAC CE.

In one sub-example, if CORESET 0 is configured to follow the unified (or master or main or indicated) TCI state this configuration is only expected for the intra-cell case (i.e., when the TCI states are associated (directly or indirectly) with an SSB associated with the PCI of the serving cell. The UE does not expect (i.e., it is considered as an error case) that the TCI states are associated (directly or indirectly) with an SSB associated with a PCI of a cell that is different from the PCI of the serving cell, e.g., this configuration does not support inter-cell scenarios.

In another sub-example, if CORESET 0 is configured to follow the unified (or master or main or indicated) TCI state, this configuration is allowed for intra-cell cases as well as inter-cell cases.

When the TCI state (DL, UL, Joint or DL+UL) is associated (directly or indirectly) with an SSB associated with the PCI of the serving cell, TCI state can be used for channels associated with (Example A) USS set and/or CSS Type3-PDCCH CSS set and/or other CSS sets (e.g., Type0-PDCCH CSS set and/or Type0A-PDCCH CSS set and/or Type1-PDCCH CSS set and/or Type2-PDCCH CSS set), (Example B) (USS set and/or CSS Type3-PDCCH CSS set) and other CSS sets (e.g., Type0-PDCCH CSS set and/or Type0A-PDCCH CSS set and/or Type1-PDCCH CSS set and/or Type2-PDCCH CSS set) (Example C), USS set and/or CSS sets (e.g., Type0-PDCCH CSS set and/or Type0A-PDCCH CSS set and/or Type1-PDCCH CSS set and/or Type2-PDCCH CSS set and/or Type3-PDCCH CSS), (Example D) USS set and CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can be received and/or transmitted based on the TCI state, the corresponding search space(s) are monitored.

When the TCI state (DL, UL, Joint or DL+UL) is associated (directly or indirectly) with an SSB associated with the PCI of cell that is different from the PCI of the serving cell: (1) TCI state can be used for channels associated with (Example A and B) USS set and/or CSS Type3-PDCCH CSS set, (Example C and D) USS set; and these channels can be received and/or transmitted based on the TCI state, the corresponding search space(s) are monitored. (2) TCI cannot be used for channels associated with (Example A and B) other CSS sets (e.g., Type0-PDCCH CSS set and/or Type0A-PDCCH CSS set and/or Type1-PDCCH CSS set and/or Type2-PDCCH CSS set), (Example C and D) CSS sets (e.g., Type0-PDCCH CSS set and/or Type0A-PDCCH CSS set and/or Type1-PDCCH CSS set and/or Type2-PDCCH CSS set and/or Type3-PDCCH CSS); and these channels can't be received and/or transmitted, the corresponding search space(s) is not monitored.

In one sub-example, if CORESET 0 is configured to not follow the unified (or master or main or indicated) TCI state this configuration is only expected for the inter-cell case (i.e., when the TCI states can be associated (directly or indirectly) with an SSB associated with a PCI of a cell different from the PCI of the serving cell. The UE does not expect (i.e., it is considered as an error case) that the TCI states are associated (directly or indirectly) with an SSB associated only with the PCI of the serving cell, e.g., this configuration does not support intra-cell scenarios.

In one sub-example, if CORESET 0 is configured to not follow the unified (or master or main or indicated) TCI state this configuration is allowed for intra-cell cases as well as inter-cell cases.

In one example, after the most recent random access procedure, if (Example G) CORESET 0 has been configured (or not configured) through RRC configuration and/or MAC CE configuration (e.g., as described in component 5) to follow the unified (or master or main or indicated) TCI state indicated by a DCI Format and/or MAC CE (Example H) CORESET 0 follows the unified (or master or main or indicated) TCI state: (1) if the UE has not been indicated a TCI state by a DCI Format and/or MAC CE, the UE assumes that a DM-RS of PDSCH and DM-RS of PDCCH, and the CSI-RS applying the indicated TCI state is quasi-co-located with an SSB the UE identified during the most recent random access procedure not initiated by a PDCCH order that triggers a contention free random access procedure, and the UE assumes that a UL TX spatial filter, if applicable, for dynamic-grant and configured-grant based PUSCH and PUCCH resource in a CC, and SRS applying the indicated TCI state is the same as that for a PUSCH transmission scheduled by a RAR UL grant during the most recent random access procedure not initiated by a PDCCH order that triggers a contention free random access procedure; and (2) if the UE has been indicated a TCI state by a DCI Format and/or MAC CE, the UE obtains the QCL assumptions from the one or more quasi-co-location RS (e.g., source RS) of the indicated TCI state for a DM-RS of PDSCH and DM-RS of PDCCH, and the CSI-RS applying the indicated TCI state, and the UE obtains an UL TX spatial filter from the spatial relation RS (e.g., source RS) of the indicated TCI state, if applicable, for dynamic-grant and configured-grant based PUSCH and PUCCH resource in a CC, and SRS applying the indicated TCI state.

In one example, after the most recent random access procedure, else (i.e., (Example I) CORESET 0 has been configured (or not configured) through RRC configuration and/or MAC CE configuration (e.g., as described in component 5) to not follow the unified (master or main or indicated) TCI state indicated by a DCI Format and/or MAC CE (Example J) CORESET 0 does not follow the unified (or master or main or indicated) TCI state): (1) if the UE has not been activated a TCI state by a MAC CE activation command for the CORESET, the UE assumes that a DM-RS antenna port for PDCCH receptions in the CORESET is quasi-co-located with an SSB the UE identified during the most recent random access procedure not initiated by a PDCCH order that triggers a contention free random access procedure; and (2) if the UE has been activated a TCI state by a MAC CE activation command for the CORESET, the UE assumes that the that a DM-RS antenna port for PDCCH receptions in the CORESET is quasi-co-located with the one or more RS configured by the MAC CE activated TCI state.

In one example, after the most recent random access procedure, in one example, if (Example G) a CORESET with index 0 has been configured (or not configured) through RRC configuration and/or MAC CE configuration (e.g., as described in component 5) to follow the unified (or master or main or indicated) TCI state indicated by a DCI Format and/or MAC CE (Example H) a CORESET with index 0 follows the unified (or master or main or indicated) TCI state: (1) after a random access procedure not initiated by a PDCCH order that triggers a contention-free random access procedure, if the UE has not been indicated a TCI state by a DCI Format and/or MAC CE: (i) the UE assumes that a DM-RS of PDCCH and DM-RS of PDSCH associated with the CORESET with index 0 are quasi-co-located with an SS/PBCH block (SSB) the UE identified during the most recent random access procedure not initiated by a PDCCH order that triggers a contention free random access procedure; and (ii) the UE assumes that a UL TX spatial filter, if applicable, for dynamic-grant and/or configured-grant based PUSCH and PUCCH associated with the CORESET with index 0, are the same as that for a PUSCH transmission scheduled by a RAR UL grant during the most recent random access procedure not initiated by a PDCCH order that triggers a contention free random access procedure; and (2) after the UE has received an indication of a TCI state by a DCI Format and/or MAC CE, and after a beam application delay, wherein the beam application delay can be measured from the end (last symbol) of the UL channel (e.g., PUCCH or PUSCH) acknowledging the reception the beam indication: (i) the UE obtains the QCL assumptions from the one or more quasi-co-location RS (e.g., source RS) of the indicated TCI state (e.g., DLorJoint-TCIState-r17) for a DM-RS of PDCCH and DM-RS of PDSCH associated with the CORESET with index 0; and (ii) the UE determines an UL TX spatial filter, if applicable, from the spatial relation RS (e.g., source RS) of the indicated TCI state, (e.g., DLorJoint-TCIState-r17 or UL-TCIState-r17) for dynamic-grant and/or configured-grant based PUSCH and PUCCH associated with the CORESET with index 0.

In one example, after the most recent random access procedure, in another example, else (i.e., (Example I) a CORESET with index 0 has been configured (or not configured) through RRC configuration and/or MAC CE configuration (e.g., as described in component 5) to not follow the unified (master or main or indicated) TCI state indicated by a DCI Format and/or MAC CE (Example J) a CORESET with index 0 doesn't follow the unified (or master or main or indicated) TCI state): (1) if the UE has not been activated a TCI state by a MAC CE activation command for the CORESET, the UE assumes that a DM-RS antenna port for PDCCH receptions in the CORESET with index 0 are quasi-co-located with an SS/PBCH Block (SSB) the UE identified during the most recent random access procedure not initiated by a PDCCH order that triggers a contention free random access procedure; and (2) if the UE has been activated a TCI state by a MAC CE activation command for the CORESET with index 0, the UE assumes that the that a DM-RS antenna port for PDCCH receptions in the CORESET is quasi-co-located with the one or more RS configured by the MAC CE activated TCI state.

In one example, after the most recent random access procedure, in another example, else (i.e., (Example I) a CORESET with index 0 has been configured (or not configured) through RRC configuration and/or MAC CE configuration (e.g., as described in component 5) to not follow the unified (master or main or indicated) TCI state indicated by a DCI Format and/or MAC CE (Example J) a CORESET with index 0 does not follow the unified (or master or main or indicated) TCI state): (1) if the UE has not been activated a TCI state by a MAC CE activation command for the CORESET, (i) the UE assumes that a DM-RS of PDCCH and DM-RS of PDSCH associated with the CORESET with index 0 are quasi-co-located with an SS/PBCH Block (SSB) the UE identified during the most recent random access procedure not initiated by a PDCCH order that triggers a contention free random access procedure, and (ii) the UE assumes that a UL TX spatial filter, if applicable, for dynamic-grant and/or configured-grant based PUSCH and PUCCH associated with the CORESET with index 0, are the same as that for a PUSCH transmission scheduled by a RAR UL grant during the most recent random access procedure not initiated by a PDCCH order that triggers a contention free random access procedure; and (2) after the UE has received an activated TCI state by a MAC CE activation command for the CORESET with index 0, and after a beam application delay, (i) the UE assumes that the that a DM-RS antenna port of PDCCH and DM-RS of PDSCH associated with the CORESET with index 0 are quasi-co-located with the one or more RS configured by the MAC CE activated TCI state, and (ii) the UE determines an UL TX spatial filter, if applicable, from the spatial relation RS (e.g., source RS) of the activated TCI state, for dynamic-grant and/or configured-grant based PUSCH and PUCCH associated with the CORESET with index 0.

In one example, RRC configuration can indicate if a CORESET follows the unified (master or main or indicated) TCI state. For example, in the IE ControlResourceSet IE, an additional element (e.g., followUnifiedTCIState or followMasterTCIState or followMainTCIState) can indicate if the CORESET follows the unified (master or main or indicated) TCI state or not. For example, the presence of followUnifiedTCIState (or followMasterTCIState or followMainTCIState), can indicate that the CORESET follows the unified (master or main or indicated) TCI state. The absence of followUnifiedTCIState (or followMasterTCIState or followMainTCIState) indicates that CORESET does not follow the unified (master or main or indicated) TCI state.

TABLE 2

| ControlResourceSet |
| --- |
| ControlResourceSet ::=      SEQUENCE {<br>  controlResourceSetId      ControlResourceSetId,<br>  ... other elements omitted<br>    followUnifiedTCIState (or followMasterTCIState or followMainTCIState)  enable<br>}<br>-- TAG-CONTROLRESOURCESET-STOP<br>-- ASN1STOP |

In a variant example, the parameter can be notFollowUnifiedTCIState, wherein, if the parameter notFollowUnifiedTCIState is absent, the CORESET follows the unified (master or main or indicated) TCI state. If the parameter notFollowUnifiedTCIState is enabled, the CORESET does not follow the unified (master or main or indicated) TCI state.

In another example, followUnifiedTCIState (or followMasterTCIState or followMainTCIState), can be set to enable to indicate that the CORESET follows the unified (master or main or indicated) TCI state. followUnifiedTCIState (or followMasterTCIState or followMainTCIState) can be set to disable to indicate that CORESET does not follow the unified (master or main or indicated) TCI state.

TABLE 3

ControlResourceSet

```
ControlResourceSet ::=            SEQUENCE {
controlResourceSetId              ControlResourceSetId,
... other elements omitted
    followUnifiedTCIState (or followMasterTCIState or followMainTCIState) {disable, enable}
}
-- TAG-CONTROLRESOURCESET-STOP
--ASN1STOP
```

In a variant example, the parameter can be notFollowUnifiedTCIState, wherein, if the parameter notFollowUnifiedTCIState is disabled, the CORESET follows the unified (master or main or indicated) TCI state. If the parameter notFollowUnifiedTCIState is enabled, the CORESET does not follow the unified (master or main or indicated) TCI state.

In another example, MAC CE can indicate whether the CORESET follows the unified (master or main or indicated) TCI state. A MAC CE command indicate whether the CORESET follows the unified (master or main or indicated) TCI state, a value of "1" for example can indicate that the CORESET follows the unified (master or main or indicated) TCI state, while a value of "0" for example can indicate that the CORESET does not follows the unified (master or main or indicated) TCI state. This is illustrated by way of example in FIG. 21.

Figure 21:
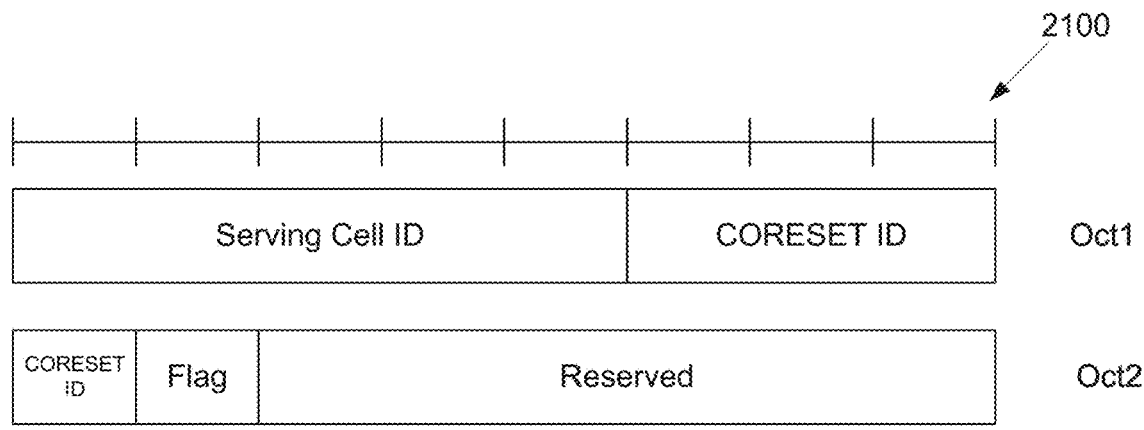
FIG. 21 illustrates an example of CORESET with flag according to embodiments of the present disclosure.

FIG. 21 illustrates an example of CORESET with flag 2100 according to embodiments of the present disclosure. An embodiment of the CORESET with flag 2100 shown in FIG. 21 is for illustration only. In this example, a Flag 0 means that CORESET does not follow unified TCI State and a Flag 1 means that the CORESET follows unified TCI state. Or, vice versa, where a Flag 0 means that the CORESET follows unified TCI State and a Flag 1 means that the CORESET does not follow unified TCI state.

Figure 22A:
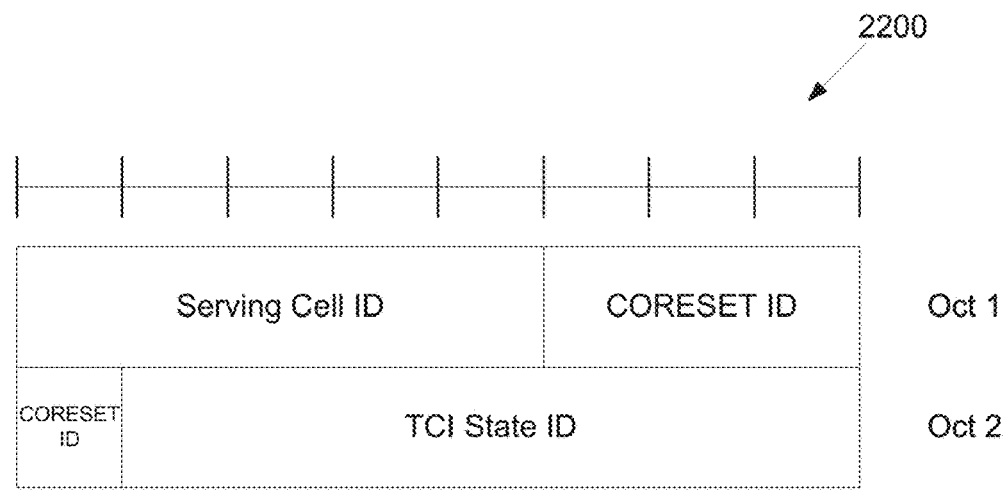
FIG. 22A illustrates an example of TCI state ID according to embodiments of the present disclosure.

FIG. 22A illustrates an example of TCI state ID 2200 according to embodiments of the present disclosure. An embodiment of the TCI state ID 2200 shown in FIG. 22A is for illustration only.

In another example, MAC CE can indicate whether the CORESET follows the unified (master or main or indicated) TCI state. For example, the "TCI State Indication for UE-specific PDCCH MAC CE" includes a TCI state ID as illustrated in FIG. 22A. One value of the TCI state ID can be reserved to indicate that the CORESET follows the unified (master or main or indicated) TCI state. For example, TCI State ID 0000000, can indicate that the CORESET follows the unified (master or main or indicated) TCI state. Alternatively, TCI State ID 1111111, can indicate that the CORESET follows the unified (master or main or indicated) TCI state.

Figure 22B:
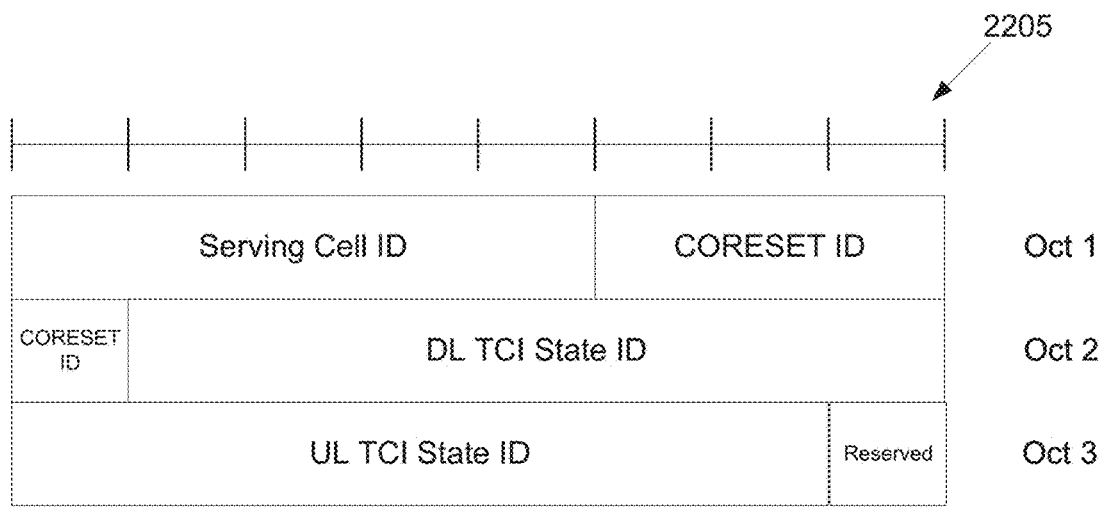
FIG. 22B illustrates another example of TCI state ID according to embodiments of the present disclosure.

In another example, the MAC CE activating a TCI state for a CORESET not following the unified (master or main or indicated) TCI state is activating one DL TCI state and one UL TCI state used for DL and UL channels, respectively, associated with a PDCCH transmitted in a search space associated with the CORESET. This is illustrated in FIG. 22B. The MAC CE can indicate whether the CORESET follows the unified (master or main or indicated) TCI state. A value (or codepoint) of the DL TCI state ID and/or the UL TCI state ID can be reserved to indicate that the CORESET follows the unified (master or main or indicated) TCI state.

FIG. 22B illustrates another example of TCI state ID 2205 according to embodiments of the present disclosure. An embodiment of the TCI state ID 2205 shown in FIG. 22B is for illustration only.

Figure 22C:
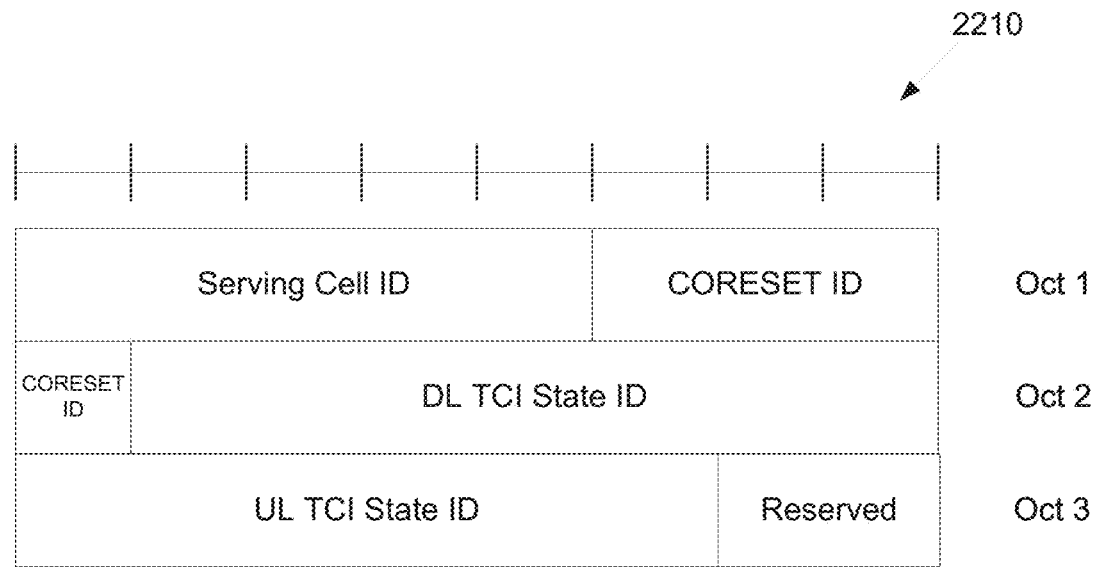
FIG. 22C illustrates yet another example of TCI state ID according to embodiments of the present disclosure.

In FIG. 22B, UL TCI state ID is shown as 7 bits, in a variant UL TCI state ID is 6 bits with one extra bit reserved as shown in FIG. 22C.

FIG. 22C illustrates yet another example of TCI state ID 2210 according to embodiments of the present disclosure. An embodiment of the TCI state ID 2210 shown in FIG. 22C is for illustration only.

Figure 22D:
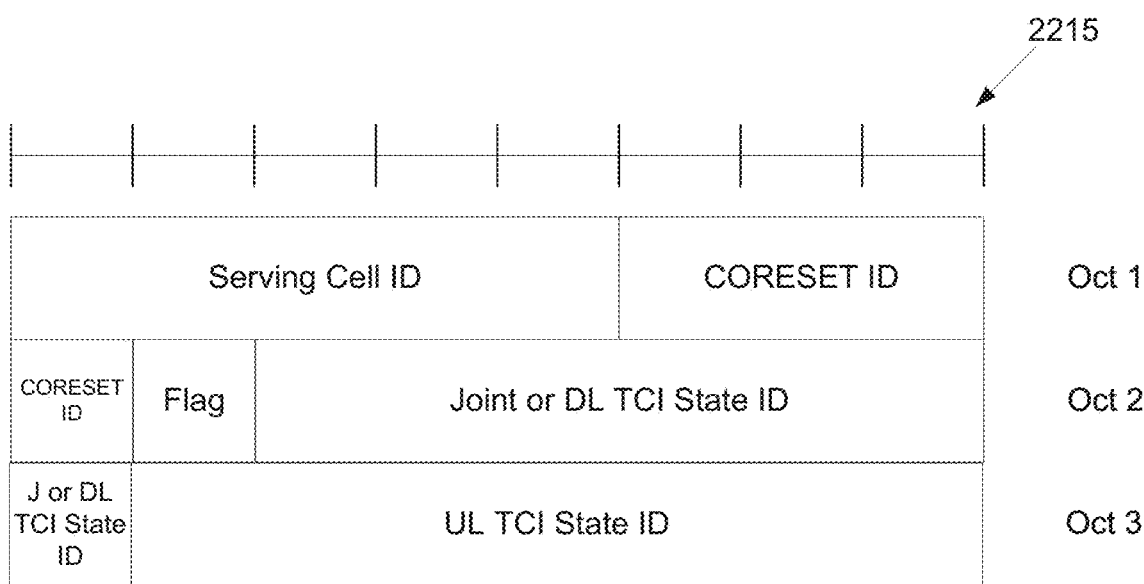
FIG. 22D illustrates yet another example of TCI state ID according to embodiments of the present disclosure.

In another example, the MAC CE activating a TCI state for a CORESET not following the unified (master or main or indicated) TCI state is activating either one Joint TCI state for DL and UL channels or one DL TCI state and one UL TCI state used for DL and UL channels, respectively, associated with a PDCCH transmitted in a search space associated with the CORESET. A one-bit flag determines whether the TCI state activates one Joint TCI state or 2 TCI states (DL TCI state or UL TCI state). This is illustrated in FIG. 22D. A value (or codepoint) of the Flag, Joint/DL TCI state ID and/or the UL TCI state ID can be reserved to indicate that the CORESET follows the unified (master or main or indicated) TCI state.

FIG. 22D illustrates yet another example of TCI state ID 2215 according to embodiments of the present disclosure. An embodiment of the TCI state ID 2215 shown in FIG. 22D is for illustration only.

Figure 22E:
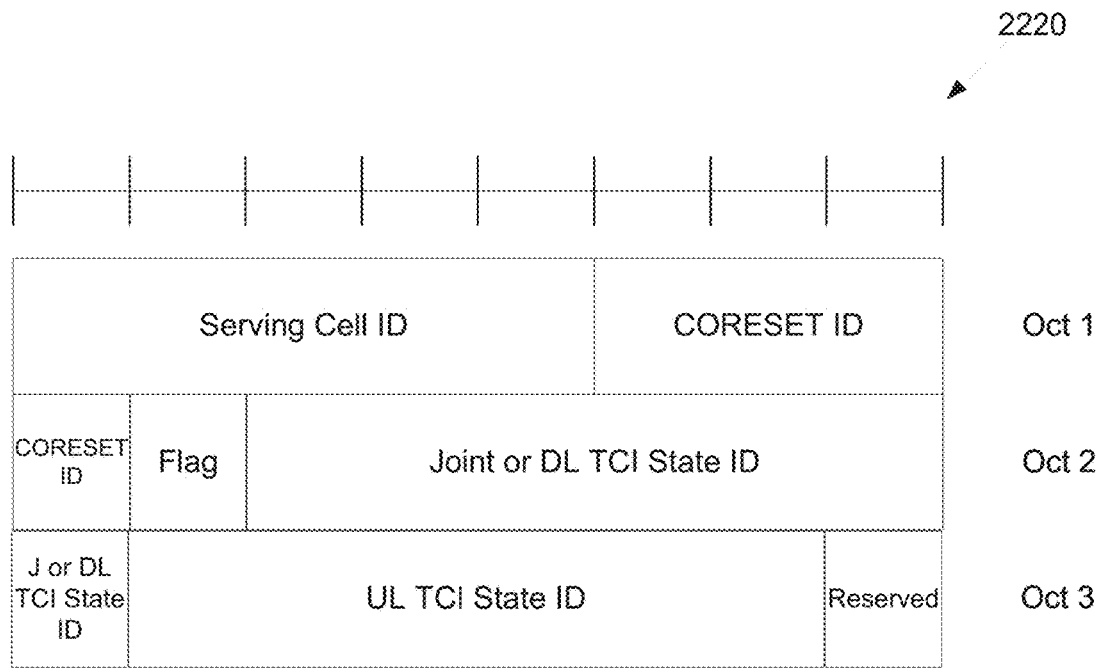
FIG. 22E illustrates yet another example of TCI state ID according to embodiments of the present disclosure.

In FIG. 22D, UL TCI state ID is shown as 7 bits, in a variant UL TCI state ID is 6 bits with 1 bit reserved as shown in FIG. 22E.

FIG. 22E illustrates yet another example of TCI state ID 2220 according to embodiments of the present disclosure. An embodiment of the TCI state ID 2220 shown in FIG. 22E is for illustration only.

In one example, RRC configuration can be indicate if a Search Space follows the unified (master or main or indicated) TCI state. For example, in the IE SearchSpace, an additional element (e.g., followUnifiedTCIState or followMasterTCIState or followMainTCIState) can indicate if the Search Space follows the unified (master or main or indicated) TCI state or not. For example, the presence of followUnifiedTCIState (or followMasterTCIState or followMainTCIState), can indicate that the Search Space follows the unified (master or main or indicated) TCI state. The absence of followUnifiedTCIState (or followMasterTCIState or followMainTCIState) indicates that Search does not follow the unified (master or main or indicated) TCI state.

TABLE 4

Search space

```
SearchSpace ::=              SEQUENCE {
  searchSpaceId                SearchSpaceId,
  controlResourceSetId         ControlResourceSetId    OPTIONAL, -- Cond SetupOnly
  ... other elements omitted
     followUnifiedTCIState (or followMasterTCIState or followMainTCIState)  enable
}
-- TAG-SEARCHSPACE-STOP
-- ASN1STOP
```

In a variant example, the parameter can be notFollowUnifiedTCIState, wherein, if the parameter notFollowUnifiedTCIState is absent, the search space set follows the unified (master or main or indicated) TCI state. If the parameter notFollowUnifiedTCIState is enabled, the search space set does not follow the unified (master or main or indicated) TCI state.

In another example, followUnifiedTCIState (or followMasterTCIState or followMainTCIState), can be set to enable to indicate that the search space follows the unified (master or main or indicated) TCI state. followUnifiedTCIState (or followMasterTCIState or followMainTCIState) can be set to disable to indicate that search space does not follow the unified (master or main or indicated) TCI state.

TABLE 5

Search space

```
SearchSpace ::=              SEQUENCE {
  searchSpaceId                SearchSpaceId,
  controlResourceSetId         ControlResourceSetId         OPTIONAL, -- Cond SetupOnly
  ... other elements omitted
     followUnifiedTCIState (or followMasterTCIState or followMainTCIState)     {disable, enable}
}
-- TAG-SEARCHSPACE-STOP
-- ASN1STOP
```

In a variant example, the parameter can be notFollowUnifiedTCIState, wherein, if the parameter notFollowUnifiedTCIState is disabled, the search space set follows the unified (master or main or indicated) TCI state. If the parameter notFollowUnifiedTCIState is enabled, the search space set does not follow the unified (master or main or indicated) TCI state.

In one example, RRC configuration can be indicate if an RNTI follows the unified (master or main or indicated) TCI state. If an RNTI is configured to follow a TCI state, all channels associated with a PDCCH having a CRC scrambled by the RNTI follow the unified (master or main or indicated) TCI state.

In one example, the MAC CE activating a TCI state for a CORESET not following the unified (master or main or indicated) TCI state is activating one Joint TCI state used for DL and UL channels associated with a PDCCH transmitted in a search space associated with the CORESET. This is illustrated in FIG. 23.

Figure 23:
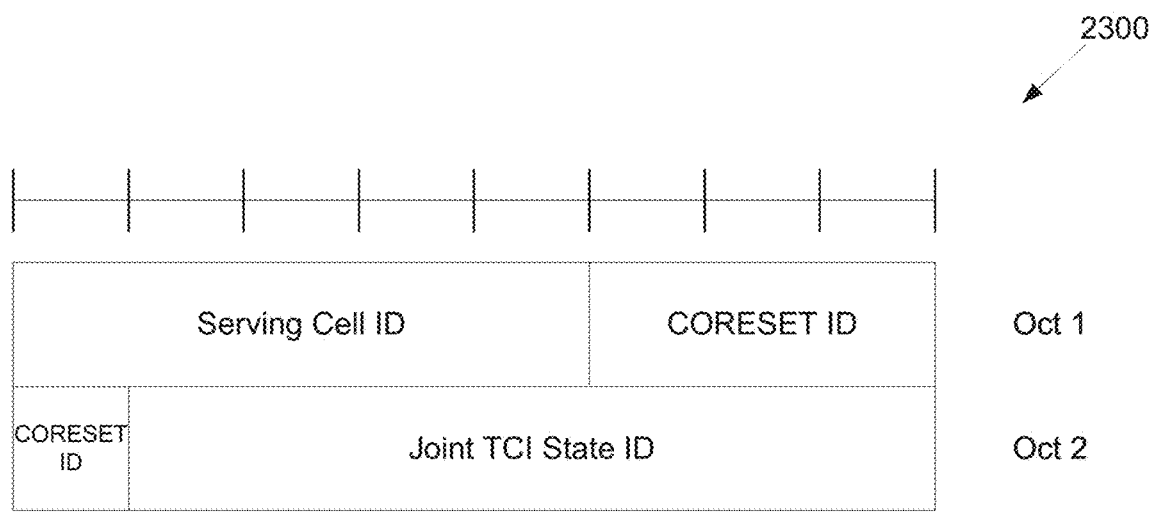
FIG. 23 illustrates an example of joint TCI state ID according to embodiments of the present disclosure.

FIG. 23 illustrates an example of joint TCI state ID 2300 according to embodiments of the present disclosure. An embodiment of the joint TCI state ID 2300 shown in FIG. 23 is for illustration only.

Figure 24A:
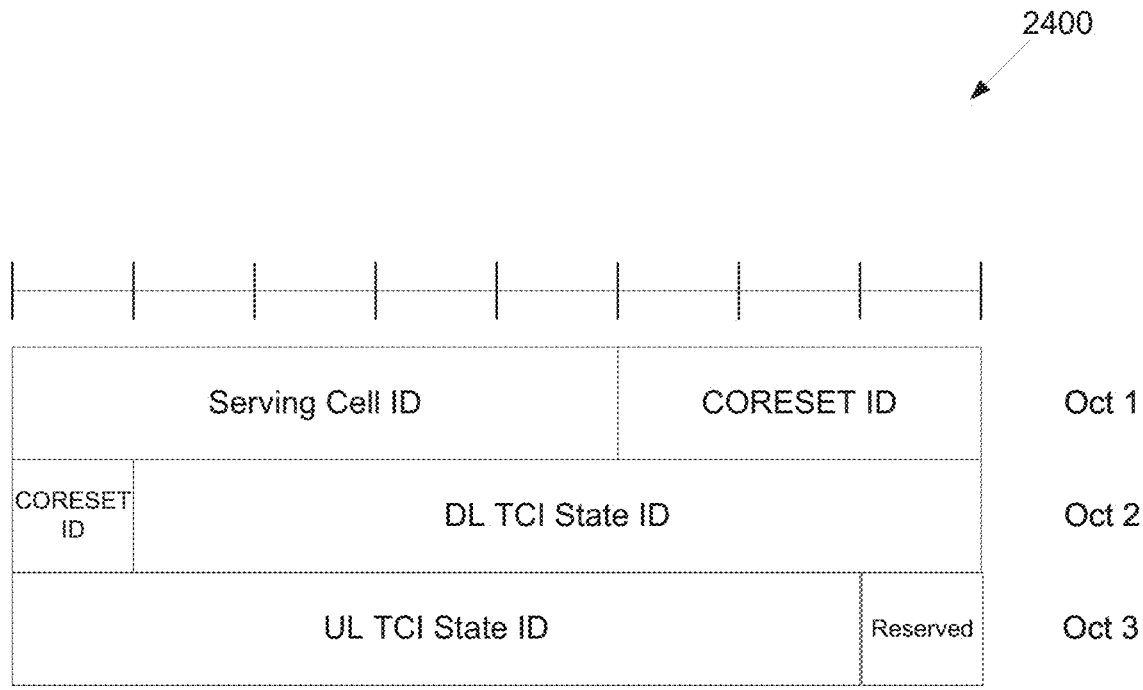
FIG. 24A illustrates an example of DL and UL TCI state ID according to embodiments of the present disclosure.

In another example, the MAC CE activating a TCI state for a CORESET not following the unified (master or main or indicated) TCI state is activating one DL TCI state and one UL TCI state used for DL and UL channels, respectively, associated with a PDCCH transmitted in a search space associated with the CORESET. This is illustrated in FIG. 24A. In FIG. 24A, UL TCI state ID is shown as 7 bits, in a variant UL TCI state ID is 6 bits with one extra bit reserved as shown in FIG. 24B.

FIG. 24A illustrates an example of DL and UL TCI state ID 2400 according to embodiments of the present disclosure. An embodiment of the DL and UL TCI state ID 2400 shown in FIG. 24A is for illustration only.

Figure 24B:
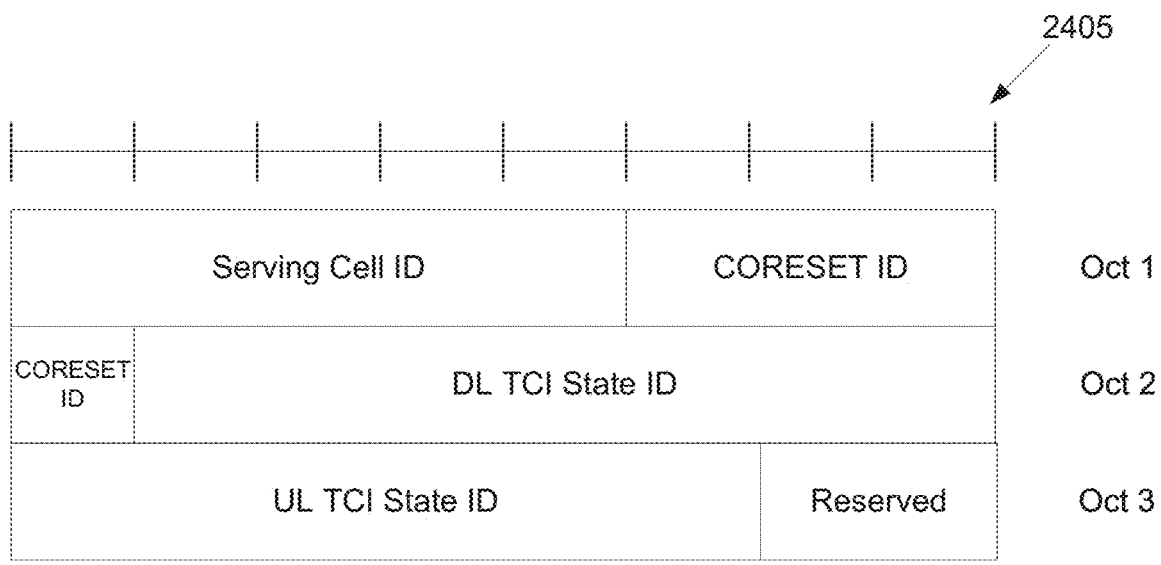
FIG. 24B illustrates another example of DL and UL TCI state ID according to embodiments of the present disclosure.

FIG. 24B illustrates another example of DL and UL TCI state ID 2405 according to embodiments of the present disclosure. An embodiment of the DL and UL TCI state ID 2405 shown in FIG. 24A is for illustration only.

Figure 25A:
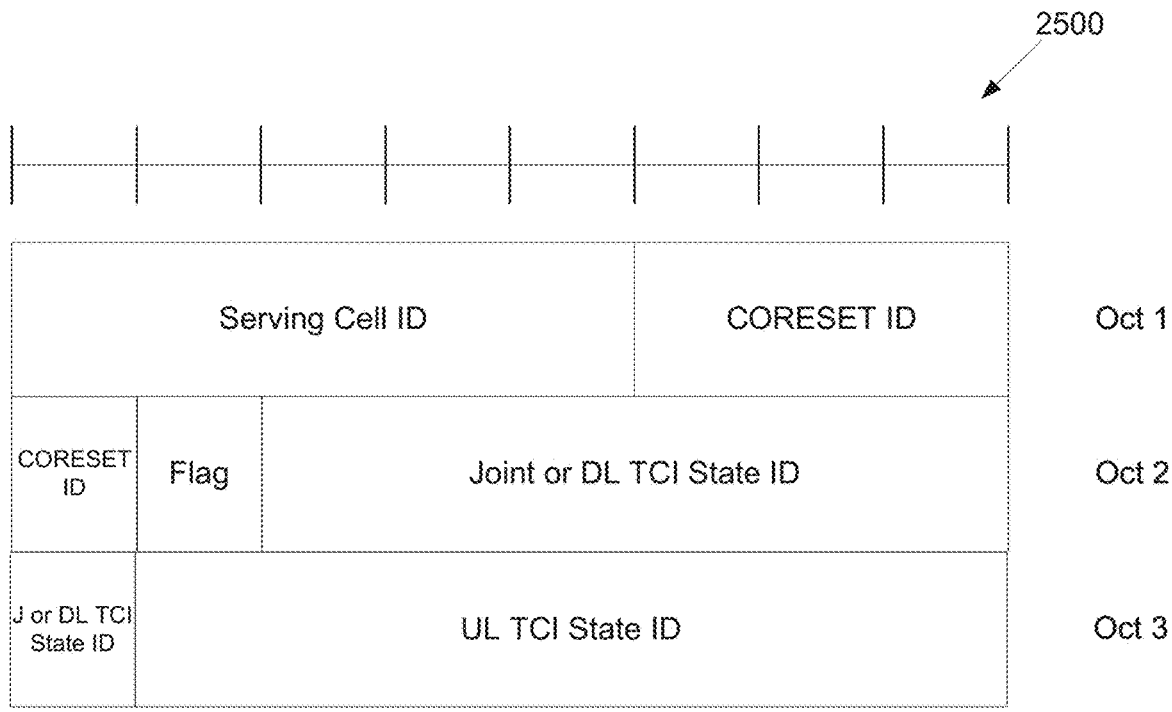
FIG. 25A illustrates an example of joint or DL TCI state ID and UL TCI state ID according to embodiments of the present disclosure.

In another example, the MAC CE activating a TCI state for a CORESET not following the unified (master or main or indicated) TCI state is activating either one Joint TCI state for DL and UL channels or one DL TCI state and one UL TCI state used for DL and UL channels, respectively, associated with a PDCCH transmitted in a search space associated with the CORESET. A one-bit flag determines whether the TCI state activates one Joint TCI state or 2 TCI states (DL TCI state or UL TCI state). This is illustrated in FIG. 25A. In FIG. 25A, UL TCI state ID is shown as 7 bits, in a variant UL TCI state ID is 6 bits with 1 bit reserved as shown in FIG. 25B.

FIG. 25A illustrates an example of joint or DL TCI state ID and UL TCI state ID 2500 according to embodiments of the present disclosure. An embodiment of the joint or DL TCI state ID and UL TCI state ID 2500 shown in FIG. 25A is for illustration only.

Figure 25B:
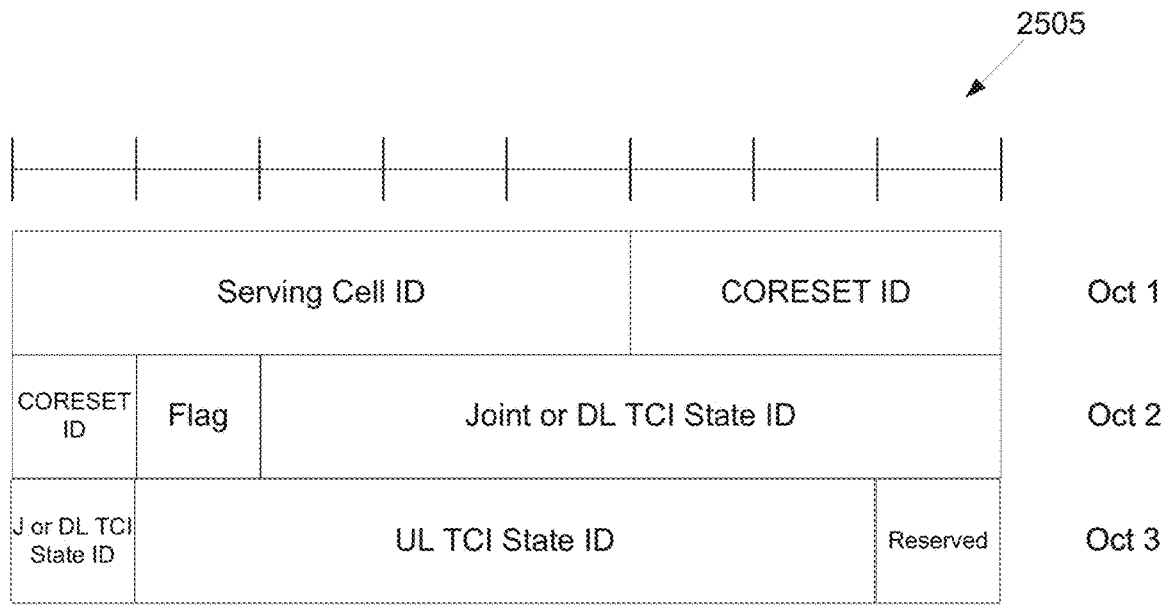
FIG. 25B illustrates another example of joint or DL TCI state ID and UL TCI state ID according to embodiments of the present disclosure.

FIG. 25B illustrates another example of joint or DL TCI state ID and UL TCI state ID 2505 according to embodiments of the present disclosure. An embodiment of the joint or DL TCI state ID and UL TCI state ID 2505 shown in FIG. 25B is for illustration only.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

QCL relation can be quasi-location with respect to one or more of the following relations as described in 3GPP standard specification 38.214: (1) Type A, {Doppler shift, Doppler spread, average delay, delay spread}; (2) Type B, {Doppler shift, Doppler spread}; (3) Type C, {Doppler shift, average delay}; and/or (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

NR supports positioning on the Uu interface. In the DL positioning reference signal (PRS) can be transmitted by a gNB to a UE to enable the UE to perform positioning measurements.

In the UL, a UE can transmit positioning sounding reference signal (Pos SRS) to enable a gNB to perform positioning measurements. UE measurements for positioning include; DL PRS reference signal receive power (DL PRS RSRP), DL reference signal time difference (DL RSTD), UE Rx-Tx time difference, NR enhanced cell ID (E-CID) DL SSB radio resource management (RRM) measurement, and NR E-CID DL CSI-RS RRM measurement. NG-RAN measurements for positioning include; UL relative time of arrival (UL-RTOA), UL angle of arrival (UL AoA) and gNB Rx-Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

Figure 26:
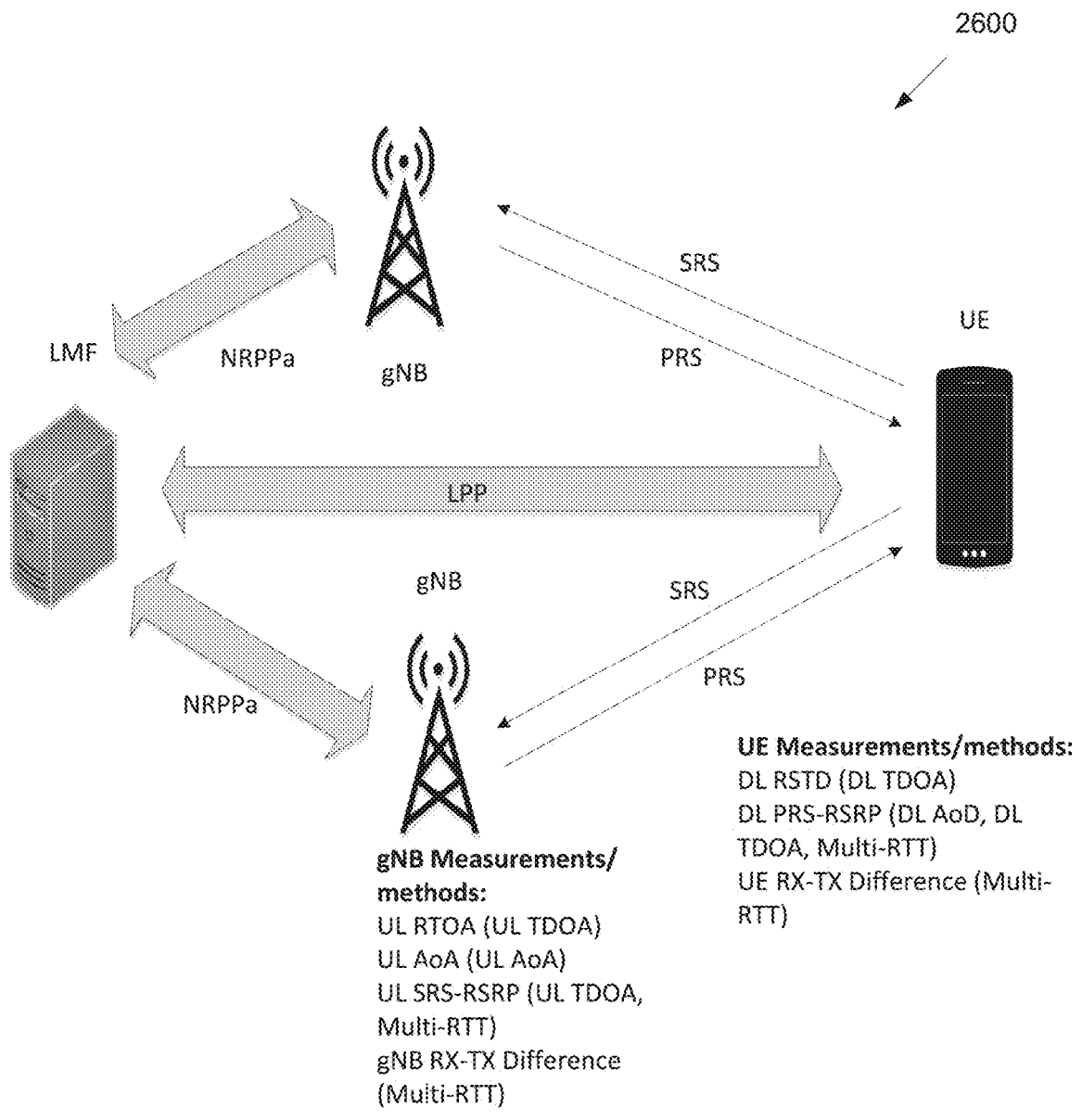
FIG. 26 illustrates an example of overall positioning architecture along with positioning measurements and methods according to embodiments of the present disclosure.

Positioning schemes can be UE-based, i.e., the UE determines the location or UE-assisted (e.g., location management function (LMF) based), i.e., UE provides measurements for a network entity (e.g., LMF) to determine the location. LTE positioning protocol (LPP) as described in 3GPP standard specification TS 37.355, first introduce for LTE and then extended to NR is used for communication between the UE and LMF. NR positioning protocol annex (NRPPa) as described in 3GPP standard specification TS 38.455 is used for communication between the gNB and the LMF. FIG. 26 illustrates the overall positioning architecture along with positioning measurements and methods.

FIG. 26 illustrates an example of overall positioning architecture 2600 along with positioning measurements and methods according to embodiments of the present disclosure. An embodiment.

In release 15/16 a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH or use a default beam indication. In the uplink direction, the spatialRelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

The present disclosure considers design aspects related to extension of TCI state framework developed for the unified TCI state indication in Rel-17 to support DL and UL reference signals used for positioning.

The present disclosure relates to a 5G/NR communication system.

The present disclosure considers design aspects related to extension of TCI state framework developed for the unified TCI state indication in Rel-17 to support DL and UL reference signals used for positioning: (1) inclusion of additional source reference signal types in the TCI state; and (2) configuration of PRS or positioning SRS to follow TCI state.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on.

In the following components, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

In Rel-16 and Rel-17, for the indication of the quasi-co-location parameters of the DL positioning reference signal (PRS), the source RS can be one of: (1) SSB of a serving cell or a neighboring cell; or (2) another DL positioning reference signal. This is defined in 3GPP standard specification TS 37.355.

TABLE 6

DL QCL information

```
DL-PRS-QCL-Info-r16 ::= CHOICE {
   ssb-r16                    SEQUENCE {
      pci-r16                    NR-PhysCellID-r16,
      ssb-Index-r16              INTEGER (0..63),
      rs-Type-r16                ENUMERATED {typeC, typeD,
                                 typeC-plus-typeD}
   },
   dl-PRS-r16                 SEQUENCE {
      qcl-DL-PRS-ResourceID-r16     NR-DL-PRS-ResourceID-r16,
      qcl-DL-PRS-ResourceSetID-r16  NR-DL-PRS-ResourceSetID-r16
   }
}
```

In Rel-16 and Rel-17, for indication of spatial relation information of the UL positioning Sounding Reference Signal (SRS), the source RS can be one of: (1) SSB of serving cell or a neighboring cell; (2) NZP CSI-RS of a serving cell; (3) SRS of a serving cell; (4) another positioning SRS of a serving cell; and/or (5) DL positioning reference signal. This is defined in 3GPP standard specification TS 38.331.

TABLE 7

SRS SpatialRelation information

```
SRS-SpatialRelationInfoPos-r16 ::= CHOICE {
servingRS-r16              SEQUENCE {
servingCellId              ServCellIndex              OPTIONAL, -- Need S
referenceSignal-r16           CHOICE {
   ssb-IndexServing-r16          SSB-Index,
   csi-RS-IndexServing-r16       NZP-CSI-RS-ResourceId,
   srs-SpatialRelation-r16       SEQUENCE {
      resourceSelection-r16         CHOICE {
         srs-ResourceId-r16            SRS-ResourceId,
         srs-PosResourceId-r16            SRS-PosResourceId-r16
      },
      uplinkBWP-r16              BWP-Id
   }
}
},
ssb-Ncell-r16              SSB-InfoNcell-r16,
dl-PRS-rl6                 DL-PRS-Info-r16
}
```

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and/or (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

QCL relation can be quasi-location with respect to one or more of the following relations as described in 3GPP standard specification 38.214: (1) Type A, {Doppler shift, Doppler spread, average delay, delay spread}; (2) Type B, {Doppler shift, Doppler spread}; (3) Type C, {Doppler shift, average delay}; and/or (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

In the present disclosure, signaling mechanisms to extend the applicability of TCI states for unified TCI framework to reference signals used for positioning are provided.

The source reference signal in TCI states can be extended to include other source reference signals and/or QCL Types to support the provision of quasi-co-location (QCL) information or spatial relation information to reference signals used for positioning.

In one example, the QCL Info information element (IE) within the TCI state IE, includes SSB Index and corresponding physical cell ID (PCI). This is illustrated in FIG. 27.

Figure 27:
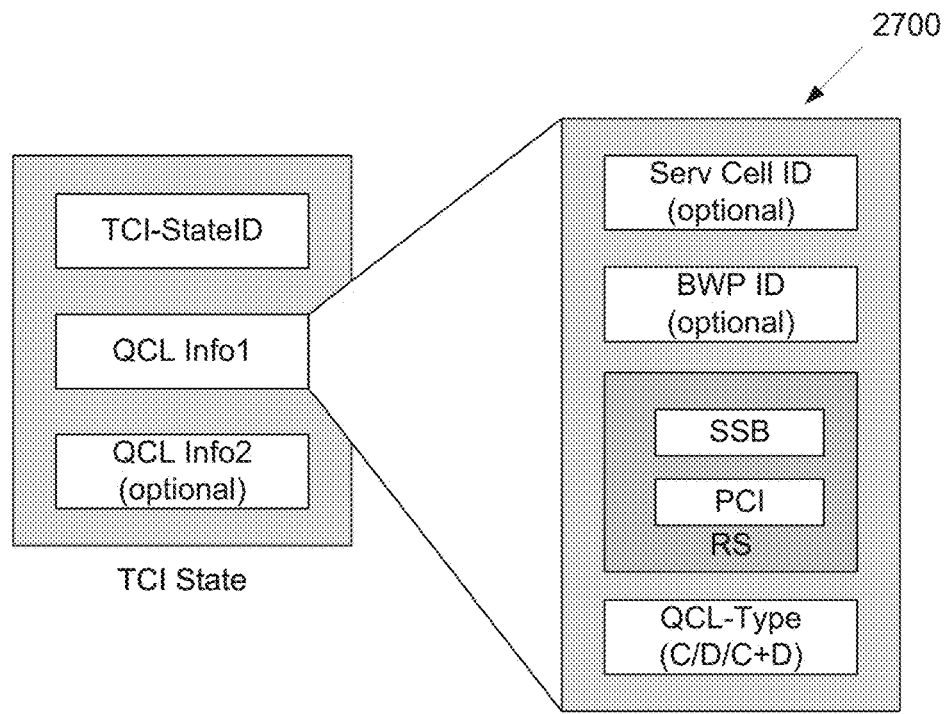
FIG. 27 illustrates an example of QCL Info IE within the TCI state IE according to embodiments of the present disclosure.

FIG. 27 illustrates an example of QCL Info IE within the TCI state IE 2700 according to embodiments of the present disclosure. An embodiment of the QCL Info IE within the TCI state IE 2700 shown in FIG. 27 is for illustration only.

In a variant of FIG. 27, the QCL-Type can additionally be one of QCL-Type A or B or D.

In a variant of FIG. 27, the QCL-Type can be QCL-Type C or D. In case of QCL-Type C+D, a first QCL Info IE (e.g., QCL Info1) is used in the TCI state, e.g., for QCL-Type C and a second QCL Info IE (e.g., QCL Info2) is used in the TCI state, e.g., for QCL-Type D.

In a variant of FIG. 27, only QCL Info1 IE is present in the TCI state, QCL Info2 is absent.

In a variant of FIG. 27, the PCI field is absent, and the UE may assume that the RS is associated with the PCI of the serving cell.

Figure 28:
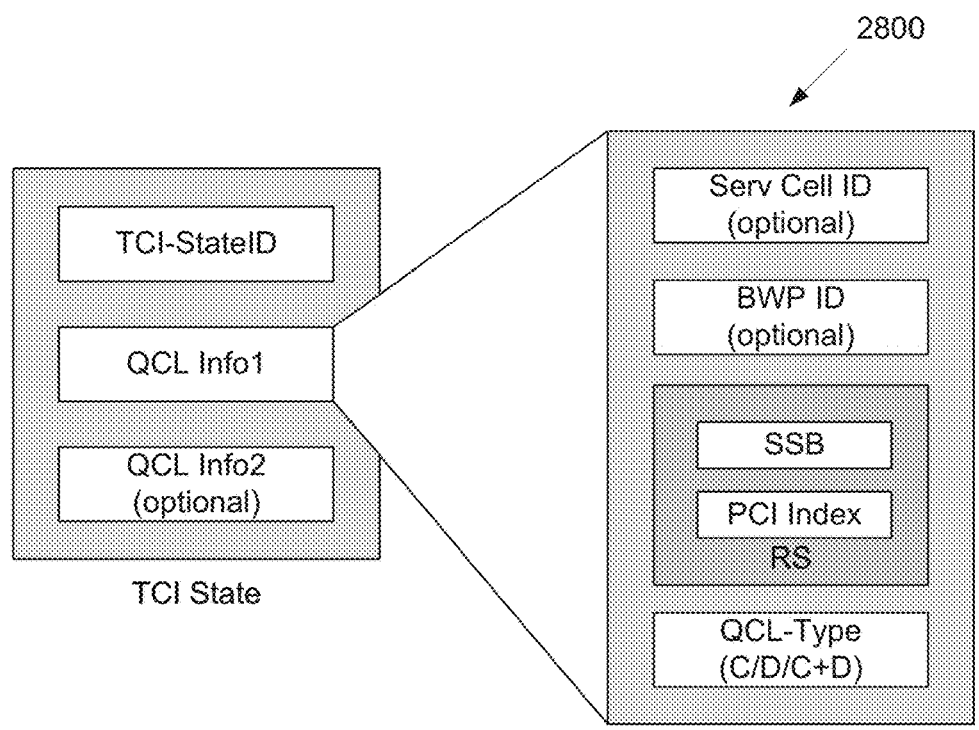
FIG. 28 illustrates another example of QCL Info IE within the TCI state IE according to embodiments of the present disclosure.

In one example, the QCL Info information element (IE) within the TCI state IE, includes SSB Index and corresponding physical cell ID (PCI) index. This is illustrated in FIG. 28. The PCI index refers to a PCIs within a set of PCIs configured for one or more of the following: (1) positioning measurements; (2) inter-cell beam management; and/or (3) inter-cell multi-TRP.

FIG. 28 illustrates another example of QCL Info IE within the TCI state IE 2800 according to embodiments of the present disclosure. An embodiment of the QCL Info IE within the TCI state IE 2800 shown in FIG. 28 is for illustration only.

In a variant of FIG. 28, the QCL-Type can additionally be one of QCL-Type A or B or D.

In a variant of FIG. 28, the QCL-Type can be QCL-Type C or D. In case of QCL-Type C+D, a first QCL Info IE (e.g., QCL Info1) is used in the TCI state, e.g., for QCL-Type C and a second QCL Info IE (e.g., QCL Info2) is used in the TCI state, e.g., for QCL-Type D.

In a variant of FIG. 28, only QCL Info1 IE is present in the TCI state, QCL Info2 is absent.

In a variant of FIG. 28, the PCI field is absent, and the UE may assume that the RS is associated with the PCI of the serving cell.

In one example, the QCL Info information element (IE) within the TCI state IE, includes NZP CSI-RS resource ID. This is illustrated in FIG. 29.

Figure 29:
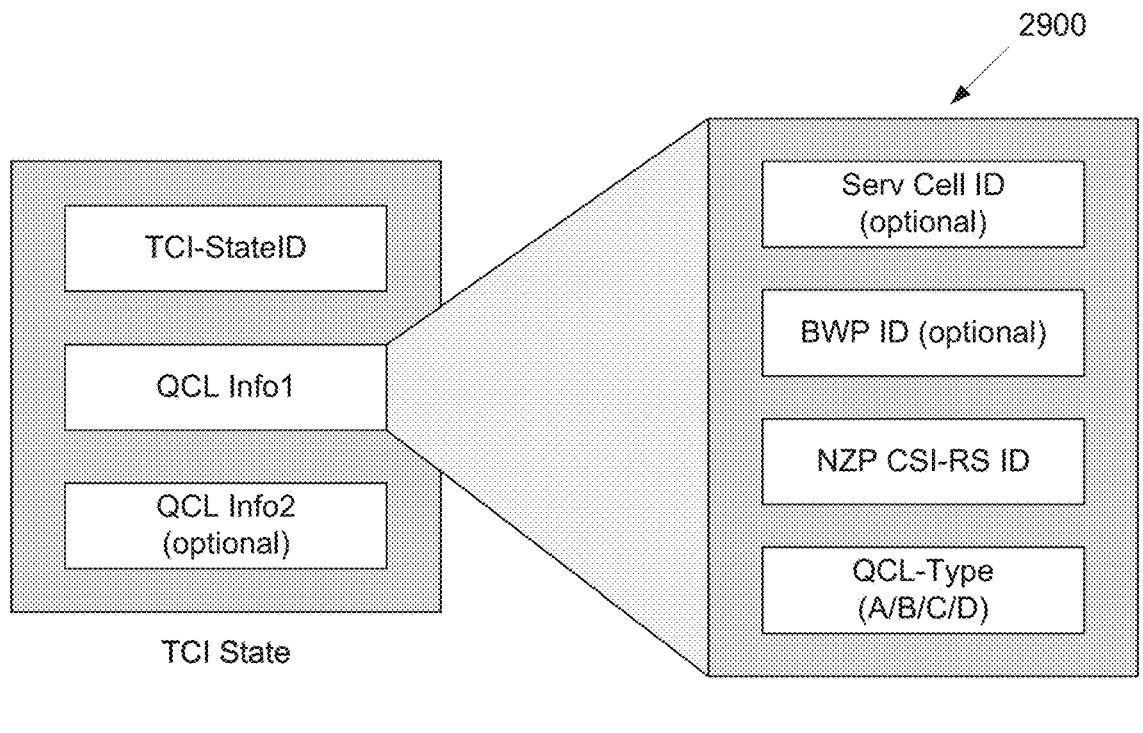
FIG. 29 illustrates yet another example of QCL Info IE within the TCI state IE according to embodiments of the present disclosure.

FIG. 29 illustrates yet another example of QCL Info IE within the TCI state IE 2900 according to embodiments of the present disclosure. An embodiment of the QCL Info IE within the TCI state IE 2900 shown in FIG. 29 is for illustration only.

In a variant of FIG. 29, the QCL-Type can additionally be one of QCL-Type A+D.

In a variant of FIG. 29, only QCL Info1 IE is present in the TCI state, QCL Info2 is absent.

In one example, the UE is configured a number of sets of positioning reference signals (PRS), each set is associated with a PRS resource set ID. Each PRS set includes a number of PRS resources, each PRS resource is associated with a PRS resource ID.

The QCL Info information element (IE) within the TCI state IE, includes PRS resource ID and corresponding PRS resource set ID. This is illustrated in FIG. 30.

Figure 30:
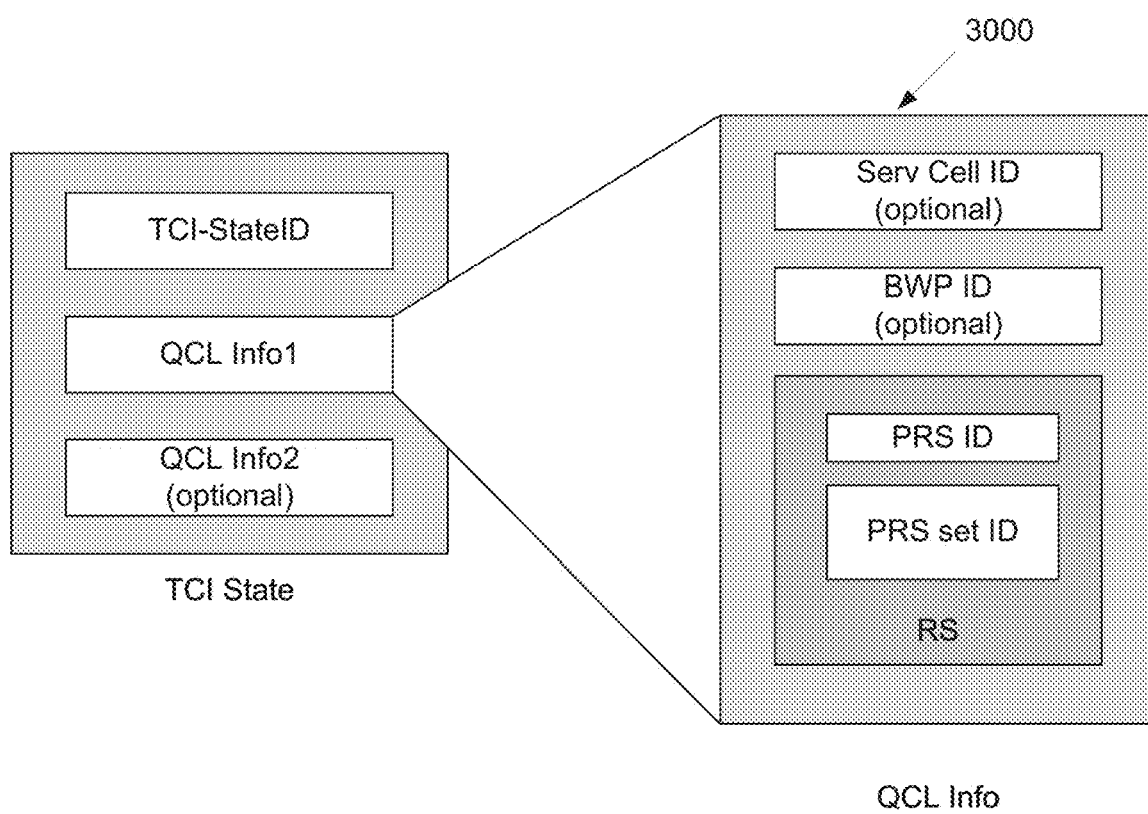
FIG. 30 illustrates yet another example of QCL Info IE within the TCI state IE according to embodiments of the present disclosure.

FIG. 30 illustrates yet another example of QCL Info IE within the TCI state IE 3000 according to embodiments of the present disclosure. An embodiment of the QCL Info IE within the TCI state IE 3000 shown in FIG. 30 is for illustration only.

In a variant of FIG. 30, a QCL-Type field can be included in the QCL Info. The QCL Type field can include one of the following: QCL Type A/B/C/D/C+D/A+D In a variant of FIG. 30, only QCL Info1 IE is present in the TCI state, QCL Info2 is absent.

Figure 31:
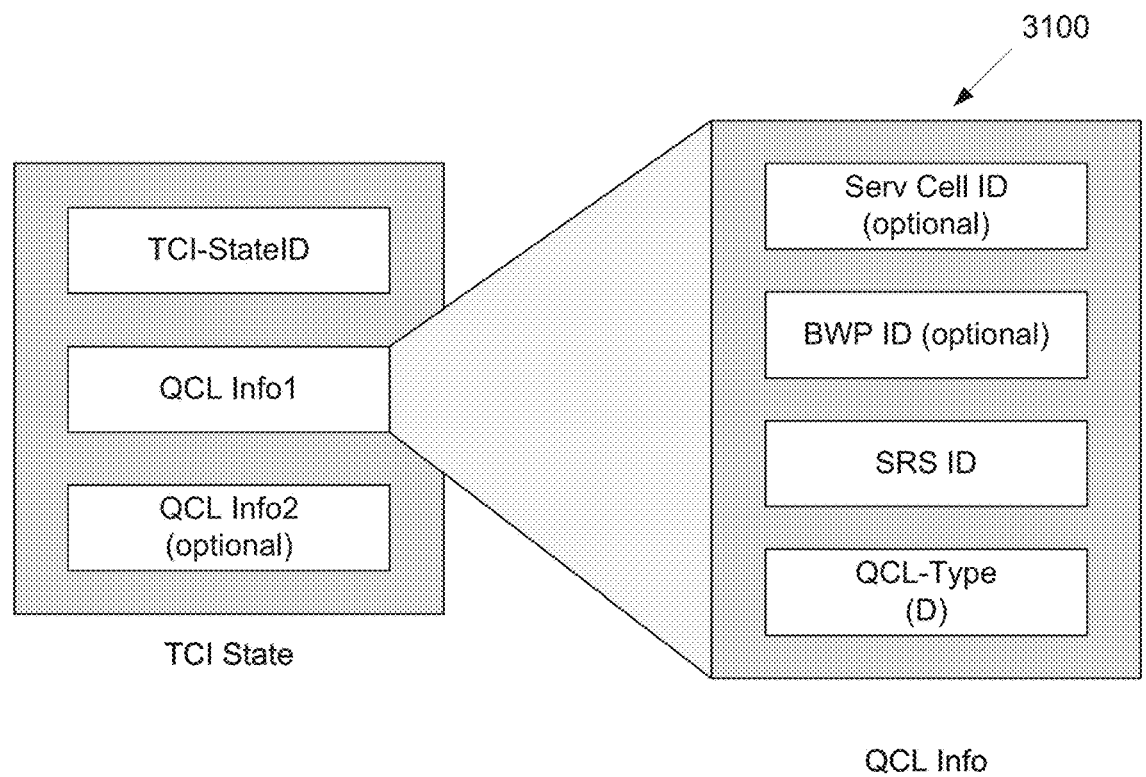
FIG. 31 illustrates yet another example of QCL Info IE within the TCI state IE according to embodiments of the present disclosure.

In one example, the QCL Info information element (IE) within the TCI state IE, includes sounding reference signal (SRS) resource ID. This is illustrated in FIG. 31. The BWP ID can be an uplink (UL) BWP ID.

FIG. 31 illustrates yet another example of QCL Info IE within the TCI state IE 3100 according to embodiments of the present disclosure. An embodiment of the QCL Info IE within the TCI state IE 3100 shown in FIG. 31 is for illustration only.

In a variant of FIG. 31, the QCL-Type can additionally be one of QCL-Type A/B/C/A+D.

In a variant of FIG. 31, only QCL Info1 IE is present in the TCI state, QCL Info2 is absent.

Figure 32:
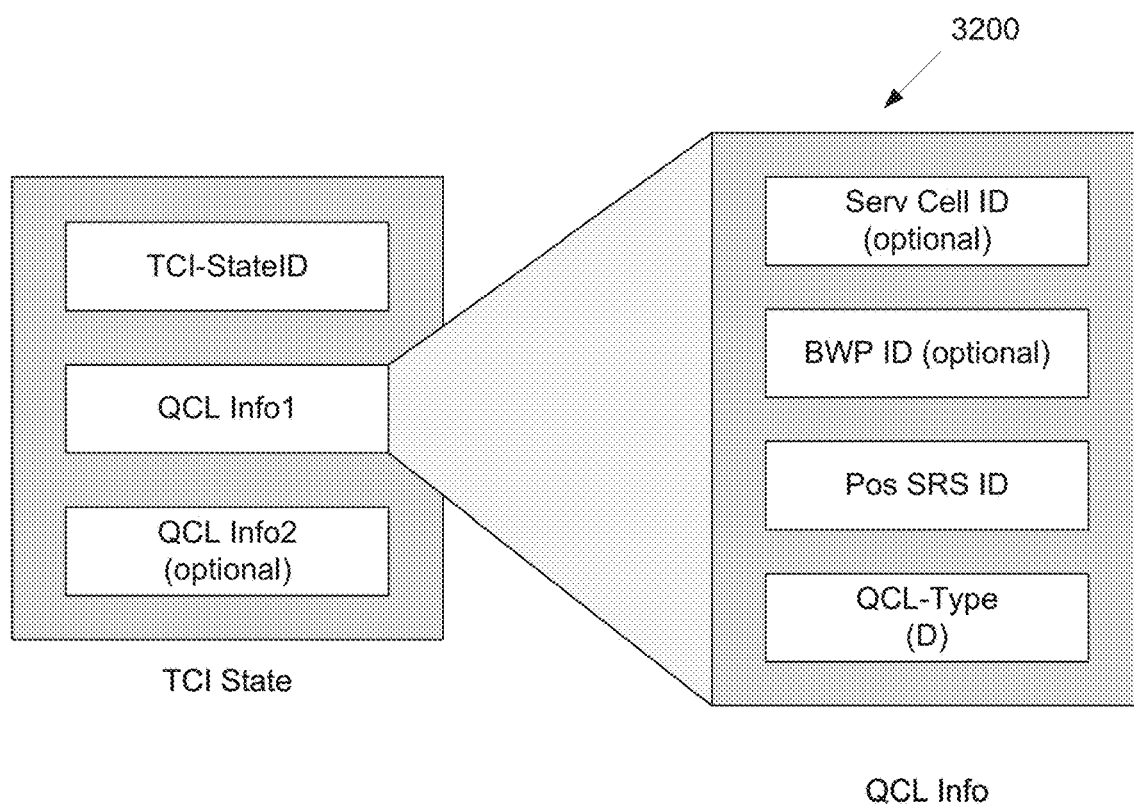
FIG. 32 illustrates yet another example of QCL Info IE within the TCI state IE according to embodiments of the present disclosure.

In one example, the QCL Info information element (IE) within the TCI state IE, includes positioning sounding reference signal (Pos SRS) resource ID. This is illustrated in FIG. 32. The BWP ID can be an uplink (UL) BWP ID.

FIG. 32 illustrates yet another example of QCL Info IE within the TCI state IE 3200 according to embodiments of the present disclosure. An embodiment of the QCL Info IE within the TCI state IE 3200 shown in FIG. 32 is for illustration only.

In a variant of FIG. 32, the QCL-Type can additionally be one of QCL-Type A/B/C/A+D.

In a variant of FIG. 32, only QCL Info1 IE is present in the TCI state, QCL Info2 is absent.

The TCI state for DL PRS can be one of the TCI states of component 1, for example as described herein.

In one example, the network configures a DL PRS. For the DL PRS, the network configures a TCI state wherein the UE determines a source reference signal, e.g., for QCL Type-D or QCL Type C or QCL Type C+D based on the configured TCI state. The configured TCI state can be one of a DL TCI state, or a Joint TCI state. The configuration and/or re-configuration (e.g., update) of the TCI state associated with the DL PRS can be RRC signaling.

In one further example, the network can activate a TCI state for a DL PRS by MAC CE signaling.

In one example, the network configures a DL PRS. For the DL PRS, the network configures a TCI state wherein the UE determines a source reference signal, e.g., for QCL Type-D or QCL Type C or QCL Type C+D based on the configured TCI state. The configured TCI state can be one of a DL TCI state, or a Joint TCI state. The configuration and/or re-configuration (e.g., update) of the TCI state associated with the DL PRS can be RRC signaling. If the TCI state is not configured for the DL PRS, the UE follows the unified or main or master TCI state indicated to the UE for the DL PRS.

In one further example, the network can activate a TCI state for a DL PRS by MAC CE signaling. If no TCI state is configured by RRC signaling or activated by MAC CE signaling, the UE follows the unified or main or master TCI state indicated to the UE for the DL PRS.

In one example, the network configures a DL PRS. For the DL PRS, the network configures whether or not the TCI state follows the unified or main or master TCI state indicated to the UE for the DL PRS. If the UE does not follow the unified or main or master TCI state indicated to the UE, the network configures a TCI state wherein the UE determines a source reference signal, e.g., for QCL Type-D or QCL Type C or QCL Type C+D based on the configured TCI state. The configuration and/or re-configuration (e.g., update) of the TCI state associated with the DL PRS, or whether or not the UE follows the unified or main or master TCI state indicated to the UE can be by RRC signaling.

In one further example, the network can activate a TCI state for a DL PRS by MAC CE signaling.

In one further example, the network can indicate to the UE by MAC CE signaling to follow or not follow the unified or main or master TCI state indicated to the UE for a DL PRS.

In one further example, the network can indicate to the UE by DCI signaling to follow or not follow the unified or main or master TCI state indicated to the UE for a DL PRS.

In one further example, the network can indicate to the UE by MAC CE signaling to follow the unified or main or master TCI state indicated to the UE for a DL PRS.

In one further example, the network can indicate to the UE by DCI signaling to follow the unified or main or master TCI state indicated to the UE for a DL PRS.

The TCI state for position SRS (Pos SRS) can be one of the TCI states, for example as described herein.

In one example, the network configures an UL Pos SRS. For the UL Pos SRS, the network configures a TCI state wherein the UE determines a source reference signal, for UL spatial relation, based on the configured TCI state. The configured TCI state can be one of a UL TCI state, or a Joint TCI state. The configuration and/or re-configuration (e.g., update) of the TCI state associated with the UL Pos SRS can be RRC signaling.

In one further example, the network can activate a TCI state for an UL Pos SRS by MAC CE signaling.

In one example, the network configures an UL Pos SRS. For the UL Pos SRS, the network configures a TCI state wherein the UE determines a source reference signal, for UL spatial relation, based on the configured TCI state. The configured TCI state can be one of a UL TCI state, or a Joint TCI state. The configuration and/or re-configuration (e.g., update) of the TCI state associated with the UL Pos RS can be RRC signaling. If the TCI state is not configured for the UL Pos SRS, the UE follows the unified or main or master TCI state indicated to the UE for the UL Pos SRS.

In one further example, the network can activate a TCI state for an UL Pos SRS by MAC CE signaling. If no TCI state is configured by RRC signaling or activated by MAC CE signaling, the UE follows the unified or main or master TCI state indicated to the UE for the UL Pos SRS.

In one example, the network configures an UL Pos SRS. For the UL Pos SRS, the network configures whether or not the TCI state follows the unified or main or master TCI state indicated to the UE for the UL Pos SRS. If the UE does not follow the unified or main or master TCI state indicated to the UE, the network configures a TCI state wherein the UE determines a source reference signal, for UL spatial relation, based on the configured TCI state. The configuration and/or re-configuration (e.g., update) of the TCI state associated with the UL Pos SRS, or whether or not the UE follows the unified or main or master TCI state indicated to the UE can be by RRC signaling.

In one further example, the network can activate a TCI state for an UL Pos SRS by MAC CE signaling.

In one further example, the network can indicate to the UE by MAC CE signaling to follow or not follow the unified or main or master TCI state indicated to the UE for an UL Pos SRS.

In one further example, the network can indicate to the UE by DCI signaling to follow or not follow the unified or main or master TCI state indicated to the UE for an UL Pos SRS.

In one further example, the network can indicate to the UE by MAC CE signaling to follow the unified or main or master TCI state indicated to the UE for an UL Pos SRS.

In one further example, the network can indicate to the UE by DCI signaling to follow the unified or main or master TCI state indicated to the UE for an UL Pos SRS.

A beam-based operation is essential for the commercialization of FR2 (i.e., mmWaves), support of beam management in release 15 and release 16 incurs overhead and latency impacting the robustness of beam management. To address these concerns, a release 17 work item on further enhancements of MIMO has been discussed and approved in 3GPP. Positioning is another feature supported by NR, reference signals used for positioning are QCLed or have a spatial relation with other source reference signals. In the present disclosure, extension of the unified TCI framework to cover reference signals used for positioning is provided. If adopted by the standards, this may be used by UEs supporting NR-based positioning.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive configuration information for a list of transmission configuration indicator (TCI) states for downlink (DL) or joint TCI states,
receive configuration information for a control resource set (CORESET),
receive configuration information for a search space set associated with the CORESET, and
receive an indication of a TCI state from the list of TCI states, and
a processor operably coupled to the transceiver, the processor configured to, when the search space set is a UE specific search space (USS) set and an index of the CORESET is not 0, apply the indicated TCI state to a physical downlink control channel (PDCCH) in the CORESET,
wherein the transceiver is further configured to receive the PDCCH based on quasi-co-location properties corresponding to the indicated TCI state.

2. The UE of claim 1, wherein the processor is further configured to, when the search space set is a Type-3 PDCCH common search space (CCS) set and the index of the CORESET is not 0, apply the indicated TCI state to the PDCCH in the CORESET.

3. The UE of claim 1, wherein the processor is further configured to, when the search space set is the USS set or a Type-3 PDCCH common search space (CCS) set and the index of the CORESET is not 0, apply the indicated TCI state to a physical downlink shared channel (PDSCH) scheduled by the PDCCH in the CORESET.

4. The UE of claim 1, wherein the transceiver is further configured to, when the search space set is a common search space (CSS) set, other than a Type-3 PDCCH CSS set, and the index of the CORESET is not 0, receive additional configuration information to indicate whether the CORESET is to follow the indicated TCI state.

5. The UE of claim 4, wherein:
the additional configuration information indicates that the CORESET is to follow the indicated TCI state, and
the processor is further configured to apply the indicated TCI state to the PDCCH in the CORESET.

6. The UE of claim 4, wherein:
the additional configuration information indicates that the CORESET is to follow the indicated TCI state, and
the processor is further configured to apply the indicated TCI state to a physical downlink shared channel (PDSCH) scheduled by the PDCCH in the CORESET.

7. The UE of claim 1, wherein:
the index of the CORESET is 0,
the transceiver is further configured to receive configuration information for the CORESET to follow the indicated TCI state, and
the processor is further configured to apply the indicated TCI state to:
the PDCCH in the CORESET, and
a physical downlink shared channel (PDSCH) scheduled by the PDCCH in the CORESET.

8. A base station (BS), comprising:
a transceiver configured to:
transmit configuration information for a list of transmission configuration indicator (TCI) states for downlink (DL) or joint TCI states,
transmit configuration information for a control resource set (CORESET),
transmit configuration information for a search space set associated with the CORESET, and
transmit an indication of a TCI state from the list of TCI states, and
a processor operably coupled to the transceiver, the processor configured to, when the search space set is a UE specific search space (USS) set and an index of the CORESET is not 0, apply the indicated TCI state to a physical downlink control channel (PDCCH) in the CORESET,
wherein the transceiver is further configured to transmit the PDCCH based on quasi-co-location properties corresponding to the indicated TCI state.

9. The BS of claim 8, wherein the processor is further configured to, when the search space set is a Type-3 PDCCH common search space (CCS) set and the index of the CORESET is not 0, apply the indicated TCI state to the PDCCH in the CORESET.

10. The BS of claim 8, wherein the processor is further configured to, when the search space set is the USS set or a Type-3 PDCCH common search space (CCS) set and the index of the CORESET is not 0, apply the indicated TCI state to a physical downlink shared channel (PDSCH) scheduled by the PDCCH in the CORESET.

11. The BS of claim 8, wherein the transceiver is further configured to, when the search space set is a common search space (CSS) set, other than a Type-3 PDCCH CSS set, and the index of the CORESET is not 0, transmit additional configuration information to indicate whether the CORESET is to follow the indicated TCI state.

12. The BS of claim 11, wherein:
the additional configuration information indicates that the CORESET is to follow the indicated TCI state, and
the processor is further configured to apply the indicated TCI state to the PDCCH in the CORESET.

13. The BS of claim 11, wherein:
the additional configuration information indicates that the CORESET is to follow the indicated TCI state,
the processor is further configured to apply the indicated TCI state to a physical downlink shared channel (PDSCH) scheduled by the PDCCH in the CORESET.

14. The BS of claim 8, wherein:
the index of the CORESET is 0,
the transceiver is further configured to transmit configuration information for the CORESET to follow the indicated TCI state, and
the processor is further configured to apply the indicated TCI state to:
the PDCCH in the CORESET, and
a physical downlink shared channel (PDSCH) scheduled by the PDCCH in the CORESET.

15. A method of operating a user equipment (UE), the method comprising:
receiving configuration information for a list of transmission configuration indicator (TCI) states for downlink (DL) or joint TCI states;
receiving configuration information for a control resource set (CORESET);
receiving configuration information for a search space set, wherein the search space set is associated with the CORESET;
receiving an indication of a TCI state from the list of TCI states;
identifying a type of the search space set and an index of the CORESET;
applying the indicated TCI state to a physical downlink control channel (PDCCH) in the CORESET based on at least one of (i) the identified type of the search space set and the identified index of the CORESET and (ii) additional configuration information; and
receiving the PDCCH based on quasi-co-location properties corresponding to the indicated TCI state.

16. The method of claim 15, wherein:
identifying the type of the search space set and the index of the CORESET further comprises identifying that the search space set is a UE specific search space (USS) set or a Type-3 PDCCH common search space (CCS) set and that the index of the CORESET is not 0, and
applying the indicated TCI state to the PDCCH further comprises applying the indicated TCI state to the PDCCH in the CORESET based on identifying that the search space set is the USS set or the Type-3 PDCCH CCS set and that the index of the CORESET is not 0.

17. The method of claim 15, wherein:
identifying the type of the search space set and the index of the CORESET further comprises identifying that the search space set is a UE specific search space (USS) set or a Type-3 PDCCH common search space (CCS) set and that the index of the CORESET is not 0, and
the method further comprises applying the indicated TCI state to a physical downlink shared channel (PDSCH) scheduled by the PDCCH in the CORESET based on identifying that the search space set is the USS set or the Type-3 PDCCH CCS set and that the index of the CORESET is not 0.

18. The method of claim 15, wherein:
identifying the type of the search space set and the index of the CORESET further comprises identifying that the search space set is a common search space (CSS) set, other than a Type-3 PDCCH CSS set, and the index of the CORESET is not 0, and the method further comprises receiving the additional configuration information to indicate whether the CORESET is to follow the indicated TCI state.

19. The method of claim 18, further comprising:

identifying that the additional configuration information indicates that the CORESET is to follow the indicated TCI state, wherein applying the indicated TCI state to the PDCCH further comprises applying the indicated TCI state to the PDCCH in the CORESET based on identifying that the additional configuration information indicates that the CORESET is to follow the indicated TCI state; and applying the indicated TCI state to a physical downlink shared channel (PDSCH) scheduled by the PDCCH in the CORESET.

20. The method of claim 15, wherein:

identifying the index of the CORESET further comprises identifying that the index of the CORESET is 0, the method further comprises receiving the additional configuration information for the CORESET to follow the indicated TCI state, applying the indicated TCI state to the PDCCH further comprises applying the indicated TCI state to the PDCCH in the CORESET based on the additional configuration information, and the method further comprises applying the indicated TCI state to a physical downlink shared channel (PDSCH) scheduled by the PDCCH in the CORESET.

* * * * *